(12) United States Patent
Sankrithi et al.

(10) Patent No.: US 8,393,553 B2
(45) Date of Patent: Mar. 12, 2013

(54) FLOATING ICE SHEET BASED RENEWABLE THERMAL ENERGY HARVESTING SYSTEM

(75) Inventors: Mithra M. K. V. Sankrithi, Lake Forest Park, WA (US); Siva U. M. Sankrithi, Lake Forest Park, WA (US)

(73) Assignee: RIC Enterprises, Lake Forest Park, WA (US)

( * ) Notice: Subject to any disclaimer, the term of this patent is extended or adjusted under 35 U.S.C. 154(b) by 1473 days.

(21) Appl. No.: 12/006,035

(22) Filed: Dec. 31, 2007

(65) Prior Publication Data
US 2013/0036735 A1    Feb. 14, 2013

(51) Int. Cl.
*F25C 3/04* (2006.01)
(52) U.S. Cl. .............................. 239/2.2; 62/59
(58) Field of Classification Search ............... 62/56, 59, 62/66, 69, 71, 74, 89, 95, 97–99, 121; 415/3.1, 415/4.3; 290/1 A, 1 R, 2, 43–44, 54–55; 416/111, 119, 139, 240; 60/398; 239/2.1, 239/2.2, 14.1, 14.2, 135, 142
See application file for complete search history.

(56) References Cited

U.S. PATENT DOCUMENTS

| 4,048,947 | A | * | 9/1977 | Sicard | 440/8 |
| 5,593,090 | A | * | 1/1997 | Werner | 239/2.2 |
| 5,810,249 | A | * | 9/1998 | Nilsson | 239/2.2 |
| 2005/0006493 | A1 | * | 1/2005 | Stofner | 239/14.1 |

* cited by examiner

*Primary Examiner* — Frantz Jules
*Assistant Examiner* — Emmanuel Duke

(57) ABSTRACT

The invention provides a floating ice sheet based renewable thermal energy harvesting system, that can harvest energy from naturally occurring temperature differential between liquid water below a floating ice sheet that is substantially at the freezing temperature of water (0 degrees C. or slightly lower for salt water), and colder air above the floating ice sheet. For example, this is a naturally occurring phenomenon in Arctic and Antarctic region sea ice or ice shelf regions, where the air temperature above the floating ice may range from −5 degrees C. down to winter extreme cold temperatures of around −50 degrees C. In addition to the inventive application of thermodynamic cycle engines to harvest renewable energy from this naturally occurring temperature differential, variant embodiments also combine wind energy and/or solar energy subsystems to provide synergistic further benefits and greater quantities of renewable energy harvestable from devices of this class.

17 Claims, 28 Drawing Sheets

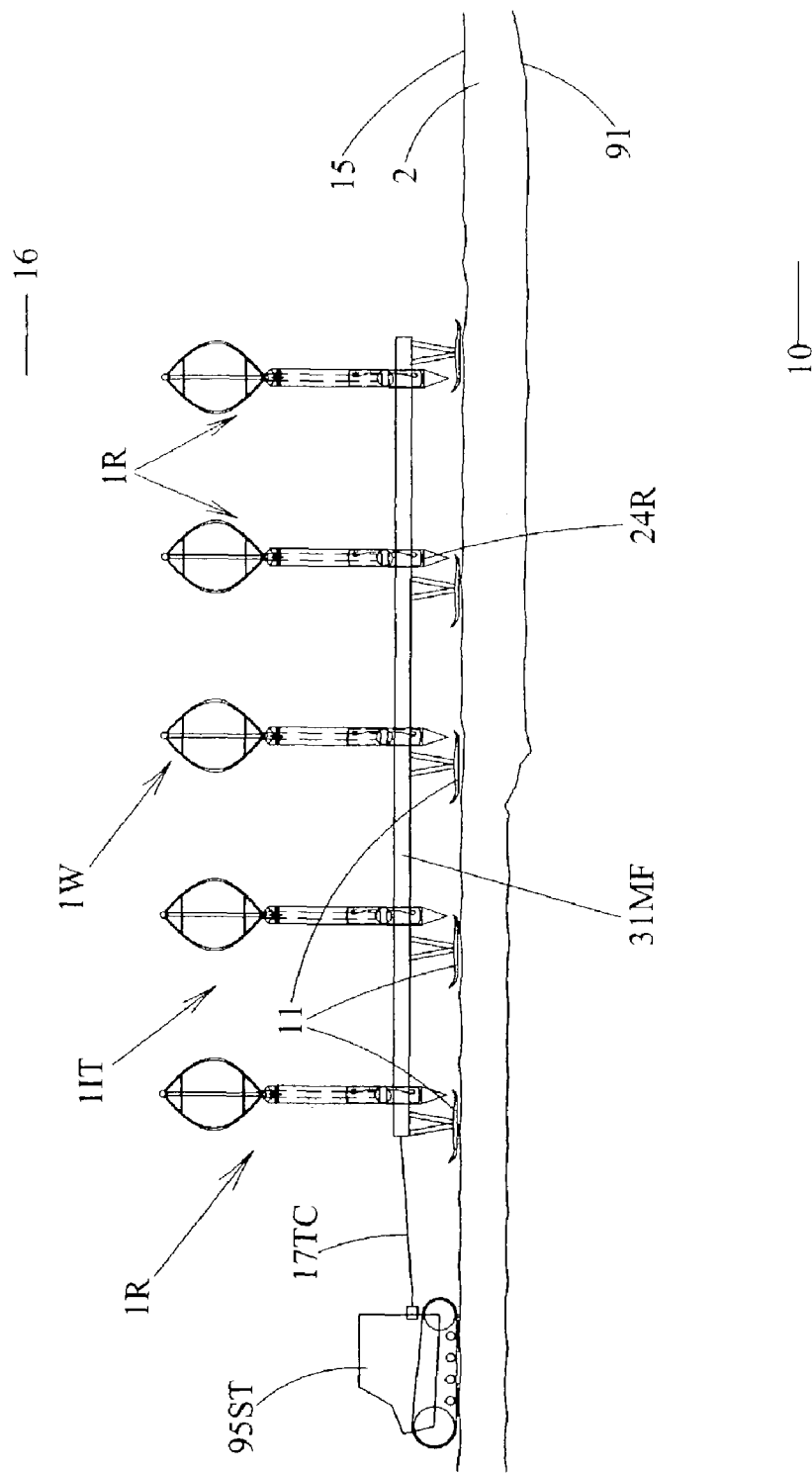

FLOATING ICE SHEET BASED RENEWABLE THERMAL ENERGY HARVESTING SYSTEM

BACKGROUND OF THE INVENTION

As the World's human population grows and as the economic prosperity of that population grows, the energy demand of that population also grows. With limited availability of oil reserves, there is a growing need for the conception, development and deployment of cost-effective and large-scale renewable energy alternatives. The continued use of fossil fuels to meet current and emerging energy needs also has very negative environmental consequences, including massive emissions of pollutants and exacerbation of global warming. One of the most ominous threats of all comprises global warming induced Arctic ice depletion. Polar scientists generally agree that global warming induced Arctic ice depletion will occur on a large scale in the coming decades, and will include both Arctic sea ice depletion and Kalaallit Nunaat (Greenland) and Antarctic ice cap depletion. Ice thinning, ice area reduction, and rising waters are among the many consequences that could result. Other frightful consequences range from decimation of polar bear populations, to a potential global sea-level rise that could even submerge whole nations such as Kiribati and the Maldives. These factors provide strong motivation for floating ice sheet based renewable thermal energy harvesting systems that could be used in sea ice regions of the Arctic and Antarctic, as well as in other water bodies. With the Sun providing enormous quantities of energy to the World every second, harvestable both directly as solar energy and indirectly as wind energy, a motivation also exists to explore potential combination of such floating ice sheet based renewable thermal energy harvesting systems with wind and/or solar energy capture subsystems to provide further synergistic benefits.

BRIEF SUMMARY OF THE INVENTION

The present invention provides a floating ice sheet based renewable thermal energy harvesting system, that can harvest energy from naturally occurring temperature differential between liquid water below a floating ice sheet that is substantially at the freezing temperature of water (0 degrees C. or slightly lower for salt water), and colder air above the floating ice sheet. For example, this is a naturally occurring phenomenon in Arctic and Antarctic region sea ice or ice shelf regions, where the air temperature above the floating ice may range from −5 degrees C. down to winter extreme cold temperatures of around −50 degrees C. that can occur in locations such as Nord, Kalaallit Nunaat (Greenland) and McMurdo Station, Antarctica, to name just two of many locations. In addition to the inventive application of thermodynamic cycle engines to harvest renewable energy from this naturally occurring temperature differential, variant embodiments also combine wind energy and/or solar energy subsystems to provide synergistic further benefits and greater quantities of renewable energy harvestable from devices of this class.

The present invention is intended to provide devices, methods and systems for harvesting renewable energy which can be cost-effective, large-scale, not dependant on any fossil fuel sources, and free of any greenhouse gas emissions; to provide real and substantial benefits to humanity and to our global environment. Regional benefits for polar regions include mitigation of sea ice area reduction and thinning caused by global warming, reduced extinction threat to polar bears, and provision of clean renewable energy for polar communities.

The invention provides several preferred embodiments which can be understood from a full consideration of the following drawings, description, and claims.

BRIEF DESCRIPTION OF THE DRAWINGS

FIGS. 4A through 4D show partial side views of embodiments of a renewable thermal energy harvesting system with water to air heat transfer below a floating ice sheet.

DETAILED DESCRIPTION

Figure 1A:
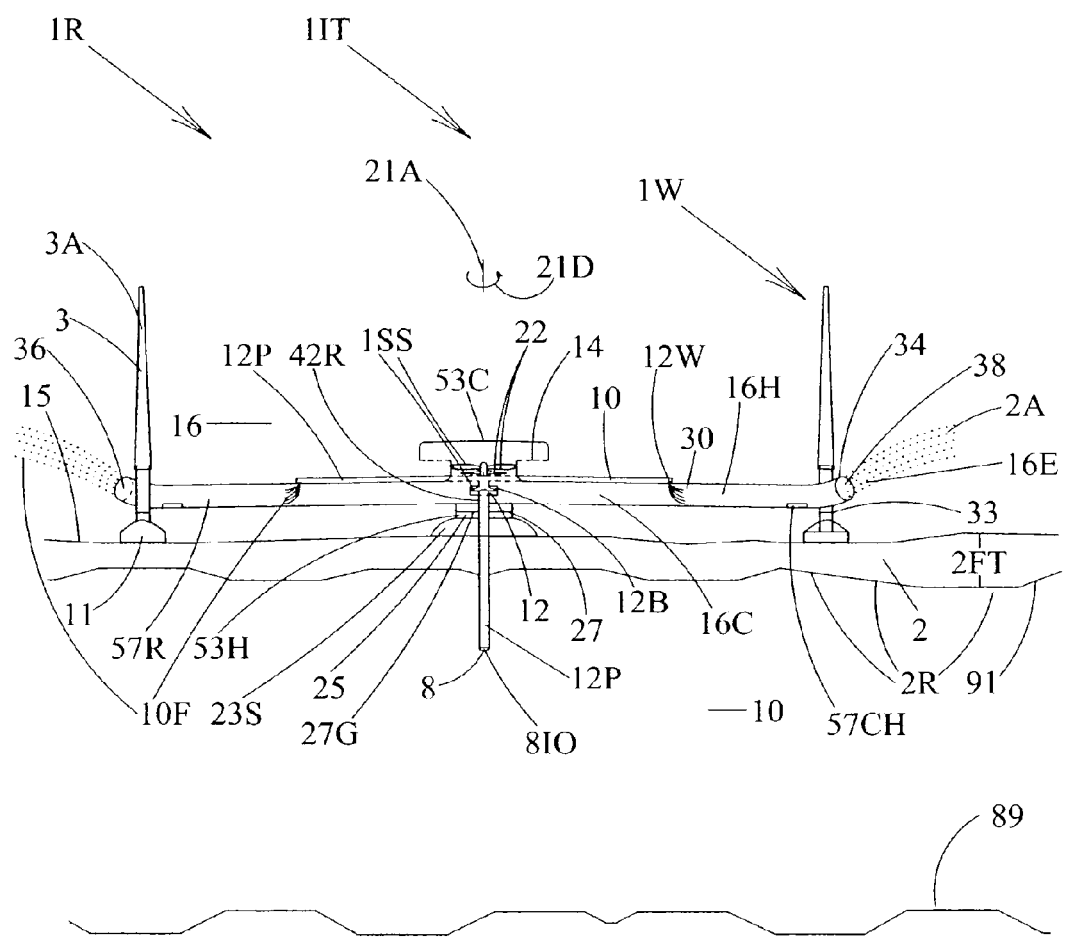
FIG. 1A shows a partial side view of a preferred embodiment of a renewable thermal energy harvesting system.

FIG. 1A shows a partial side view of a preferred embodiment of a renewable thermal energy harvesting system 1R. The renewable thermal energy harvesting system 1R is sited on a floating ice sheet 2, such as sea ice in high latitude regions such as the Arctic or Antarctic, or ice shelves or lake ice or other floating ice. The floating ice sheet 2 floats on a layer of liquid water 10 that rests on a ground surface 89. The top of the floating ice sheet 2 is defined by a frozen surface 15, and the bottom of the floating ice sheet 2 is defined by an ice/water interface comprising the undersurface 91 of the floating ice sheet. The illustrated renewable thermal energy harvesting system 1R is supported at least in part by support means 23S adjacent the upper surface of the floating ice sheet 2. The illustrated renewable thermal energy harvesting system 1R is intended to harvest two types of renewable energy: the first being renewable thermal energy using a thermodynamic cycle engine that exploits a temperature difference between liquid water 10 below the floating ice sheet 2 that is substantially at the freezing temperature of water (0 degrees C. or slightly lower for salt water), and colder air 16 above the floating ice sheet 2; and the second being renewable wind energy that induces aerodynamic forces on airfoil or wind foil means 3A.

The thermodynamic cycle engine utilizes air 16 flowing into air intake means 14 beneath a rotating hub cover 53C, then through air compression means 22, then through air heating means 30 in a radial arm 57R to create a heated air stream 16H, and finally through exhaust orifice means 38 to produce an exhaust air stream 16E that is so oriented as to produce a thrust force on the radial arm 57R that acts to rotate the radial arm around a hub 53H, causing the rotating assembly with both radial arms 57R to together rotate around axis 21A in a rotational direction 21D. The use of the oriented exhaust air stream 16E to produce a thrust force on the radial arm 57R, serves as mechanical energy generation means 34. The innovative air heating means 30 that is provided, comprises at least one of dripping or spraying or injecting liquid water 10 into the cold air stream, whereupon at least some of the liquid water droplets freeze and become frozen water 10F, and the accompanying release of the water's heat of solidification contributes heat to heat the air stream and power the thermodynamic cycle engine. Note that the liquid water 10 dripped or sprayed or injected acts as means for heating the air both (i) because it is at a higher temperature than the air stream and heat flows naturally from a higher temperature entity to a lower temperature entity, and (ii) because many or all of the liquid water droplets will freeze on contact with the cold subfreezing temperature air, and whilst freezing will release the heat of solidification of water into the air stream. The frozen water particles which may be in the form or snow crystals or ice crystals, are preferably blown out through the exhaust orifice means 38 carried along with the exhaust air stream 16E, as illustrated. The liquid water 10 that is dripped or sprayed or injected, is sourced from below the floating ice sheet 2 through water intake means 8 here comprising a water inlet orifice 8IO, and is transported via at least one of a water pipe and tube and hose 12P. The water inlet orifice 8IO may incorporate fitted or integral filters to prevent or minimize ingestion of debris, dirt or marine life forms or remains into the at least one of a water pipe and tube and hose 12P. A water pump 12 is used to pump the liquid water 10, which also flows through water flow encasing bearing means 12B for permitting encased water flow from a fixed pipe into a rotating pipe that is attached to the rotating radial arm 57R. Radial arm cleaning hatches 57CH are provided to enable periodic cleanout of any residual frozen particles and/or dirt deposits and/or salt deposits and/or marine life forms or remains from the interior of the radial arms 57R, either by mechanical cleaning means (brush or broom) or vacuum means or by cleaning fluid wash-out means.

The renewable wind energy subsystem utilizes fluid-foil means 3 that comprise airfoil or wind-foil means 3A, that can be appropriately oriented relative to a wind or air stream direction and as a function of time and position, so as to also produce additional thrust force on the radial arm 57R that also acts to rotate the radial arm around the hub 53H.

The radial arms 57R are supported on the frozen surface 15 of the floating ice sheet 2, by support runner means 11 that may comprise at least one of a ski, a skate, a runner and buoyant runner means. The structural interface between the runner means 11 and the radial arms 57R can include a suspension element 33 that permits the radial arm to move over an uneven or undulating frozen surface 15 while effectively providing support and minimizing vertical shock loads on the radial arms.

As the radial arms 57R rotate around the nonrotating hub 53H, they drive energy harvesting means 25 here comprising generator means 27G for generating electricity from the rotational motion, as is known from many prior art generators. The electricity so generated can be transmitted, conditioned, processed or stored by means not shown in this Figure, so as not to unduly clutter the illustration. The generator means 27G can optionally be run with power in instead of power out, to serve as motor means for starting rotation of the radial arms 57R at the start of operation of the renewable thermal energy harvesting system 1R.

The illustrated renewable thermal energy harvesting system 1R also serves as a floating ice sheet thickening system 1IT, as the frozen water particles which may be in the form or snow crystals or ice crystals that are blown out through the exhaust orifice means 38 along with the exhaust air stream 16E, are subsequently deposited on the frozen surface 15 so as to effectively thicken the floating ice sheet 2.

Note that in an alternative or variant embodiment or mode of operation of the embodiment illustrated in FIG. 1A, the innovative air heating means 30 that is provided, could comprise at least one of dripping or spraying or injecting liquid water 10 into the cold air stream, whereupon the liquid water droplets do NOT freeze but do release some heat into the airstream because the liquid water is at a higher temperature than the air stream, and this released heat heats the air stream and powers the thermodynamic cycle engine. In this case the liquid water 10 dripped or sprayed or injected acts as means for heating the air solely because it is at a higher temperature than the air stream and heat flows naturally from a higher temperature entity to a lower temperature entity. The liquid water droplets in this case would be exhausted along with the exhaust air stream 16E and may subsequently fall and be deposited on the frozen surface 15 on the upper side of the floating ice sheet 2. After deposition the liquid water may subsequently freeze and add to the thickness of the floating ice sheet 2, in this alternative or variant.

Figure 1B:
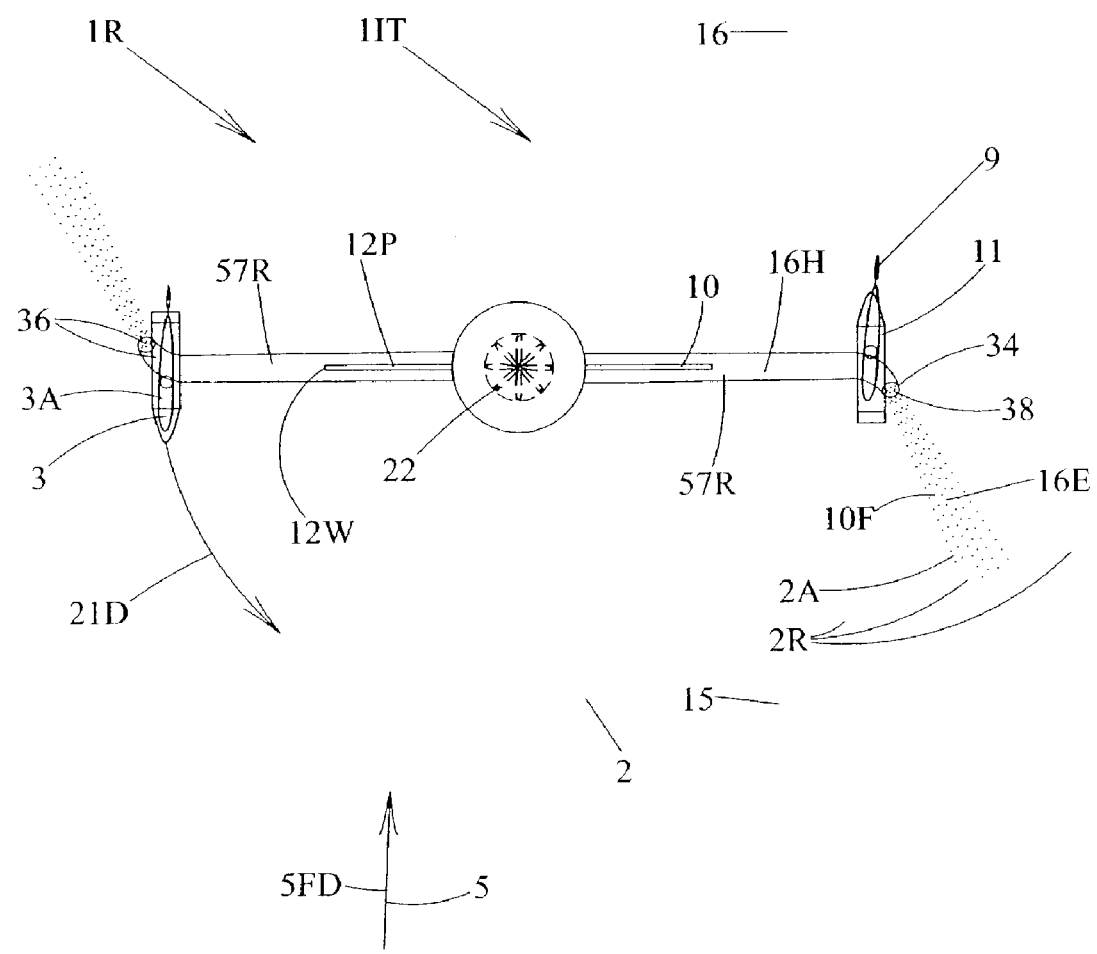
FIG. 1B shows a plan view of the preferred embodiment of FIG. 1A.

FIG. 1B shows a plan view of the preferred embodiment of FIG. 1A. The air current or wind 5 is shown with a flow direction 5FD. Note that the airfoil or wind foil means 3A that are controlled in orientation by control system means 9 are intended to vary their orientations and angles of attack so as to help drive rotation of the radial arms 57R in rotational direction 21D.

The embodiment of FIGS. 1A and 1B therefore illustrates a renewable thermal energy harvesting system 1R near a floating ice sheet 2, comprising:

water intake means 8 for admitting liquid water 10 sourced from below an undersurface 91 of said floating ice sheet 2;

air intake means 14 for admitting air 16 sourced from above said floating ice sheet 2, said air 16 being at below water freezing temperature;

air heating means 30 for utilizing thermal energy transfer from said liquid water 10 to said air 16, to produce a heated air stream 16H; and mechanical energy generation means 34 for harvesting some mechanical energy from said heated air stream 16H and for exhausting an exhaust air stream 16E.

Note that the exhaust air stream 16E is above the floating ice sheet 2. Note also that said floating ice sheet comprises frozen $H_2O$ and may also comprise other substances in minority portions; and that the frozen water may comprise any or all of ice, snow, slush, water with frazil ice and/or ice pancakes and/or nilas ice and/or columnar ice, sea ice, ice with surface frost flowers, sleet particles, hailstones, ice with surface pressure ridges (unless they are too tall), ice floes, porridge ice, black ice, pack ice, lake ice, ice with melt ponds, and liquid water with any combinations of these frozen particles.

Note also that the temperature of the heated air stream 16H is greater than the temperature of said air 16 immediately downstream of the air intake means 14.

The embodiment of FIGS. 1A and 1B also illustrates a renewable thermal energy harvesting system 1R comprising a thermodynamic engine near a floating ice sheet 2, including in combination:

air intake means 14 for admitting air 16 sourced from a level above said floating ice sheet 2, said air 16 being at below water freezing temperature;

air compression means 22 for compressing said air 16 from said air intake means 14 to produce a compressed air stream 16C, said compressed air stream 16C being at below water freezing temperature;

air heating means 30 for utilizing thermal energy transfer from liquid water 10 sourced from below an undersurface 91 of said floating ice sheet 2, to said compressed air stream 16C, to produce a heated air stream 16H; and mechanical energy generation means 34 for harvesting some mechanical energy from said heated air stream 16H and for exhausting an exhaust air stream 16E.

The thermodynamic engine may involve a substantially Brayton cycle engine as illustrated, and alternative thermodynamic cycles will be presented subsequently.

The embodiment of FIGS. 1A and 1B also illustrates a renewable thermal energy harvesting system 1R, wherein said liquid water 10 is at a temperature at least equal to water-freezing-temperature. Note that the water-freezing-temperature may be slightly below 0 degrees Celsius, for salt water situations.

The embodiment of FIGS. 1A and 1B also illustrates a floating ice sheet thickening system HT for a floating ice sheet 2, comprising:

air heating means 30 for utilizing thermal energy transfer from liquid water 10 sourced from below an undersurface 91 of said floating ice sheet 2, to air 16 sourced from above said floating ice sheet 2, said air 16 being at below water freezing temperature;

wherein said air heating means 30 utilizes some heat of solidification of at least some portion of said liquid water 10 being converted to frozen water 10F;

wherein said frozen water 10F acts towards increasing the frozen thickness 2FT of at least some region 2R of said floating ice sheet 2; and further comprising renewable energy transmission means 42R for transmitting a flow of renewable energy from energy harvesting means 25 for harvesting renewable energy, to contribute power to a subsystem 1SS of said floating ice sheet thickening system 1IT that comprises at least one of air compression means 22 and a water pump 12 and a working fluid pump 12F.

The embodiment of FIGS. 1A and 1B also illustrates a renewable thermal energy harvesting system 1R, further comprising air compression means 22 between said air intake means 14 and said air heating means 30, for compressing said air 16 from said air intake means 14 to produce a compressed air stream 16C, said compressed air stream 16C being at below water freezing temperature, and said heated air stream 16H being heated to a temperature that is greater than the temperature of said compressed air stream 16C.

The embodiment of FIGS. 1A and 1B also illustrates a renewable thermal energy harvesting system 1R, wherein said air heating means 30 for utilizing thermal energy transfer from said liquid water 10 to said air 16, utilizes some heat of solidification of at least some portion of said liquid water 10 being converted to frozen water 10F.

The embodiment of FIGS. 1A and 1B also illustrates a renewable thermal energy harvesting system 1R, wherein said frozen water 10E includes at least one of ice particles and snow particles and sleet particles and hail stones, wherein said frozen water 10F is carried by said exhaust air stream 16E to a location 2A above said floating ice sheet 2, and wherein said frozen water 10F from said location 2A above said floating ice sheet 2, is deposited by gravitational force so as to effectively increase the frozen thickness 2FT of at least some region 2R of said floating ice sheet 2.

Note that the region 2R where the frozen thickness 2FT is effectively increased, can be expansive in area due to (i) carriage of frozen snow or ice particles by winds and gusts while they are in the air after being exhausted to location 2A, due to (ii) carriage of frozen snow or ice particles located on the surface of the floating ice sheet 2, also driven by winds and gusts, (iii) carriage of frozen snow or ice particles located on the surface of the floating ice sheet 2 motivated by gravity force when the surface has even a slight slope, and (iv) movement of frozen snow or ice particles by other forces such as ice dynamics driven by currents in the liquid water 10 below the floating ice sheet 2.

The embodiment of FIGS. 1A and 1B also illustrates a renewable thermal energy harvesting system 1R, wherein said water intake means 8 for admitting liquid water 10 includes at least one water inlet orifice 8IO located substantially below said floating ice sheet, and wherein liquid water 10 admitted through said water intake means 8 can subsequently flow through at least one water pump 12 and at least one of a water pipe and tube and hose 12P.

The embodiment of FIGS. 1A and 1B also illustrates a renewable thermal energy harvesting system 1R, wherein said floating ice sheet 2 comprises at least one of a floating ice shelf and a floating ice sheet on the surface of at least one of an ocean, a sea, a bay, a gulf, an inlet, a sound, a strait, a channel, an estuary, a lake, a reservoir, a pond, a river, a stream, a brook, a creek or a canal.

Note that the floating ice sheet 2 could include one or more of ice, sea ice, pack ice, lake ice, snow, slush, frazil ice, ice pancakes, nilas ice, columnar ice, ice with surface frost flowers, ice with surface pressure ridges not excessively large, ice floes, porridge ice, black ice and any combinations of these. Some representative geographic locations for this type of embodiment include floating ice sheets (e.g., ice shelves or sea ice in the Arctic Ocean and North Atlantic and North Pacific Oceans and associated Seas; and South Atlantic and South Indian and South Pacific Oceans and associated Seas) off the shores of Northern Canada, Northern Russia, Kalaallit Nunaat (Greenland), Iceland, Norway, Spitzbergen, and Antarctica; and floating ice sheets on the surfaces of lakes, reservoirs, ponds, rivers, canals and other water bodies that freeze solid in wintertime such as parts of the Great Lakes (Superior, Michigan, Huron, etc), Lake of the Woods, Teshekpuk Lake, Elson Lagoon, Simpson Lagoon, Beaufort Lagoon, Great Bear Lake, Great Slave Lake, Lake Athabasca, Lake Winnipeg, Lake Nipigon, L. Vanern, L. Oulujarvi, Lake Ladoga, Lake Onega, Mackenzie River, St. Lawrence River, Ob River, Yenisey River, and Lena River. Some specific ice shelf locations around Antarctica include the following ice shelves: Ross, Wrigley, Abbot, Larsen, Ronne, Riiser-Larsen, Amery, West, Shackleton, and Vojejkov ice shelves. The above recitation of candidate locations is meant to be representative and should not be construed as limiting.

The embodiment of FIGS. 1A and 1B also illustrates a renewable thermal energy harvesting system 1R, wherein said air compression means 22 comprises at least one of centrifugal compression means, centrifugal compression means using an air pipe which is rotating around a hub, an axial flow compressor, compression means using motion of a piston in a cylinder, and other compression means utilizing a substantially variable enclosed volume.

In the illustrated embodiment the illustrated compression means 22 comprises a hybrid axial and centrifugal compressor, as illustrated, and additional compression is also provided by natural centrifugal force effects in the radial arms 57R as the rotate around the hub 53H. The axial compressor fan and centrifugal compressor disc may be driven by a gear train from motion of the radial arms around the hub, or by an electric motor, or by rigid connection to the rotating radial arms assembly. In variant embodiments clearly different combinations and variations of compression means could be used, within the spirit and scope of the invention.

The embodiment of FIGS. 1A and 1B also illustrates a renewable thermal energy harvesting system 1R, wherein said air heating means 30 comprises watering means 12W for at least one of streaming and spraying and dripping and misting and pumping and injecting and delivering through nucleator nozzles, said liquid water 10 from said water intake means 8, into said air 16.

Note that a variety of spray nozzles, dripping and misting and injector means, nucleator nozzles, heated nozzles to prevent freezing, fan blown nozzles and similar devices are known from the prior art of artificial snow making machines, shower heads, low water shower heads, lawn sprinklers and drippers, misting devices and fuel injectors for engines; and that selections and combinations of such devices can be beneficially applied in this and other embodiments of the present invention. The injection of the liquid water in some embodiments utilizes at least one of a water stream orifice, a water spray array of orifices, water mist generation means and water droplet generation means.

The embodiment of FIGS. 1A and 1B also illustrates a renewable thermal energy harvesting system 1R, further comprising at least one radial arm 57R that can rotate around a hub 53H at least partially supported by said floating ice sheet 2, wherein said water intake means 8 is connected to said hub 53H by at least one of a water pipe and tube and hose 12P penetrating through said floating ice sheet 2, further comprising at least one exhaust nozzle 36 terminating in exhaust orifice means 38 for exhausting said exhaust air stream 16E along with particles of said frozen water 10F, wherein said exhaust orifice means 38 is located on said radial arm 57R at a radially spaced distance from the center of rotation of said radial arm 57R and is angularly oriented such that the exhaust air stream 16E generates some thrust force acting to rotate said radial arm 57R around said hub 53H, and wherein said mechanical energy generation means 34 comprises use of said thrust force to rotate said radial arm 57R around said hub 53H and thereby generate rotational mechanical energy.

The embodiment of FIGS. 1A and 1B also illustrates a renewable thermal energy harvesting system 1R, further comprising support runner means 11 for contributing to supporting said radial arm 57R above said floating ice sheet 2 and for permitting low friction motion of said radial arm 57R over the floating ice sheet 2, and wherein the presence of said floating ice sheet 2 serves as friction-reducing means for reducing frictional forces that act to oppose movement of said radial arm 57R, relative to an alternate condition wherein said floating ice sheet 2 is absent.

Note that the support runner means 11 sliding on the surface of the floating ice sheet 2, which may be an ice and/or snow surface typically, enables low friction motion by mechanisms well understood from the prior art of ice and snow runners, skates and skis. For example, it is well understood that a skate blade by exerting a high amount of local pressure directly under the blade, causes generation of a film of liquid water locally that lubricates its motion, taking advantage of a peculiarity of H2O that when solid H2O is subject to sufficiently high pressure, it melts even at what would be sub-freezing temperatures at atmospheric pressure.

The embodiment of FIGS. 1A and 1B also illustrates a renewable thermal energy harvesting system 1R, further comprising at least one of:
(i) a solar energy harvesting subsystem 1S and
(ii) a wind energy harvesting subsystem 1W,
which wind energy harvesting subsystem 1W comprises:
fluid-foil means 3 for interfacing with an air current 5 when said air current 5 exists and carries wind energy in the form of fluid-dynamic kinetic energy, which fluid-foil means 3 can execute substantially periodic motion; and
energy harvesting means 25 for converting a portion of said fluid-dynamic kinetic energy into net work on said fluid-foil means 3 over the course of a cycle of said substantially periodic motion, by utilizing fluid-dynamic forces acting on said fluid-foil means 3 to contribute to driving said substantially periodic motion;
and wherein said energy harvesting means 25 further includes energy conversion means 27 for converting at least some of said net work into usable energy in a desired form In the illustrated embodiment the air current 5 comprises an air current or wind; the renewable energy as fluid-dynamic kinetic energy comprises air current or wind energy, and the fluid-foil means comprise airfoil or wind foil means 3A such as wings (shown) or sails (not shown), for example. The airfoil or wind foil means 3A may optionally include airfoil members that include inflatable elements capable of being inflated with lighter-than-air (e.g., lifting) gas, to reduce load and friction on said support runner means 11.

The embodiment of FIGS. 1A and 1B also illustrates a renewable thermal energy harvesting system 1R, wherein said energy harvesting means 25 further comprises control system means 9 (such as the illustrated actuated control surfaces in FIG. 1B) capable of controlling time-variable orientations of said fluid-foil means 3 relative to near flow fields of said air current 5 when said air current 5 exists and carries wind energy in the form of fluid-dynamic kinetic energy; and wherein said energy conversion means 27 comprises generator means 27G for converting at least one of said mechanical energy, and said net work creating incremental mechanical energy, into electrical energy.

The embodiment of FIGS. 1A and 1B also illustrates a renewable thermal energy harvesting system 1R, further comprising
fluid-foil means 3 for interfacing with an air current 5 which fluid-foil means 3 is connected to the radial arm 57R and can execute substantially periodic motion as said radial arm 57R rotates around said hub 53H;
energy harvesting means 25 including control system means 9 capable of controlling time-variable orientations of said fluid-foil means 3 relative to near flow fields of said air current 5 when said air current 5 exists and carries wind energy in the form of fluid-dynamic kinetic energy, for converting a portion of said fluid-dynamic kinetic energy into net work on said fluid-foil means 3 over the course of a cycle of said substantially periodic motion, by utilizing time-variable fluid-dynamic forces acting on said fluid-foil means 3 at said time-variable orientations to contribute to driving said substantially periodic motion;

and wherein said energy harvesting means 25 further includes energy conversion means 27 for converting at least some of said net work into usable energy in a desired form.

A wide variety of materials may be appropriate for use in the construction of various parts and subsystems of the renewable thermal energy harvesting system 1R, including composite materials (e.g., fiberglass, carbon-epoxy composites, ply-tailored composites with variable modulus and orientation fibers and variable resin systems, etc.), metallic materials (e.g., marine-treated steel, aluminum, etc.), fabrics, natural materials (e.g., wood, jute fibers, bamboo, etc.) and fastened and/or bonded multi-material structures. Surface coatings and treatments to minimize corrosion, wear and damage can be beneficially used, as known from the prior art for cold weather and marine environment engineered devices and systems.

Figure 1C:
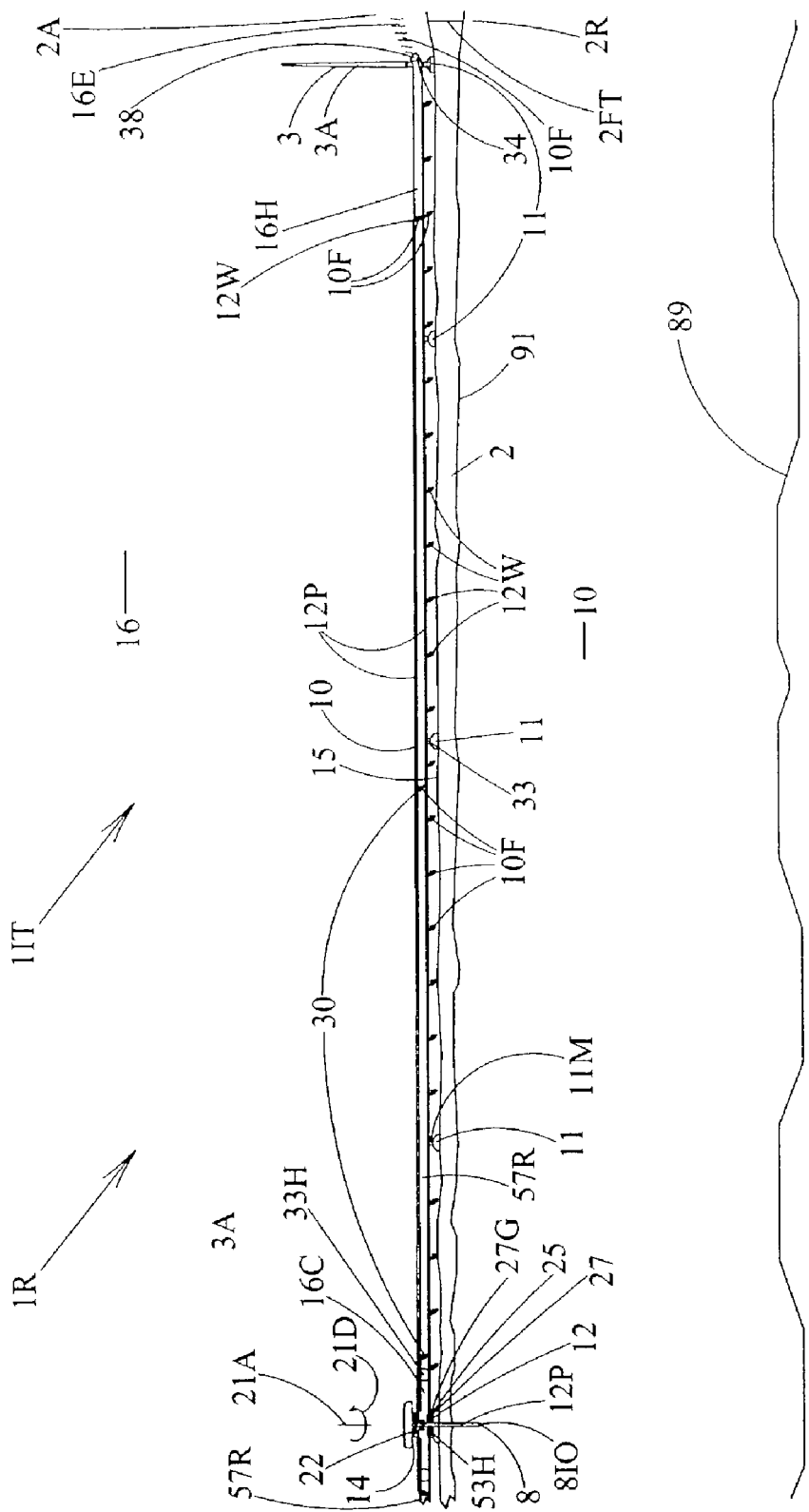
FIG. 1C shows a partial side view of a preferred embodiment of a renewable thermal energy harvesting system.

FIG. 1C shows a partial side view of a preferred embodiment of a renewable thermal energy harvesting system 1R, that is related to the embodiment shown in FIG. 1A. The renewable thermal energy harvesting system 1R is sited on a floating ice sheet 2, such as sea ice in high latitude regions such as the Arctic or Antarctic, or ice shelves or lake ice or other floating ice. The floating ice sheet 2 floats on a layer of liquid water 10 that rests on a ground surface 89. The top of the floating ice sheet 2 is defined by a frozen surface 15, and the bottom of the floating ice sheet 2 is defined by an ice/water interface comprising the undersurface 91 of the floating ice sheet. The radial arms 57R are supported on the frozen surface 15 of the floating ice sheet 2, by support runner means 11 that may comprise at least one of a ski, a skate, a runner and buoyant runner means. As illustrated, in the embodiment of FIG. 1C, the radial arm 57R is now much more elongated, and is supported by more than one support runner means 11 on this account. The radial arm 57R is also fitted with hinge means 33H for permitting the radial arm 57R to rotate slightly under at least one of dynamic and static loading, as for instance resulting from one or more of the support runner means 11 traversing bumps or hollows on the frozen surface 15 on the upper side of the floating ice sheet 2. One or more of the support runner means 11 may be fitted with suspension element(s) 33 in the connection between said support runner means 11 and the radial arm 57R. Such suspension element(s) 33 also facilitate movement of the radial arm 57R over bumps or hollows on the frozen surface 15 on the upper side of the floating ice sheet 2, without resulting excessive vertical loads on the structure of said radial arm 57R. One or more of the support runner means 11 may be attached to said radial arm 57R via movable attachment means 11M for permitting radial movement of said support runner means 11 relative to said radial arm 57R, for instance to gradually pack down snow over the frozen surface 15 by gradually inscribing a spiral path over the frozen surface 15. The movable attachment means may be powered by a variety of optional actuation means known from the prior art, such as an electric motor driving a worm gear or chain drive, for instance.

The radial arm 57R now carries an additional member of at least one of a water pipe and tube and hose 12P below the radial arm 57R, in addition to the at least one of a water pipe and tube and hose 12P above the radial arm 57R. The at least one of a water pipe and tube and hose 12P below the radial arm 57R, now carries liquid water 10 which is subsequently transmitted through plural watering means 12W for at least one of streaming and spraying and dripping and misting and pumping and injecting and delivering through nucleator nozzles (which may provide a mist of small nucleii such as dust particles on which water can freeze to build ice crystals), said liquid water 10 into the air 16 immediately below said radial arm 57R, whereupon some or all of said liquid water may freeze and become frozen water 10F, as illustrated. The liquid water 10 and/or frozen water 10F falls by gravity upon the frozen surface 15, and whether it is liquid or frozen when it deposits on the frozen surface 15, this water will subsequently freeze due to the prevailing subfreezing air temperature, and thus ultimately add to the frozen thickness of the floating ice sheet 2 under the circular disc area swept by the rotation of the radial arm 57R around the axis of rotation 21A in direction of rotation 21D. This feature is functionally similar to the watering or irrigation of a large circular disc area by prior art center-pivot sprinkler systems for farms known from the prior art, with some prior art center-pivot sprinkler systems with low energy precision application watering nozzles, covering disc areas with a radius of a half mile. As in the embodiment of FIG. 1A, the at least one of a water pipe and tube and hose 12P above the radial arm 57R, carries liquid water 10 which is subsequently transmitted through plural watering means 12W for at least one of streaming and spraying and dripping and misting and pumping and injecting and delivering through nucleator nozzles, said liquid water 10 into the air flowing in the radial arm 57R. For example, the liquid water 10 on encountering the below-water-freezing temperature compressed air stream 16C, at least in part freezes into frozen water 10F, in the process releasing some heat of solidification of at least some portion of said liquid water 10 being converted to frozen water 10F, to serve as air heating means 30 for utilizing thermal energy transfer from said liquid water 10 to said air, to produce a heated air stream 16H.

The illustrated renewable thermal energy harvesting system 1R illustrated in FIG. 1C is intended to harvest two types of renewable energy: the first being renewable thermal energy using a thermodynamic cycle engine that exploits a temperature difference between liquid water 10 below the floating ice sheet 2 that is substantially at the freezing temperature of water (0 degrees C. or slightly lower for salt water), and colder air 16 above the floating ice sheet 2; and the second being renewable wind energy that induces aerodynamic forces on airfoil or wind foil means 3A.

The thermodynamic cycle engine utilizes air 16 flowing into air intake means 14, then through air compression means 22, then through air heating means 30 in a radial arm 57R to create a heated air stream 16H, and finally through exhaust orifice means 38 to produce an exhaust air stream 16E that is so oriented as to produce a thrust force on the radial arm 57R that acts to rotate the radial arm around a hub 53H, causing the rotating assembly with both radial arms 57R to together rotate around axis 21A in a rotational direction 21D. The use of the oriented exhaust air stream 16E to produce a thrust force on the radial arm 57R, serves as mechanical energy generation means 34. Again, the innovative air heating means 30 that is provided, comprises at least one of dripping or spraying or injecting liquid water 10 into the cold air stream, whereupon at least some of the liquid water droplets freeze and become frozen water 10F, and the accompanying release of the water's heat of solidification contributes heat to heat the air stream and power the thermodynamic cycle engine. Note that the liquid water 10 dripped or sprayed or injected acts as means for heating the air both (i) because it is at a higher temperature than the air stream and heat flows naturally from a higher temperature entity to a lower temperature entity, and (ii) because many or, all of the liquid water droplets will freeze on contact with the cold subfreezing temperature air, and whilst freezing will release the heat of solidification of water into the air stream. The frozen water particles which may be in the form or snow crystals or ice crystals, are preferably blown out through the exhaust orifice means 38 carried along with the exhaust air stream 16E, as illustrated. The liquid water 10 that is dripped or sprayed or injected, is sourced from below the floating ice sheet 2 through water intake means 8 here comprising a water inlet orifice 8IO, and is transported via at least one of a water pipe and tube and hose 12P. A water pump 12 is used to pump the liquid water 10, which also flows through water flow encasing bearing means 12B for permitting encased water flow from a fixed pipe into a rotating pipe that is attached to the rotating radial arm 57R.

The renewable wind energy subsystem utilizes fluid-foil means 3 that comprise airfoil or wind-foil means 3A, that can be appropriately oriented relative to a wind or air stream direction and as a function of time and position, so as to also produce additional thrust force on the radial arm 57R that also acts to rotate the radial arm around the hub 53H.

As the radial arms 57R rotate around the nonrotating hub 53H, they drive energy harvesting means 25 here comprising generator means 27G for generating electricity from the rotational motion, as is known from many prior art generators. The electricity so generated can be transmitted, conditioned, processed or stored by means not shown in this Figure, so as not to unduly clutter the illustration. The generator means 27G can optionally be run with power in instead of power out, to serve as motor means for starting rotation of the radial arms 57R at the start of operation of the renewable thermal energy harvesting system 1R.

The illustrated renewable thermal energy harvesting system 1R also serves as a floating ice sheet thickening system 1IT, as the frozen water particles which may be in the form or snow crystals or ice crystals that are blown out through the exhaust orifice means 38 along with the exhaust air stream 16E, are subsequently deposited on the frozen surface 15 so as to effectively thicken the floating ice sheet 2. In the embodiment of FIG. 1C, the floating ice sheet thickening system 1IT further comprises the aforementioned addition of at least one of a water pipe and tube and hose 12P below the radial arm 57R, that also carries liquid water 10 which is subsequently transmitted through plural watering means 12W for at least one of streaming and spraying and dripping and misting and pumping and injecting and delivering through nucleator nozzles, said liquid water 10 into the air 16 immediately below said radial arm 57R, at least some of which thence freezes and becomes frozen water 10F, and subsequently falls by gravity upon the frozen surface 15, also adding to the frozen thickness of the floating ice sheet 2 under the circular disc area swept by the rotation of the radial arm 57R. Watering nozzles similar to prior-art low energy precision application nozzles used in some prior-art center-pivot sprinkler systems (some up to ½ mile in radius) for irrigating farm areas, could optionally be used. As the radial arm has distributed support on multiple support runners 11, it naturally tends to self-level and to rise upon the frozen surface 15 as the floating ice sheet 2 thickens gradually.

Figure 1D:
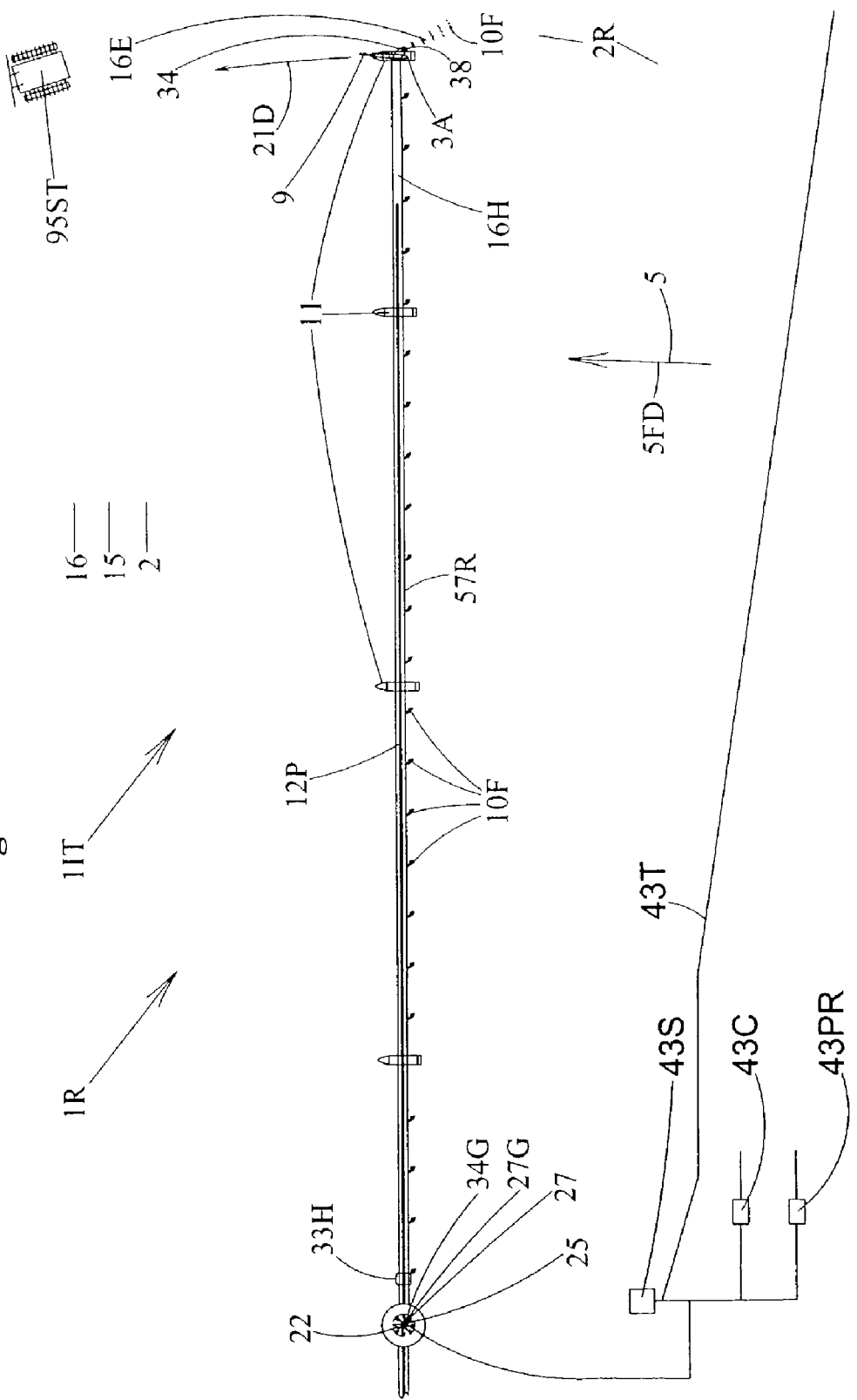
FIG. 1D shows a plan view of the preferred embodiment of FIG. 1C.

FIG. 1D shows a partial plan view of the preferred embodiment of FIG. 1C. In addition to illustrating the features described with reference to FIG. 1C, in plan view, FIG. 1D illustrates some additional items that were either not visible in the view of FIG. 1C, or not included in FIG. 1C as they would unduly clutter that illustration. The air current or wind 5 is shown with a flow direction 5FD. Note that the airfoil or wind foil means 3A that are controlled in orientation by control system means 9 are intended to vary their orientations and angles of attack so as to help drive rotation of the radial arms 57R in rotational direction 21D. While the illustrated embodiment has two radial arms 57R, in variant embodiments one or multiple radial arms could be furnished, within the spirit and scope of the invention. In still other variant embodiments, pairs of substantially parallel radial arms relatively closely spaced and connected by truss structure could be employed, to provide increased azimuthal bending strength of the structurally coupled radial arms subject to thrust loads near their outer extremities.

FIG. 1D also illustrates a renewable thermal energy harvesting system 1R, further comprising energy harvesting means 25 for harvesting renewable energy, which energy harvesting means 25 includes both said mechanical energy generation means 34 and at least one generator means 27G for converting some of said mechanical energy into electrical energy, and further comprising at least one of means for conditioning electrical energy 43C, means for processing electrical energy 43PR, means for transmitting electrical energy 43T, and means for storing electrical energy 43S. The at least one generator means 27G may include an electric generator 34G that generates electrical energy from rotary mechanical energy of a spinning device on bearings, as known from the prior art of electrical generators.

Note that the at least one of means for conditioning electrical energy 43C, means for processing electrical energy 43PR, means for transmitting electrical energy 43T, and means for storing electrical energy 43S, may optionally be located in one or more of (i) under the floating ice sheet 2 and/or (ii) imbedded in the floating ice sheet 2 and/or (iii) on the frozen surface 15 at the top of the frozen ice sheet 2 but capable of being traversed by the support runner means 11 if located in their ring of motion. Examples of means for storing energy 43S include battery and/or capacitor and/or nanotech capacitor means for storing electrical energy, mechanical means such as a flywheel, chemical means such as electrolysizing water to produce hydrogen, and energy storage as gravitational potential energy or in pressurized fluid. Examples of means for transmitting energy 43T include electrical wires and cables. Examples of means for processing energy 43PR include voltage converters, transformers, AC/DC converters, rectifiers, and similar processing and conversion devices known from the prior art. Examples of means for conditioning energy 43C include surge protectors, means for shaping and/or smoothing alternating currents, frequency and phase conditioners and similar conditioning devices known from the prior art.

In terms of options to transmit energy, while direct electrical distribution by electrical cable or superconducting cable is one preferred transmission means, more indirect options could utilize local production of hydrogen gas (H2) from electrolysis of water. The hydrogen can then be transported by pipeline(s) that go either underwater or supported on top of the floating ice sheet 2; or it can be temporarily stored in hydrogen tanks (either gaseous or cryogenic liquid or compounded as in hydrides) and then transported by a submarine underwater or a towed sled train on the floating ice sheet or a hydrogen filled airship or blimp, or a ship when the floating ice sheet melts in summer.

Finally, FIG. 1D also illustrates a multipurpose snow tractor 95ST, that can propel itself upon the frozen surface 15 comprising snow or ice or other frozen material. The multipurpose snow tractor 95ST can use a snow shovel blade (as shown) to redistribute and level additional frozen water 10F emanating from the renewable thermal energy harvesting system 1R and floating ice sheet thickening system 1IT. The multipurpose snow tractor 95ST could also help level down ice ridges. The multipurpose snow tractor 95ST could also transport control and maintenance personnel, and may be fitted with a bucket lift (not shown) for maintenance personnel to reach items needing maintenance. The multipurpose snow tractor 95ST could also optionally serve as a tow vehicle to tow parts or all of the renewable thermal energy harvesting system 1R and floating ice sheet thickening system 1IT for initial deployment at a desired site, or from one site to another.

Figure 2:
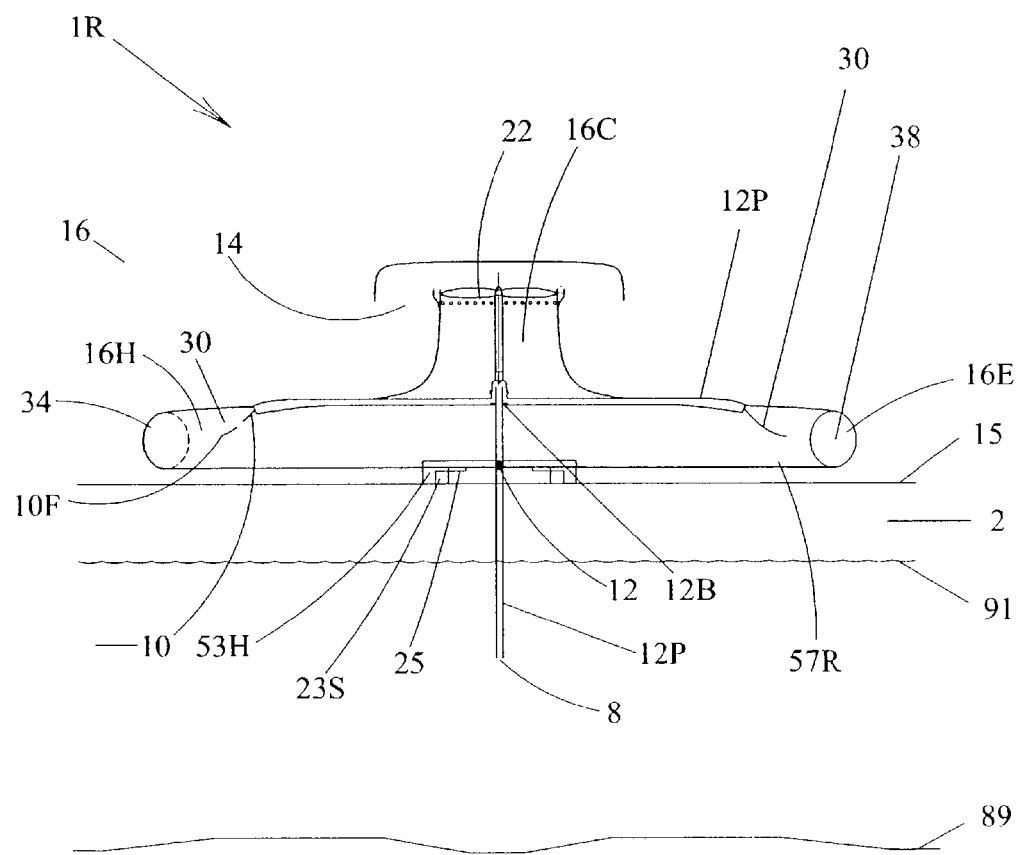
FIG. 2 shows a partial side view of one preferred embodiment of a renewable thermal energy harvesting system.

FIG. 2 shows a partial side view of another preferred embodiment of a renewable thermal energy harvesting system 1R. This embodiment has some similarities to the embodiment illustrated in FIG. 1A, but differs in several regards including the absence of the wind energy harvesting subsystem. The renewable thermal energy harvesting system 1R is sited on a floating ice sheet 2, such as sea ice in high latitude regions such as the Arctic or Antarctic, or ice shelves or lake ice or other floating ice. The floating ice sheet 2 floats on a layer of liquid water 10 that rests on a ground surface 89. The illustrated renewable thermal energy harvesting system 1R is supported at least in part by support means 23S adjacent the upper surface of the floating ice sheet 2, comprising a frozen surface 15. The lower surface of the floating ice sheet is designated 91 in this illustration. The illustrated renewable thermal energy harvesting system 1R is intended to harvest renewable thermal energy using a thermodynamic cycle engine that exploits a temperature difference between liquid water 10 below the floating ice sheet 2 that is substantially at the freezing temperature of water (0 degrees C. or slightly lower for salt water), and colder air 16 above the floating ice sheet 2.

The thermodynamic cycle engine utilizes air 16 flowing into air intake means 14, then through air compression means 22 to produce a compressed air stream 16C, then through air heating means 30 in a radial arm 57R to create a heated air stream 16H, and finally through exhaust orifice means 38 to produce an exhaust air stream 16E that is so oriented as to produce a thrust force on the radial arm 57R that acts to rotate the radial arm around a hub 53H, causing the rotating assembly with both radial arms 57R to together rotate. The use of the oriented exhaust air stream 16E produces a thrust force on the radial arm 57R. As the radial arms 57R rotate around the nonrotating hub 53H, they drive energy harvesting means 25. The innovative air heating means 30 that is provided, comprises at least one of dripping or spraying or injecting liquid water 10 into the cold air stream, whereupon at least some of the liquid water droplets freeze and become frozen water 10F, and the accompanying release of the water's heat of solidification contributes heat to heat the air stream and power the thermodynamic cycle engine. Note that the liquid water 10 dripped or sprayed or injected acts as means for heating the air both (i) because it is at a higher temperature than the air stream and heat flows naturally from a higher temperature entity to a lower temperature entity, and (ii) because many or all of the liquid water droplets will freeze on contact with the cold subfreezing temperature air, and whilst freezing will release the heat of solidification of water into the air stream. The frozen water particles which may be in the form or snow crystals or ice crystals, are preferably blown out through the exhaust orifice means 38 carried along with the exhaust air stream 16E, as illustrated. The liquid water 10 that is dripped or sprayed or injected, is sourced from below the floating ice sheet 2 through water intake means 8, and is transported via at least one of a water pipe and tube and hose 12P. A water pump 12 is used to pump the liquid water 10, which also flows through water flow encasing bearing means 12B for permitting encased water flow from a fixed pipe into a rotating pipe that is attached to the rotating radial arm 57R.

Figure 3A:
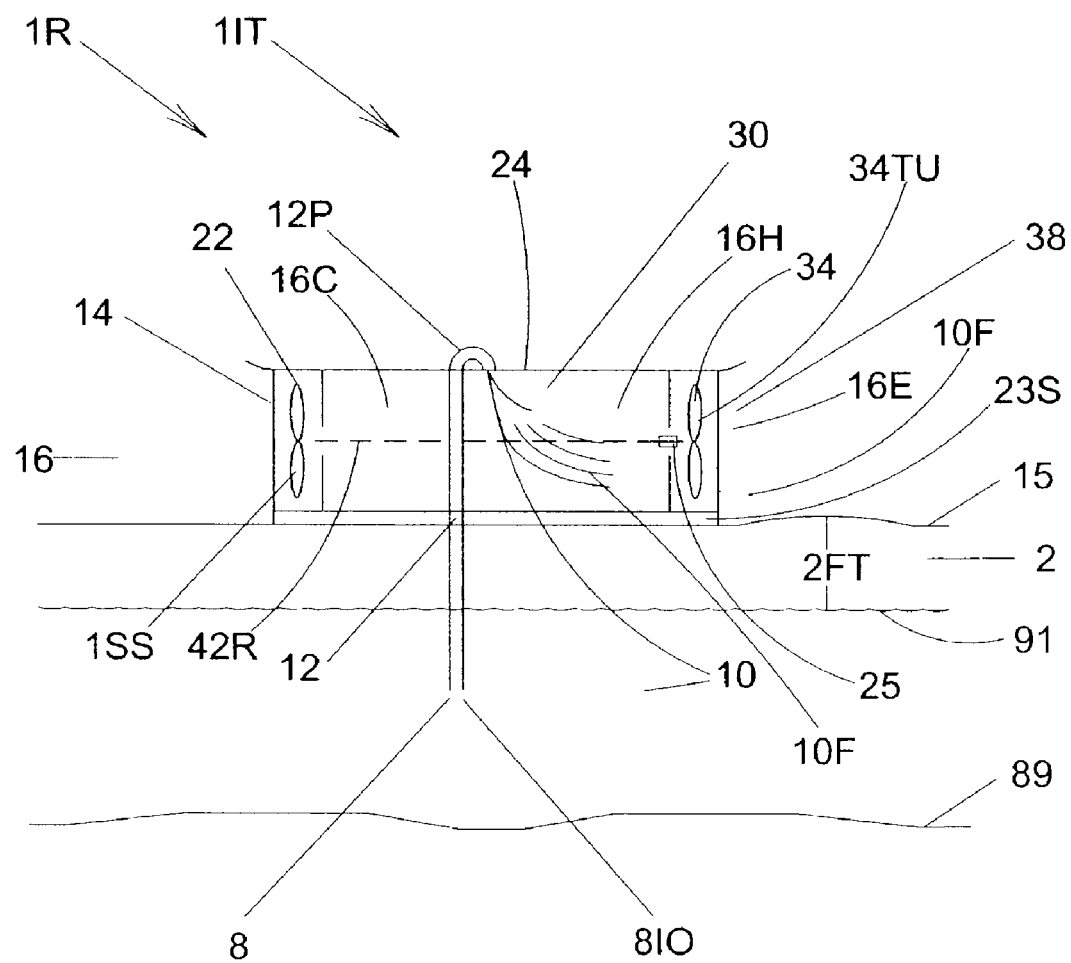
FIGS. 3A and 3B show partial side views of embodiments of a renewable thermal energy harvesting system with a substantially linear flow of air.
Figure 3B:
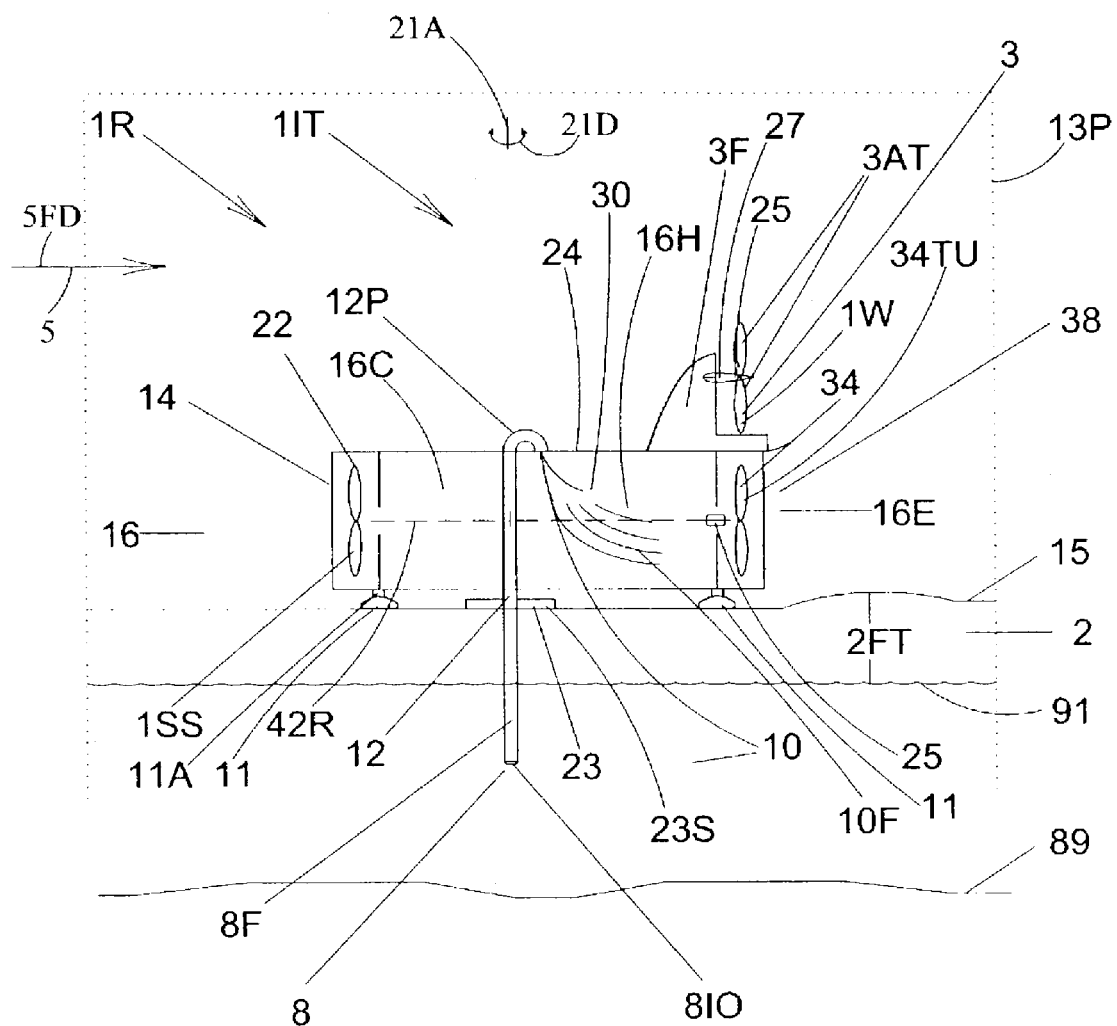

FIGS. 3A and 3B show partial side views of embodiments of a renewable thermal energy harvesting system with a substantially linear flow of air.

FIG. 3A shows a partial side view of another embodiment of a renewable thermal energy harvesting system 1R with a substantially linear flow of air 16 in a substantially linear air transport partial enclosure 24, as illustrated. The renewable thermal energy harvesting system 1R is sited on a floating ice sheet 2, such as sea ice in high latitude regions such as the Arctic or Antarctic, or ice shelves or lake ice or other floating ice. The floating ice sheet 2 floats on a layer of liquid water 10 that rests on a ground surface 89. The top of the floating ice sheet 2 is defined by a frozen surface 15, and the bottom of the floating ice sheet 2 is defined by an ice/water interface comprising the undersurface 91 of the floating ice sheet. The illustrated renewable thermal energy harvesting system 1R is supported at least in part by support means 23S adjacent the upper surface of the floating ice sheet 2. The illustrated renewable thermal energy harvesting system 1R is intended to harvest renewable thermal energy using a thermodynamic cycle engine that exploits a temperature difference between liquid water 10 below the floating ice sheet 2 that is substantially at the freezing temperature of water (0 degrees C. or slightly lower for salt water), and colder air 16 above the floating ice sheet 2.

The thermodynamic cycle engine utilizes air 16 flowing into air intake means 14, then through air compression means 22, then through air heating means 30 in the air transport partial enclosure 24 to create a heated air stream 16H, and through mechanical energy generation means 34 comprising turbine means 34TU, and finally through exhaust orifice means 38 to produce an exhaust air stream 16E. The air compression means 22 may use an axial compressor, centrifugal compressor, and/or other type of air compressor known from the prior art. The innovative air heating means 30 that is provided, comprises at least one of dripping or spraying or injecting liquid water 10 into the cold air stream, whereupon at least some of the liquid water droplets freeze and become frozen water 10F, and the accompanying release of the water's heat of solidification contributes heat to heat the air stream and power the thermodynamic cycle engine. Note that the liquid water 10 dripped or sprayed or injected acts as means for heating the air both (i) because it is at a higher temperature than the air stream and heat flows naturally from a higher temperature entity to a lower temperature entity, and (ii) because many or all of the liquid water droplets will freeze on contact with the cold subfreezing temperature air, and whilst freezing will release the heat of solidification of water into the air stream. The frozen water particles which may be in the form or snow crystals or ice crystals, are preferably blown out through the exhaust orifice means 38 carried along with the exhaust air stream 16E, as illustrated. The liquid water 10 that is dripped or sprayed or injected, is sourced from below the floating ice sheet 2 through water intake means 8 here comprising a water inlet orifice 8IO, and is transported via at least one of a water pipe and tube and hose 12P. A water pump 12 is used to pump the liquid water 10.

The turbine means 34TU drives energy harvesting means 25 here comprising generator means 27G for generating electricity from the rotational motion, as is known from many prior art generators. The turbine means 34TU also drives the air compression means 22 via a drive shaft 22D, as is known from prior art gas turbine engines.

The illustrated renewable thermal energy harvesting system 1R also serves as a floating ice sheet thickening system 1IT, as the frozen water particles which may be in the form or snow crystals or ice crystals that are blown out through the exhaust orifice means 38 along with the exhaust air stream 16E, are subsequently deposited on the frozen surface 15 so as to effectively thicken the floating ice sheet 2.

The embodiment of FIG. 3A therefore illustrates a renewable thermal energy harvesting system 1R near a floating ice sheet 2, comprising:

water intake means 8 for admitting liquid water 10 sourced from below an undersurface 91 of said floating ice sheet 2;

air intake means 14 for admitting air 16 sourced from above said floating ice sheet 2, said air 16 being at below water freezing temperature;

air heating means 30 for utilizing thermal energy transfer from said liquid water 10 to said air 16, to produce a heated air stream 16H; and mechanical energy generation means 34 for harvesting some mechanical energy from said heated air stream 16H and for exhausting an exhaust air stream 16E.

The embodiment of FIG. 3A also illustrates a renewable thermal energy harvesting system 1R comprising a thermodynamic engine near a floating ice sheet 2, including in combination:

air intake means 14 for admitting air 16 sourced from a level above said floating ice sheet 2, said air 16 being at below water freezing temperature;

air compression means 22 for compressing said air 16 from said air intake means 14 to produce a compressed air stream 16C, said compressed air stream 16C being at below water freezing temperature;

air heating means 30 for utilizing thermal energy transfer from liquid water 10 sourced from below an undersurface 91 of said floating ice sheet 2, to said compressed air stream 16C, to produce a heated air stream 16H; and mechanical energy generation means 34 for harvesting some mechanical energy from said heated air stream 16H and for exhausting an exhaust air stream 16E.

The embodiment of FIG. 3A also illustrates a floating ice sheet thickening system 1IT for a floating ice sheet 2, comprising:

air heating means 30 for utilizing thermal energy transfer from liquid water 10 sourced from below an undersurface 91 of said floating ice sheet 2, to air 16 sourced from above said floating ice sheet 2, said air 16 being at below water freezing temperature;

wherein said air heating means 30 utilizes some heat of solidification of at least some portion of said liquid water 10 being converted to frozen water 10F;

wherein said frozen water 10F acts towards increasing the frozen thickness 2FT of at least some region 2R of said floating ice sheet 2; and further comprising renewable energy transmission means 42R for transmitting a flow of renewable energy from energy harvesting means 25 for harvesting renewable energy, to contribute power to a subsystem 1SS of said floating ice sheet thickening system 1IT that comprises at least one of air compression means 22 and a water pump 12 and a working fluid pump 12F.

The embodiment of FIG. 3A also illustrates a renewable thermal energy harvesting system 1R, further comprising air compression means 22 between said air intake means 14 and said air heating means 30, for compressing said air 16 from said air intake means 14 to produce a compressed air stream 16C, said compressed air stream 16C being at below water freezing temperature, and said heated air stream 16H being heated to a temperature that is greater than the temperature of said compressed air stream 16C.

The embodiment of FIG. 3A also illustrates a renewable thermal energy harvesting system 1R, wherein said air heating means 30 for utilizing thermal energy transfer from said liquid water 10 to said air 16, utilizes some heat of solidification of at least some portion of said liquid water 10 being converted to frozen water 10F.

The embodiment of FIG. 3A also illustrates a renewable thermal energy harvesting system 1R, wherein said mechanical energy generation means 34 includes turbine means 34TU for harvesting some energy from said heated air stream 16H to generate some mechanical energy while exhausting said exhaust air stream 16E.

Note that the turbine means 34TU may comprise one or more of axial and other turbine types as are known from the prior art.

The embodiment of FIG. 3A also illustrates a renewable thermal energy harvesting system 1R, wherein said mechanical energy generation means 34 includes turbine means 34TU for harvesting some energy from said heated air stream 16H to generate some mechanical energy while exhausting said exhaust air stream 16E, and wherein at least a portion of said mechanical energy is utilized towards driving said air compression means 22.

The mechanical energy utilized towards driving the air compression means may utilize a rotating shaft connecting turbine and compressor elements as is known from the prior art of gas turbine engines, or may utilize intermediate energy transmission means such as an electric power cable, with electrical generator means on the turbine side and electric motor means on the compressor side.

The embodiment of FIG. 3A also illustrates a renewable thermal energy harvesting system 1R, wherein said renewable thermal energy harvesting system 1R acts as a floating ice sheet thickening system 1IT for a floating ice sheet 2;

wherein said air heating means 30 utilizes some heat of solidification of at least some portion of said liquid water 10 being converted to frozen water 10F;

wherein said frozen water 10F acts towards increasing the frozen thickness 2FT of at least some region 2R of said floating ice sheet 2;

further comprising energy harvesting means 25 for harvesting renewable energy, which energy harvesting means 25 includes said mechanical energy generation means 34; and further comprising renewable energy transmission means 42R for transmitting a flow of renewable energy from said energy harvesting means 25 to contribute power to a subsystem 1SS of said floating ice sheet thickening system 1IT that comprises at least one of air compression means 22 [as in this illustrated embodiment] and a water pump 12 and a working fluid pump 12F.

Finally, the embodiment of FIG. 3A also illustrates a floating ice sheet thickening system 1IT of claim 3, wherein said floating ice sheet thickening system 1IT acts as a renewable thermal energy harvesting system 1R;

further comprising air intake means 14 for admitting said air 16 sourced from a level above said floating ice sheet 2;

further comprising air compression means 22 for compressing said air 16 from said air intake means 14;

wherein said air heating means 30 acts on air downstream of said air compression means 22, to produce a heated air stream 16H;

and wherein said energy harvesting means 25 includes mechanical energy generation means 34 for harvesting some mechanical energy from said heated air stream 16H and for exhausting an exhaust air stream 16E, which exhaust air stream 16E carries with it at least some particles of said frozen water 10F.

FIG. 3B shows a partial side view of another embodiment of a renewable thermal energy harvesting system with a substantially linear flow of air. This embodiment is similar in some respects to the embodiment earlier illustrated in FIG. 3A.

The renewable thermal energy harvesting system 1R is now supported by support means 23 that serves as position-keeping means 23 for maintaining said renewable thermal energy harvesting system 1R within a positional envelope 13P relative to at least one of (i) said floating ice sheet 2 and (ii) a ground surface 89 beneath said floating ice sheet 2.

In the illustrated embodiment of FIG. 3B, the support means 23 affixes the renewable thermal energy harvesting system 1R to the floating ice sheet 2 such that the air transport partial enclosure 24 can rotate azimuthally in rotational directions 21D around an axis 21A, as illustrated, with the water feed pipe or hose or tube 8F optionally substantially aligned with this axis 21A. The air transport partial enclosure 24 is also supported by support runner means 11, to which it is connected via orientable attachment means 11A for attaching the support runner means 11. For normal operation, the support runner means 11 such as skis or skates or runners or combinations thereof, are oriented to permit low-friction rotation around axis 21A—in the view of this illustration the support runner means 11A have their longitudinal or running axis going into the page. With the air current or wind 5 having a flow direction 5FD from left to right on this view, as illustrated, the air transport partial enclosure 24 will naturally rotate azimuthally to the illustrated position, with a fin 3F locating itself in a downwind direction from both the support means 23 which preferably is fitted with azimuthal rotation permitting bearings, and the corresponding axis of rotation 21A. Close to and optionally connected to the fin 3F, is a wind turbine comprising wind turbine blades 3AT as known from the prior art, which wind turbine harvests some of the energy from the air current or wind 5, using energy harvesting means 25 preferably including a rotating-shaft driven electrical generator, as known from the prior art.

FIG. 3B further illustrates a renewable thermal energy harvesting system 1R of, further comprising at least one of:
(i) a solar energy harvesting subsystem 1S and
(ii) a wind energy harvesting subsystem 1W,
which wind energy harvesting subsystem 1W comprises:
fluid-foil means 3 (here the wind turbine blades 3AT) for interfacing with an air current 5 when said air current 5 exists and carries wind energy in the form of fluid-dynamic kinetic energy, which fluid-foil means 3 can execute substantially periodic motion; and
  energy harvesting means 25 for converting a portion of said fluid-dynamic kinetic energy into net work on said fluid-foil means 3 over the course of a cycle of said substantially periodic motion, by utilizing fluid-dynamic forces acting on said fluid-foil means 3 to contribute to driving said substantially periodic motion;
  and wherein said energy harvesting means 25 further includes energy conversion means 27 for converting at least some of said net work into usable energy in a desired form.

Thus the embodiment of FIG. 3B can capture renewable energy of two types, firstly renewable thermal energy using a thermodynamic engine exploiting a naturally occurring temperature difference between liquid water and cold air at sub-freezing temperature, and secondly renewable wind energy.

When it is desirable to relocate the embodiment of FIG. 3B, optional water feed pipe retraction means can pull up the water feed pipe or hose or tube 8F above the floating ice sheet 2, and the support means 23 can similarly be retracted. Then the support runner means 11 can be set at desired orientations through the orientable attachment means 11A for attaching the support runner means 11, and the renewable thermal energy harvesting system 1R can be relocated to another location, as desired, optionally through use of tow vehicle such as a snow or ice tractor.

FIGS. 4A through 4D show partial side views of embodiments of a renewable thermal energy harvesting system with water to air heat transfer below a floating ice sheet.

Figure 4A:
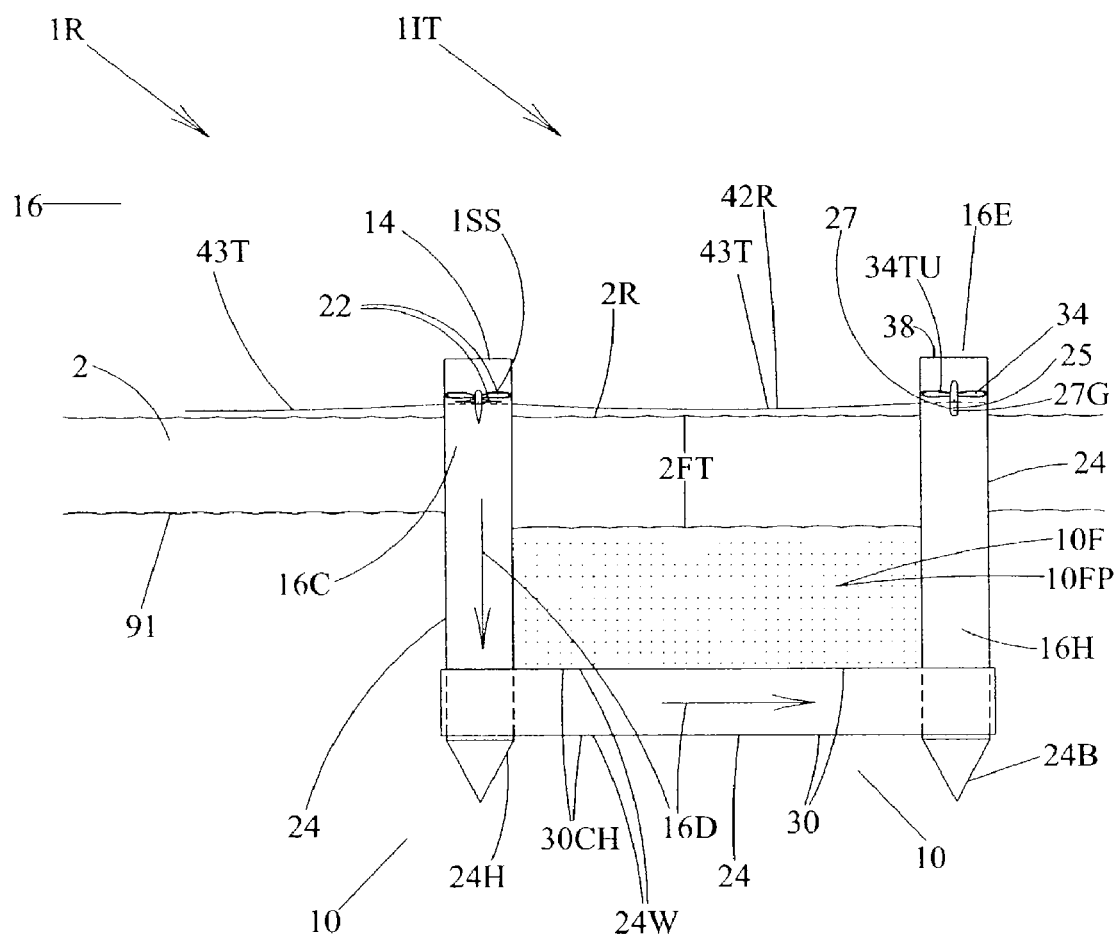

FIG. 4A shows a renewable energy harvesting system 1R showing air transport partial enclosures 24 arranged in the form or a "U" with two substantially vertical elements and a connecting bottom substantially horizontal element, as illustrated. Cold air 16 at a temperature below the freezing temperature of water, is sourced from above a floating ice sheet 2, then flows through the aforementioned "U" shaped air transport partial enclosure 24 in flow direction 16D, while getting compressed by compression means 22 to create a compressed air stream 16C, then heated by conductive heat transfer from the liquid water 10 below the floating ice sheet 2, which liquid water 10 surrounds the bottom part of the "U", to create a heated air stream 16H, which then flows up the other substantially vertical leg of the "U" to then drive turbine means 34TU before exiting back into the atmosphere as an exhaust air stream 16E. The turbine means 34TU powers energy harvesting means 25 preferably including energy conversion means 27 including generator means 27G for generating electricity. Thus this apparatus functions substantially as a Brayton thermodynamic cycle powerplant, with liquid water as the heat source. Some of the energy harvested by the energy harvesting means 25 is used to power the compression means 22, with the balance available for useful purposes such as transmission as electricity.

The embodiment of FIG. 4A thus illustrates a renewable thermal energy harvesting system 1R comprising a thermodynamic engine near a floating ice sheet 2, including in combination:
air intake means 14 for admitting air 16 sourced from a level above said floating ice sheet 2, said air 16 being at below water freezing temperature;
air compression means 22 for compressing said air 16 from said air intake means 14 to produce a compressed air stream 16C, said compressed air stream 16C being at below water freezing temperature; air heating means 30 for utilizing thermal energy transfer from liquid water 10 sourced from below an undersurface 91 of said floating ice sheet 2, to said compressed air stream 16C, to produce a heated air stream 16H; and
mechanical energy generation means 34 for harvesting some mechanical energy from said heated air stream 16H and for exhausting an exhaust air stream 16E.

The embodiment of FIG. 4A also illustrates a renewable thermal energy harvesting system 1R, wherein said air heating means 30 includes at least one of (i) heat exchanger means 30HE for transferring heat from said liquid water 10 to said compressed air stream 10C, and (ii) (illustrated) conductive heat transfer means 30CH through a wall 24W of an air transport partial enclosure 24 that transports said compressed air stream 10C below said floating ice sheet 2, with liquid water 10 contacting at least one of said wall of said air transport partial enclosure 24 and a wall of a heat conducting structure 24H connecting to said wall 24W of said air transport partial enclosure 24.

While a substantially rigid air transport partial enclosure 24 is illustrated, in alternate embodiments the air transport partial enclosure can include underwater inflated flexible bag or tube sub-elements.

The embodiment of FIG. 4A also illustrates a renewable thermal energy harvesting system 1R, further comprising air compression means 22 between said air intake means 14 and said air heating means 30, for compressing said air 16 from said air intake means 14 to produce a compressed air stream 16C, said compressed air stream 16C being at below water freezing temperature, and said heated air stream 16H being heated to a temperature that is greater than the temperature of said compressed air stream 16C.

The embodiment of FIG. 4A also illustrates a renewable thermal energy harvesting system 1R, wherein said air heating means 30 for utilizing thermal energy transfer from said liquid water 10 to said air 16, utilizes some heat of solidification of at least some portion of said liquid water 10 being converted to frozen water 10F.

The embodiment of FIG. 4A also illustrates a renewable thermal energy harvesting system 1R, wherein said mechanical energy generation means 34 includes turbine means 34TU for harvesting some energy from said heated air stream 16H to generate some mechanical energy while exhausting said exhaust air stream 16E.

Note that the turbine means 34TU may comprise one or more of axial and other turbine types as are known from the prior art.

The embodiment of FIG. 4A also illustrates a renewable thermal energy harvesting system 1R, wherein said mechanical energy generation means 34 includes turbine means 34TU for harvesting some energy from said heated air stream 16H to generate some mechanical energy while exhausting said exhaust air stream 16E, and wherein at least a portion of said mechanical energy is utilized towards driving said air compression means 22.

The mechanical energy utilized towards driving the air compression means may utilize intermediate energy transmission means such as an electric power cable, with electrical generator means on the turbine side and electric motor means on the compressor side.

The embodiment of FIG. 4A also illustrates a renewable thermal energy harvesting system 1R, wherein said renewable thermal energy harvesting system 1R acts as a floating ice sheet thickening system 1IT for a floating ice sheet 2;
wherein said air heating means 30 utilizes some heat of solidification of at least some portion of said liquid water 10 being converted to frozen water 10F;
wherein said frozen water 10F acts towards increasing the frozen thickness 2FT of at least some region 2R of said floating ice sheet 2;
further comprising energy harvesting means 25 for harvesting renewable energy, which energy harvesting means 25 includes said mechanical energy generation means 34; and
further comprising renewable energy transmission means 42R for transmitting a flow of renewable energy from said energy harvesting means 25 to contribute power to a subsystem 1SS of said floating ice sheet thickening system 1IT that comprises at least one of air compression means 22 [as in this illustrated embodiment] and a water pump 12 and a working fluid pump 12F.

The embodiment of FIG. 4A also illustrates a floating ice sheet thickening system HT for a floating ice sheet 2, comprising:
air heating means 30 for utilizing thermal energy transfer from liquid water 10 sourced from below an undersurface 91 of said floating ice sheet 2, to air 16 sourced from above said floating ice sheet 2, said air 16 being at below water freezing temperature;
wherein said air heating means 30 utilizes some heat of solidification of at least some portion of said liquid water 10 being converted to frozen water 10F (comprising frozen water particles 10FP from the outer wetted surface of the underwater portion of the air transport partial enclosure 24 in the illustrated embodiment);
wherein said frozen water 10F acts towards increasing the frozen thickness 2FT of at least some region 2R of said floating ice sheet 2; and
further comprising renewable energy transmission means 42R for transmitting a flow of renewable energy from energy harvesting means 25 for harvesting renewable energy, to contribute power to a subsystem 1SS of said floating ice sheet thickening system HT that comprises at least one of air compression means 22 (as illustrated in this embodiment) and a water pump 12 and a working fluid pump 12F.

Note that in the construction of the "U" shaped air transport partial enclosure 24, one optional approach is for the substantially vertical legs to be inserted down from above the floating ice sheet 2, through pre-drilled holes in the ice sheet or by incorporation of drill bit with local heat-to-melt elements at the bottom ends 24B of these substantially vertical elements; and subsequently mating the substantially horizontal element which is brought to site by an underwater tow vehicle such as a robotic submarine, and assembled to the vertical elements in situ, optionally by the same robotic submarine.

Figure 4B:
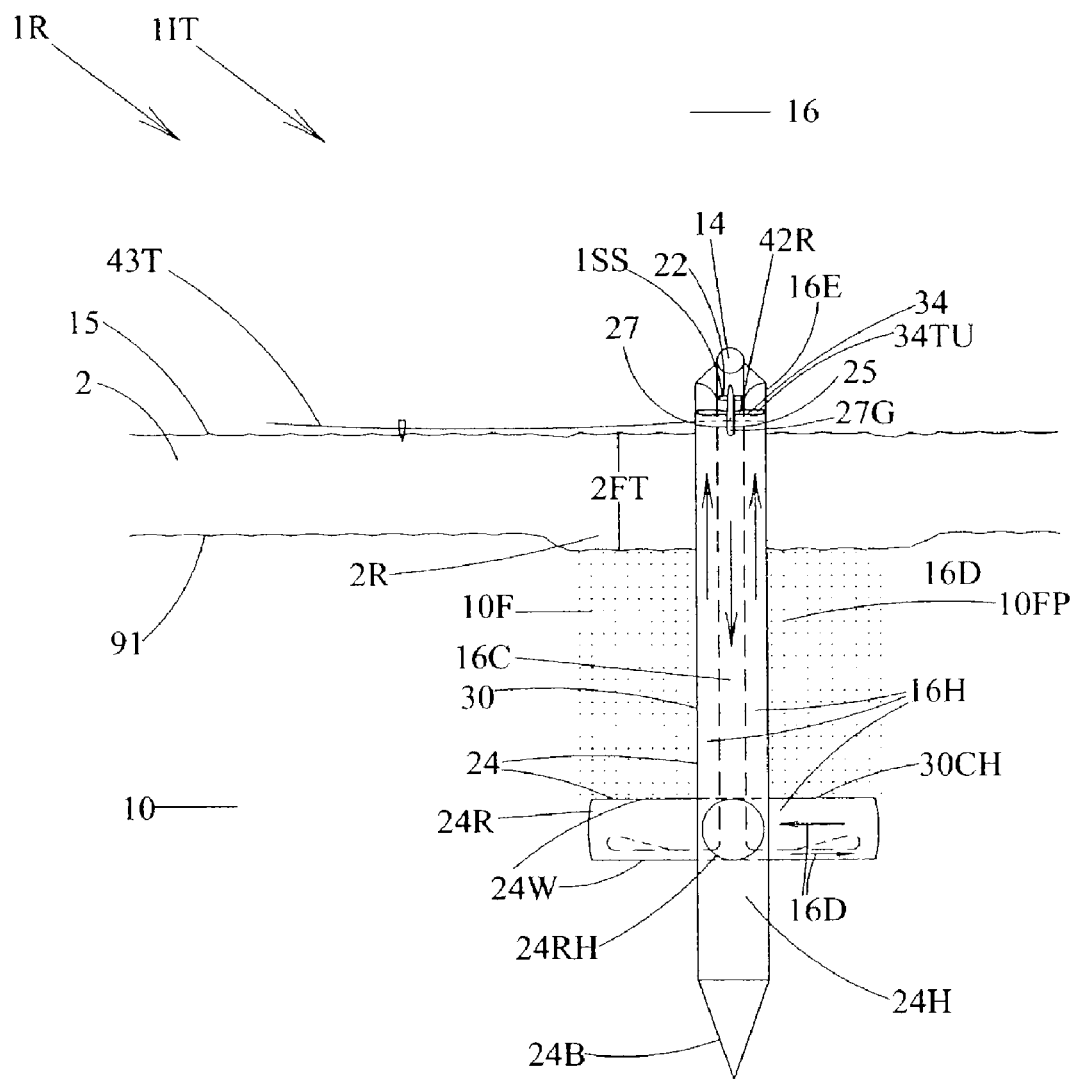

FIG. 4B shows a partial side view of another embodiment of a renewable thermal energy harvesting system with water to air heat transfer below a floating ice sheet, with some similarities to the embodiment shown in FIG. 4A. FIG. 4B shows a renewable energy harvesting system 1R showing a substantially linear air transport partial enclosure 24, as illustrated. Cold air 16 at a temperature below the freezing temperature of water, is sourced from above a floating ice sheet 2, then flows through the inner of two concentric flow channels in the aforementioned air transport partial enclosure 24 downward in flow direction 16D, while getting compressed by compression means 22 to create a compressed air stream 16C, then heated by conductive heat transfer from the liquid water 10 below the floating ice sheet 2, to create a heated air stream 16H, which then flows up the outer of the two concentric flow channels in the air transport partial enclosure 24, to then drive turbine means 34TU before exiting back into the atmosphere as an exhaust air stream 16E. The turbine means 34TU powers energy harvesting means 25 preferably including energy conversion means 27 including generator means 27G for generating electricity. Thus this apparatus functions substantially as a Brayton thermodynamic cycle powerplant, with liquid water as the heat source. Some of the energy harvested by the energy harvesting means 25 is used to power the compression means 22 (e.g., by direct drive or geared drive means), with the balance available for useful purposes such as transmission as electricity along means for transmitting energy 43T.

The embodiment of FIG. 4B also illustrates a floating ice sheet thickening system 1IT for a floating ice sheet 2, comprising:
air heating means 30 for utilizing thermal energy transfer from liquid water 10 sourced from below an undersurface 91 of said floating ice sheet 2, to air 16 sourced from above said floating ice sheet 2, said air 16 being at below water freezing temperature;
wherein said air heating means 30 utilizes some heat of solidification of at least some portion of said liquid water 10 being converted to frozen water 10F (comprising frozen water particles 10FP from the outer wetted surface of the underwater portion of the air transport partial enclosure 24 in the illustrated embodiment);

wherein said frozen water 10F acts towards increasing the frozen thickness 2FT of at least some region 2R of said floating ice sheet 2; and further comprising renewable energy transmission means 42R for transmitting a flow of renewable energy from energy harvesting means 25 for harvesting renewable energy, to contribute power to a subsystem 1SS of said floating ice sheet thickening system 1IT that comprises at least one of air compression means 22 (as illustrated in this embodiment) and a water pump 12 and a working fluid pump 12F.

The illustrated embodiment also features an optional rotatable member 24R of the air transport partial enclosure 24, shown in its rotated horizontal position, that rotates around a hinge 24RH of the rotatable member 24R, as illustrated.

The rotatable member can be in a substantially vertical orientation when the air transport partial enclosure 24 is inserted down from above the floating ice sheet 2, through a pre-drilled hole in the ice sheet or by incorporation of drill bit with local heat-to-melt elements at the bottom ends 24B of the substantially vertical air transport partial enclosure 24. Once the rotatable member 24R is fully underwater, it can be deployed by actuation means (not shown, for clarity) to a substantially horizontal or inclined configuration, to capture heat from the liquid water beneath a larger region 2R, over which said frozen water 10F acts towards increasing the frozen thickness 2FT of that region 2R of said floating ice sheet 2.

Figure 4C:
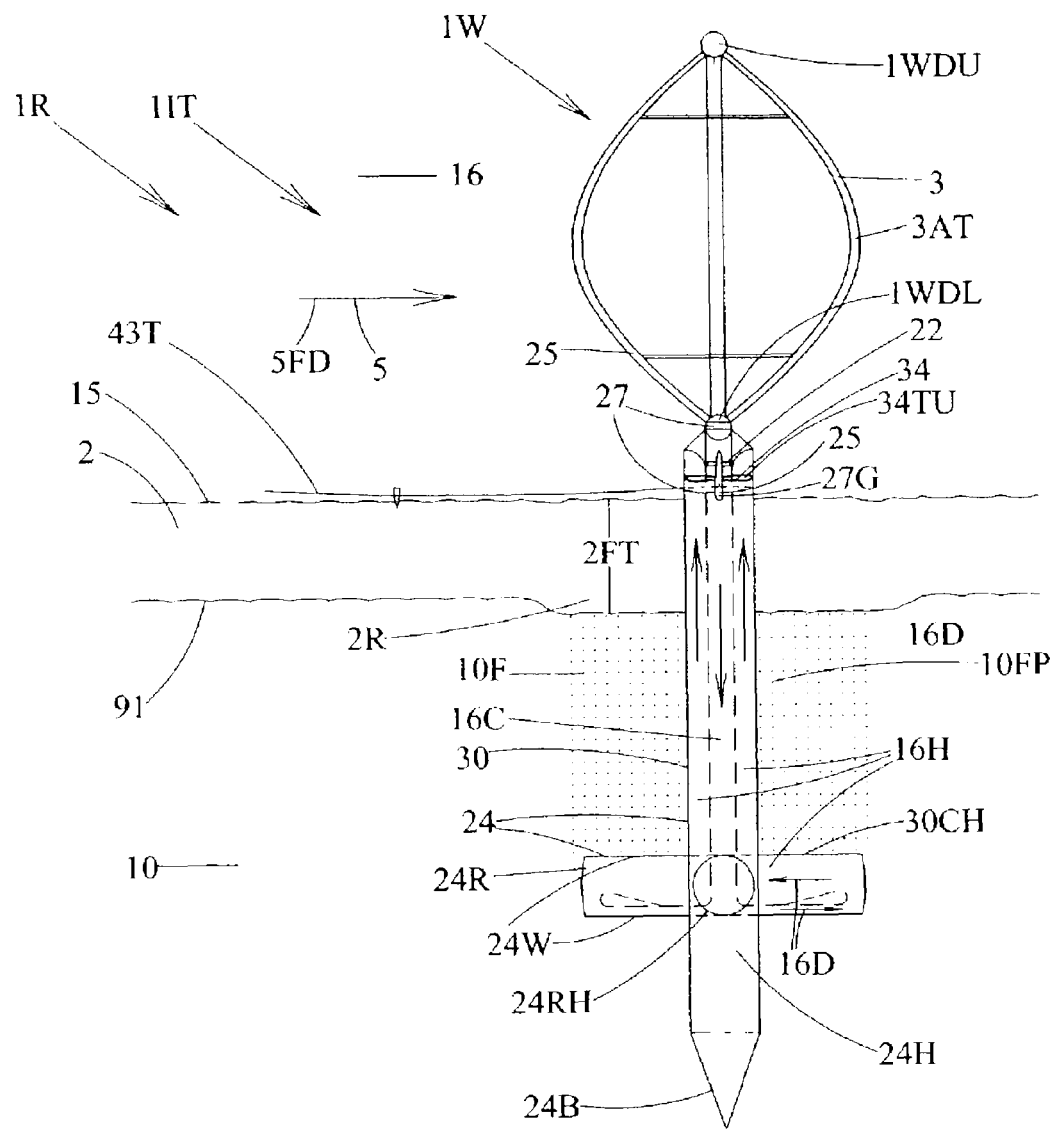

FIG. 4C shows an embodiment similar to that of FIG. 4B, but now also fitted with a wind energy harvesting subsystem 1W comprising a Darrieus type of wind turbine. Two, three or multiple-blade Darrieus rotor wind turbines can be used within the spirit and scope of the invention. The fluid-foil means 3 for interfacing with an air current 5 when said air current 5 exists and carries wind energy in the form of fluid-dynamic kinetic energy, here comprise wind turbine blades 3AT that are of curved configuration as is known from the art of Darrieus rotor vertical axis wind turbines. One of the advantages of the Darrieus rotor type of wind turbine is that it can effectively harness wind energy regardless of the flow direction 5FD of the incipient wind. The upper hub 1WDU and lower hub 1WDL of the Darrieus rotor wind turbine are also illustrated at opposite ends of the rotating axis. Also illustrated is the energy conversion means 27 for converting wind energy harvested by the illustrated energy harvesting means 25. Note that in variant embodiments, common energy conversion means 27 may be driven by both the wind energy and the renewable thermal energy subsystems of the renewable energy harvesting system.

FIG. 4C thus illustrates a renewable thermal energy harvesting system 1R, further comprising at least one of:
(i) a solar energy harvesting subsystem 1S and
(ii) a wind energy harvesting subsystem 1W (illustrated here), which wind energy harvesting subsystem 1W comprises:
fluid-foil means 3 for interfacing with an air current 5 when said air current 5 exists and carries wind energy in the form of fluid-dynamic kinetic energy, which fluid-foil means 3 can execute substantially periodic motion; and
energy harvesting means 25 for converting a portion of said fluid-dynamic kinetic energy into net work on said fluid foil means 3 over the course of a cycle of said substantially periodic motion, by utilizing fluid-dynamic forces acting on said fluid-foil means 3 to contribute to driving said substantially periodic motion;
and wherein said energy harvesting means 25 further includes energy conversion means 27 for converting at least some of said net work into usable energy in a desired form.

FIG. 4D illustrates transport means for moving renewable thermal energy harvesting systems 1R to alternate siting locations. The renewable thermal energy harvesting systems may include a floating ice sheet thickening system HT and may include a wind energy harvesting subsystem 1W. At least one runner supported movable frame 31MF supported by support runner means 11, can carry renewable thermal energy harvesting systems 1R similar to that shown in FIG. 4C (prior to insertion through the floating ice sheet 2) over the frozen surface 15 of that floating ice sheet 2, to alternate siting locations as desired. Note that the renewable thermal energy harvesting system 1R is in a different configuration than that shown in FIG. 4C, with the rotatable member 24R in its vertical stowed & retraction/insertion configuration rather than the horizontal deployed configuration earlier depicted. For example, the renewable thermal energy harvesting systems 1R may be moved along a perimeter line of a floating ice sheet such as the Arctic polar ice cap, to build a thickened perimeter in winter that can help resist breakup and erosion of the floating ice cap perimeter in the Spring and Summer. The at least one runner supported movable frame 31MF may be towed by a snow/ice tow tractor 95ST (such as the illustrated caterpillar tread tow tractor) using a tow cable 17TC or a tow bar, or in alternate embodiments may be self-powered and self-propelled with built in motor or engine means, and built in tractive force generation means such as caterpillar treads, studded tyres, propulsive skis and/or other tractive means. In still other related embodiments, the movable frame(s) 31MF may be permanently attached to the renewable thermal energy harvesting systems 1R, and stay on site with those renewable energy harvesting systems 1R at each relocated siting location over time.

Figure 5:
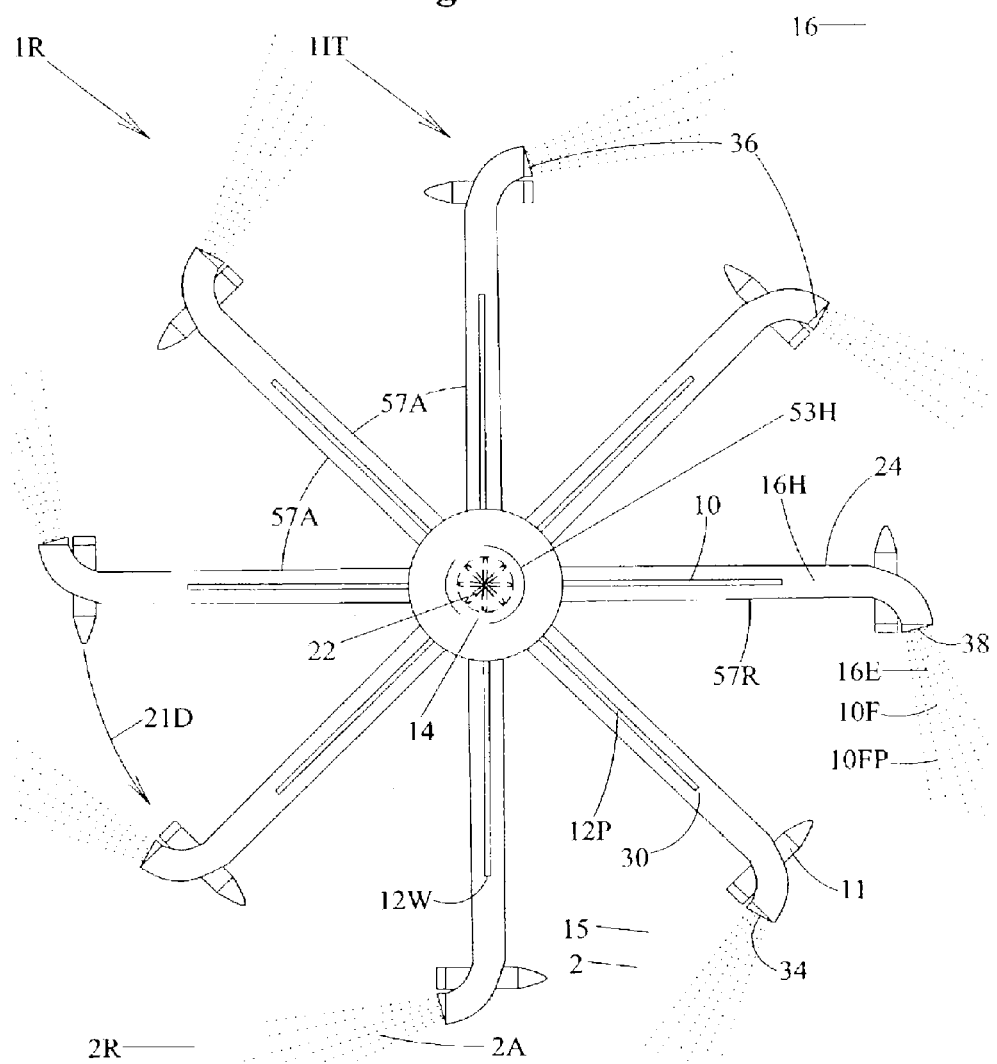
FIG. 5 and FIG. 6A show plan views of alternate preferred embodiments with 8 radial arms; without wind foils and with wind foils respectively.

FIG. 5 shows a plan view of an alternate preferred embodiment similar to the embodiment earlier illustrated in FIGS. 1A and 1B, but with 8 radial arms 57R and without wind foils.

The embodiment of FIG. 5 also includes angularly orientable exhaust nozzles 36, which can be beneficially oriented in at least one of azimuth and elevation, for optimization of desired thrust and desired distribution of frozen water 10F such as frozen water particles 10FP carried with the exhaust air streams 16E which are oriented by the orientable exhaust nozzles 36. Note that orientations may also be optionally varied as a function of wind speed and wind direction acting at each instant at each location of each orientable exhaust nozzle 36.

The embodiment of FIG. 5 therefore illustrates a renewable thermal energy harvesting system 1R near a floating ice sheet 2, comprising:
water intake means (hidden in this plan view) for admitting liquid water 10 sourced from below an undersurface of said floating ice sheet 2;
air intake means 14 for admitting air 16 sourced from above said floating ice sheet 2, said air 16 being at below water freezing temperature;
air heating means 30 for utilizing thermal energy transfer from said liquid water 10 to said air 16, to produce a heated air stream 16H; and
mechanical energy generation means 34 for harvesting some mechanical energy from said heated air stream 16H and for exhausting an exhaust air stream 16E.

FIG. 5 thus illustrates an embodiment of a renewable thermal energy harvesting system 1R, wherein the air heating means 30 is located substantially above said floating ice sheet 2; wherein said air heating means 30 utilizes some heat of solidification of at least some portion of said liquid water 10 being converted to frozen water 10F; and wherein said mechanical energy generation means 34 for harvesting some mechanical energy from said heated air stream 16H, further comprises at least one angularly orientable exhaust nozzle 36 terminating in exhaust orifice means 38 for exhausting said exhaust air stream 16E along with particles of said frozen water 10F.

Examples of particles of frozen water 10F may include particles of ice or snow or sleet, artificially or naturally created.

The angularly orientable exhaust nozzle 36 may have actuated or non-actuated nozzle pointing, with control of elevation and/or azimuthal orientation. Exhaust nozzle orientation may be applied for thrust optimization and/or for ice/snow particle desired deposition distribution. Nozzle heating may optionally be provided to prevent nozzle plugging by frozen deposits. To foster more rapid freezing of water droplets, optional blowing of supercooled or precooled air blowing past the nozzles, similar to such use in some prior art snow making machines, may optionally be used.

FIG. 5 also illustrates an embodiment of a renewable thermal energy harvesting system 1R, further comprising at least one radial arm 57R that can rotate around a hub 53H at least partially supported by said floating ice sheet 2, wherein the water intake means (beneath the hub and so not visible in this view) is connected to said hub 53H by at least one of a water pipe and tube and hose (also beneath the hub and not visible in this view) penetrating through said floating ice sheet 2, further comprising at least one exhaust nozzle 36 terminating in exhaust orifice means 38 for exhausting said exhaust air stream 16E along with particles of said frozen water 10F, wherein said exhaust orifice means 38 is located on said radial arm 57R at a radially spaced distance from the center of rotation of said radial arm 57R and is angularly oriented such that the exhaust air stream 16E generates some thrust force acting to rotate said radial arm 57R around said hub 53H, and wherein said mechanical energy generation means 34 comprises use of said thrust force to rotate said radial arm 57R around said hub 53H and thereby generate rotational mechanical energy FIG. 5 also illustrates an embodiment of a renewable thermal energy harvesting system 1R, comprising multiple radial arms 57R angularly separated from adjacent radial arms 57R by azimuth separation angles 57A wherein all said azimuth separation angles 57A differ by no more than fifteen degrees from the median value of said azimuth separation angles (at least approximately 45 degrees in the representative illustrated embodiment with 8 arms).

Figure 6A:
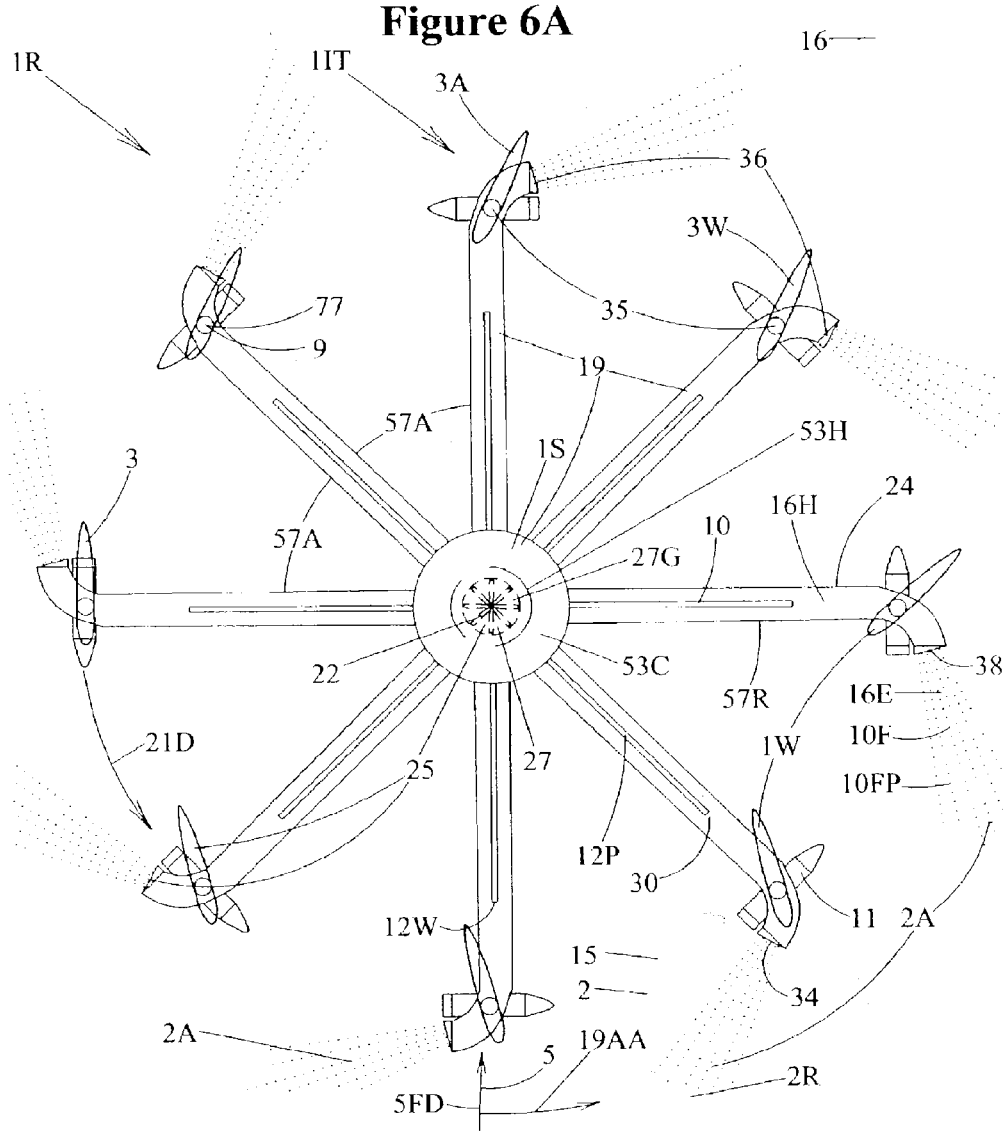

FIG. 6A shows a plan view of an alternate preferred embodiment similar to the embodiments earlier illustrated in FIGS. 1B and 5; but with 8 radial arms and with airfoil or wind foil means 3A now included.

More specifically, in the embodiment of FIG. 6A a nonrotating hub 53 is anchored in a frozen surface 15 of a floating ice sheet 2. A rotatable structure 55 is bearing mounted to be able to rotate around the nonrotating hub 53. The rotatable structure 55 includes the rotating hub cover 53C and the radial arms 57R, the air carrying tubular spoke-like members that project outwards to structurally connect to fluid-foil base members 35 that support fluid-foil means 3 such as upwardly projecting fluid-foil means 3 such as airfoil or wind foil means 3A such as wings 3W. The fluid-foil means 3 are controlled in orientation by control system means 9 for controlling time-variable orientations of fluid-foil means 3, which include powered actuator means 77 in the illustrated embodiment.

The wind energy harvesting subsystem 1W shown in FIG. 6A has connecting members 19 for connecting the fluid-foil means 3, that include at least one of a fluid-foil base member 35, beam structural element, tubular structural element (the radial arms 57R), plate structural element, truss structural element, connecting structural element, connecting rod element, inflated structural element, connecting cable element and connecting tension member.

The fluid-foil base members 35 are supported by support runner means 11 through connecting structure that may include an outer portion of the radial arms 57R, as illustrated. In the illustrated embodiment eight fluid-foil members are shown, but in alternate variant embodiments of this class any number of fluid-foil members could be used, within the spirit and scope of the invention. The entire assembly of fluid-foil means, fluid-foil base members, connecting structure, support runner means, spoke-like members and rotatable structure is rotated in cyclic motion around the nonrotating hub in a direction of rotation 21D, driven by wind forces acting on the fluid-foil means 3 such as wings 3W, which are varied in angle of attack as a function of wind direction and relative azimuth location of each wing at any given time. FIG. 6A illustrates azimuthal angle 19AA along the direction of rotation 21D, starting with zero angle at incoming flow direction 5FD. While the illustrated sense of rotation is clockwise, in alternate embodiments counterclockwise rotation may be used, and for systems of plural wind energy harvesting subsystems 1W, some might rotate clockwise and others counterclockwise, in optimized arrangements for power extraction and reducing net induced vorticity in the downstream wind current.

In the illustrated embodiment of FIG. 6A, the presence of said frozen surface 15 serves as friction-reducing means for reducing frictional forces that act to oppose movement of said plural support runner means 11 and the corresponding plural fluid-foil means 3, relative to an alternate condition wherein said frozen surface is absent.

The wind energy harvesting subsystem 1W in FIG. 6A utilizes energy from an air current 5 which comprises at least one of a wind, a gust, a mass flow of air, a volume flow of air, and a fluid-dynamic air movement induced by meteorological effects including but not limited to pressure differential effects. Energy harvesting means 25 includes energy conversion means 27 located at or near the nonrotating hub 53. The energy conversion means 27 may include a rotating member driven to rotational motion by said motion of said fluid-foil means 3, which rotating member is rotatable around the nonrotating hub 53 and which energy conversion means 27 may further include generator means 27G for generating electrical power from the rotational motion of the rotating member relative to said nonrotating hub 53.

FIG. 6A also illustrates a floating ice sheet thickening system HT for a floating ice sheet 2, comprising:
air heating means 30 for utilizing thermal energy transfer from liquid water 10 sourced from below an undersurface of said floating ice sheet 2, to air 16 sourced from above said floating ice sheet 2, said air 16 being at below water freezing temperature;
wherein said air heating means 30 utilizes some heat of solidification of at least some portion of said liquid water 10 being converted to frozen water 10F;
wherein said frozen water 10F acts towards increasing the frozen thickness of at least some region 2R of said floating ice sheet 2; and
further comprising renewable energy transmission means for transmitting a flow of renewable energy from energy harvesting means 25 for harvesting renewable energy, to contribute power to a subsystem of said floating ice sheet thickening system 1IT that comprises at least one of air compression means 22 (shown) and a water pump and a working fluid pump.

The embodiment of FIG. 6A also illustrates a renewable thermal energy harvesting system 1R, wherein said frozen water 10F includes at least one of ice particles and snow particles and sleet particles and hail stones, wherein said frozen water 10F is carried by said exhaust air stream 16E to a location 2A above said floating ice sheet 2, and wherein said frozen water 10F from said location 2A above said floating ice sheet 2, is deposited by gravitational force so as to effectively increase the frozen thickness of at least some region 2R of said floating ice sheet 2.

Note that the region 2R where the frozen thickness is effectively increased, can be expansive in area due to (i) carriage of frozen snow or ice particles by winds and gusts while they are in the air after being exhausted to location 2A, due to (ii) carriage of frozen snow or ice particles located on the surface of the floating ice sheet 2, also driven by winds and gusts, (iii) carriage of frozen snow or ice particles located on the surface of the floating ice sheet 2 motivated by gravity force when the surface has even a slight slope, and (iv) movement of frozen snow or ice particles by other forces such as ice dynamics driven by currents in the liquid water 10 below the floating ice sheet 2.

The embodiment of FIG. 6A also illustrates a renewable thermal energy harvesting system 1R, wherein said floating ice sheet 2 comprises at least one of a floating ice shelf and a floating ice sheet on the surface of at least one of an ocean, a sea, a bay, a gulf, an inlet, a sound, a strait, a channel, an estuary, a lake, a reservoir, a pond, a river, a stream, a brook, a creek or a canal.

The embodiment of FIG. 6A also illustrates a renewable thermal energy harvesting system 1R, further comprising at least one of
(i) a solar energy harvesting subsystem 1S (shown as an area with solar photovoltaic cells above the rotating hub cover 53C) and
(ii) a wind energy harvesting subsystem 1W (also shown), which wind energy harvesting subsystem 1W comprises:
fluid-foil means 3 for interfacing with an air current 5 when said air current 5 exists and carries wind energy in the form of fluid-dynamic kinetic energy, which fluid-foil means 3 can execute substantially periodic motion; and
energy harvesting means 25 for converting a portion of said fluid-dynamic kinetic energy into net work on said fluid-foil means 3 over the course of a cycle of said substantially periodic motion, by utilizing fluid-dynamic forces acting on said fluid-foil means 3 to contribute to driving said substantially periodic motion; and wherein said energy harvesting means 25 further includes energy conversion means 27 for converting at least some of said net work into usable energy in a desired form FIGS. 6B through 6E illustrate aspects of control system means for controlling the renewable thermal energy harvesting system 1R including the case where it includes a wind energy harvesting subsystem 1W, as for example the embodiment shown in FIG. 6A.

Figure 6B:
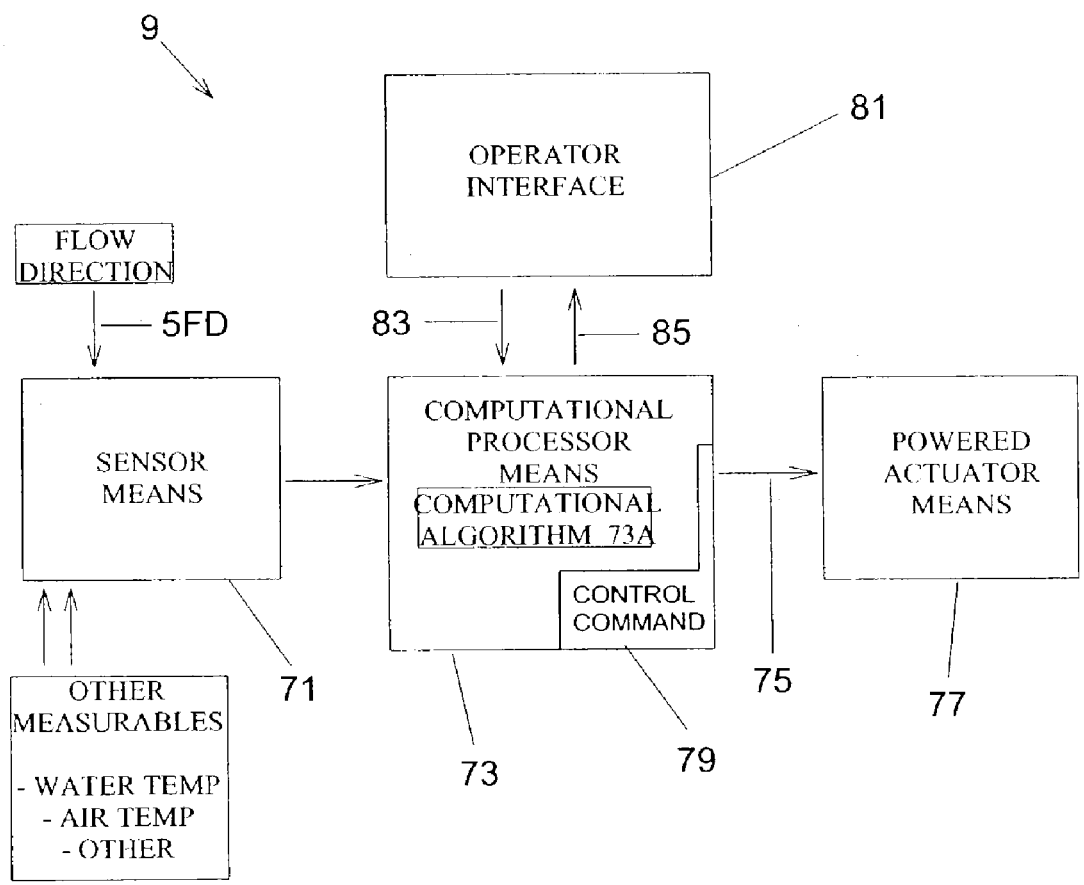
FIGS. 6B through 6E illustrate aspects of control system means for controlling the renewable thermal energy harvesting system including the case where it includes a wind energy harvesting subsystem.

FIG. 6B illustrates a representative control system block diagram for renewable thermal energy harvesting system 1R including the case where it includes a wind energy harvesting subsystem 1W, wherein control system means 9 for controlling time-variable orientations of fluid-foil means 3, comprises (i) sensor means 71 for sensing the flow direction 5FD of an air current (such as a wind) and optionally for sensing other measurables, (ii) computational processor means 73 with at least one computational algorithm 73A for generating a control command 79 as a function of said flow direction 5FD, (iii) at least one powered actuator means 77 for executing the control command 79, and (iv) at least one signal transmission means 75 for transmitting a signal containing said control command 79 from said computational processor means 73 to said powered actuator means 77. The powered actuator means 77 can either directly control the orientation of the fluid-foil means, e.g. with a rotary or linear actuator or actuators (as shown in the embodiment of FIG. 6A), and/or indirectly control orientation of fluid-foil means using a control tab or other means for controlling including means for controlling at least one of a control surface, tab, flap, blown flap, slat, and morphing shape aerodynamic member. Other powered actuator means 77 can control flow of liquid water 10 through the at least one of a water pipe and tube and hose 12P and/or water pump 12. FIG. 6B also illustrates an optional operator interface 81 sending operator command(s) 83 to computational processor means 73 and receiving at least one of data and annunciations) 85 to an operator. An operator may actively control operation of the renewable thermal energy harvesting system 1R including the case where it includes a wind energy harvesting subsystem 1W, or in alternate embodiments monitor its automatic operation and only intervene or override for non-normal, failure or emergency situations.

Figure 6C:
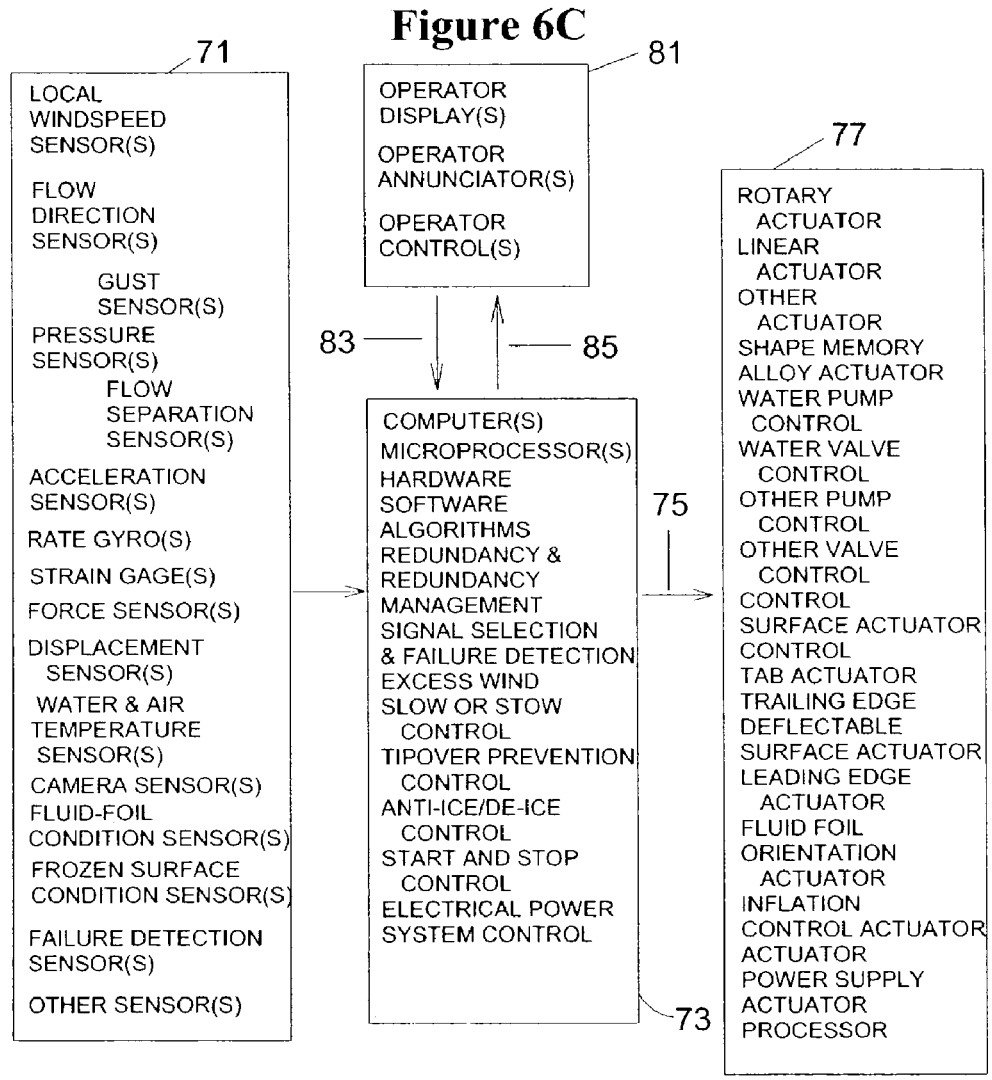

FIG. 6C illustrates several optional sub-elements which may reside in each of the blocks of the control system shown in FIG. 6B. The elements in the sensor means 71 could include a local windspeed sensor, flow direction sensor, gust sensor, pressure sensor, acceleration sensor, rate gyro, force sensor, displacement sensor, water & air temperature sensors, camera sensor, fluid-foil condition sensor, frozen surface condition sensor, failure detection sensor and/or other sensor(s). The computational processor means 73 could include a computer, a microprocessor, hardware, software algorithms, redundancy and redundancy management, sensor signal selection and failure detection, excess wind stow or slow control, tipover prevention control, anti-ice/de-ice control, start and stop control and/or electrical power system control. The powered actuator means 77 could include a rotary actuator, a linear actuator, other actuator, a shape memory alloy actuator, water pump control, water valve control, other pump control, other valve control, a control surface actuator, a control tab actuator, a trailing edge deflectable surface actuator, a leading edge actuator, a fluid-foil orientation actuator, an inflation control actuator, an actuator power supply and/or actuator processor. The optional operator interface 81 could include one or more of an operator display, an operator annunciator, and/or an operator control.

Figure 6D:
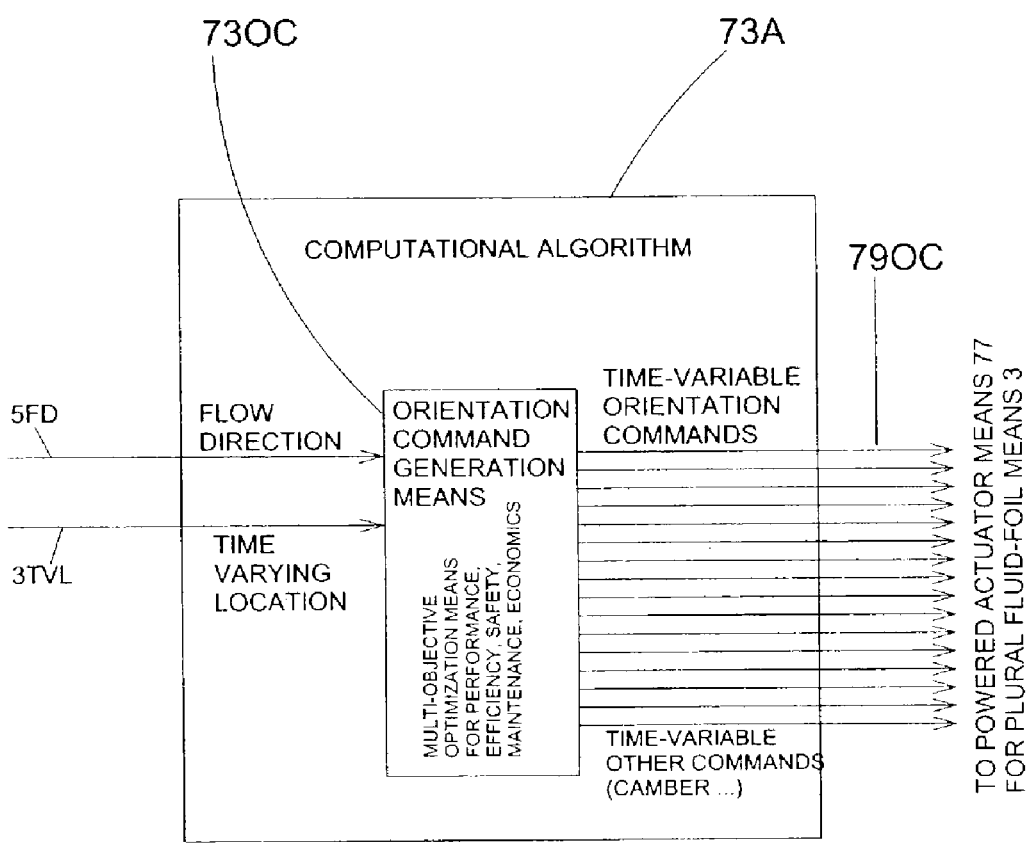

FIG. 6D illustrates for renewable thermal energy harvesting system 1R including the case where it includes a wind energy harvesting subsystem 1W, a computational algorithm 73A that comprises orientation command generation means 73OC for generating time-variable orientation commands 79OC for each of plural fluid-foil means 3 as a function of at least one of said flow direction 5FD and time-varying location 3TVL of at least one of said plural fluid-foil means 3, which time-variable orientation commands if properly executed by the at least one powered actuator means 77, would result in time-variable orientations of said plural fluid-foil means 3 that tend to substantially maximize the net work on the fluid-foil means 3 over the course of a cycle of substantially periodic motion of the fluid-foil means, through time-variable fluid-dynamic pressure distributions that tend to substantially maximize resulting forces acting on the fluid-foil means 3 to drive said substantially periodic motion when an air current 5 exists and carries wind energy in the form of fluid-dynamic kinetic energy.

Figure 6E:
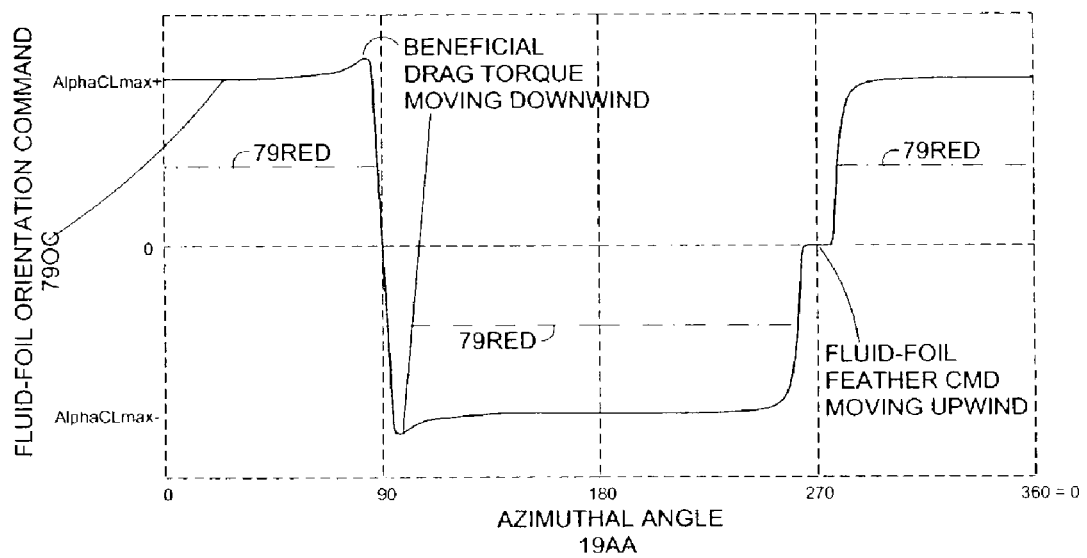

FIG. 6E illustrates a representative fluid-foil orientation command 79OC schedule as a function of the azimuthal angle 19AA along the direction of rotation 21D, starting with 0 at incoming flow direction 5FD, as described earlier in the context of FIG. 6A. In this representative preferred schedule, note that the fluid-foil is commanded to a maximum lift coefficient ($C_L$) orientation for the crosswind legs of its motion, while it can be commanded to a beneficial drag torque orientation on the peak downwind leg of motion near 90 deg azimuthal angle (as illustrated), and to a minimum drag near-feathered orientation on the peak upwind leg of motion near 270 deg azimuthal angle. Variant algorithms for fluid-foil orientation commands as a function of various sensor inputs and to achieve multiple objectives, are possible within the spirit and scope of the invention as claimed. For excessively high wind speed or storm conditions where the fluid-foils may be at risk of excess loads or of tipping over, the orientation commands can be diminished or reduced as shown in the dot-dashed lines for reduced magnitude orientation commands 79RED. The reduced magnitude orientation commands can optionally vary in magnitude as a function of azimuthal angle and other parameters such as wind speed or algorithmically calculated tipping risk. While this orientation schedule has been shown for the embodiment of FIG. 6A, it should be understood that functionally analogous schedules can be defined for other embodiments such as that of FIGS. 1A and 1B or others.

Figure 7:
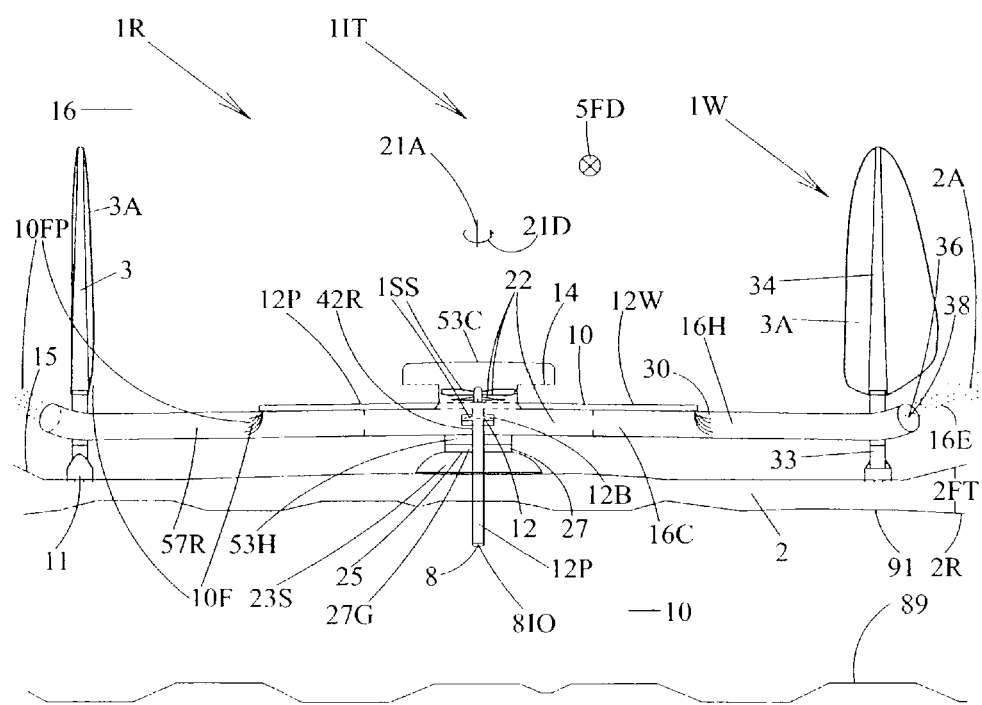
FIG. 7 shows a partial side view of the embodiment of FIG. 6A.

FIG. 7 shows a partial side view of the embodiment of FIG. 6A. Only two of the radial arms 57R are shown, so as not to clutter the illustration. The wind flow direction 5FD is approximately into the page, in the view shown. The airfoil or wind foil means 3A on the right side of the Figure is moving downstream, and is shown in a deliberately high drag orientation. The airfoil or wind foil means 3A on the left side of the Figure is moving upstream, and is shown in an approximately feathered orientation. The entire system is rotating in direction of rotation 21D around an effective axis of rotation 21A. In this embodiment the air compression means 22 for compressing air 16, includes at least one of geared and motor-driven compressor elements comprising an axial compressor element, a centripetal compressor element, and a rotating radial arm compressor element, as illustrated.

While a representative airfoil or wind foil means 3A planform, size and shape is illustrated, it should be understood that a wide variety of wing and/or sail designs could be used singly or in combination, using known technologies from the prior art of airfoil design, wing design, planform design, camber & thickness & twist & taper design, and sail design. Control surfaces and morphing shape elements could optionally be fitted on the airfoil or wind foil means 3A.

Figure 8A:
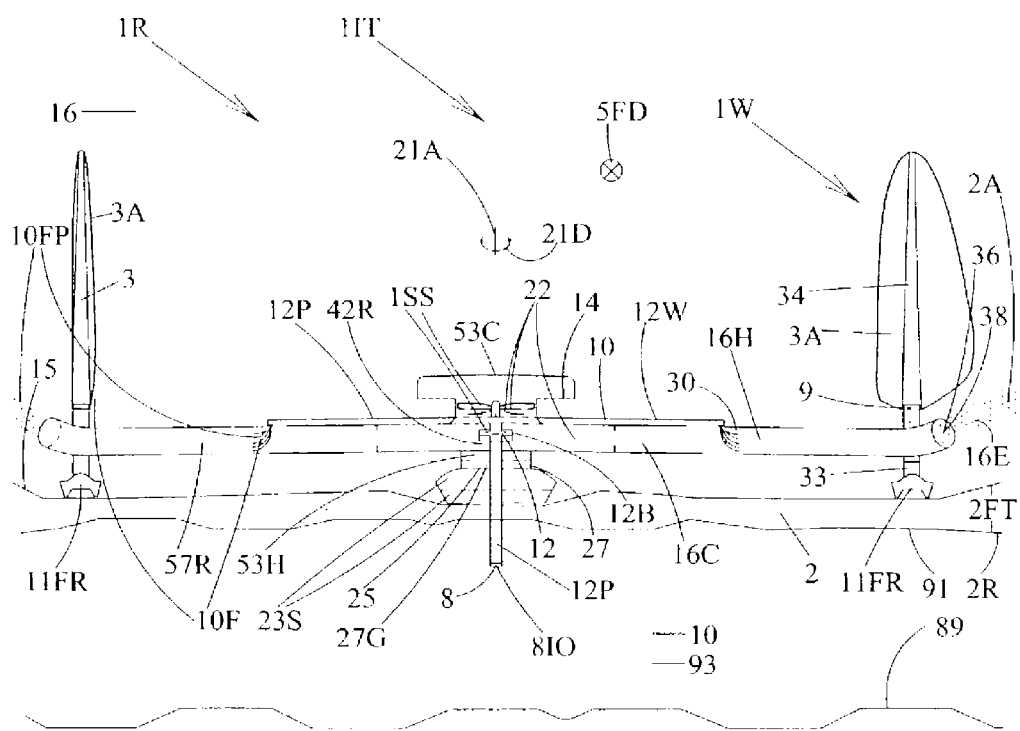
FIGS. 8A and 8B show partial side views of an embodiment similar to that of FIG. 7, but now operable on either a floating ice sheet or a layer of water, respectively.
Figure 8B:
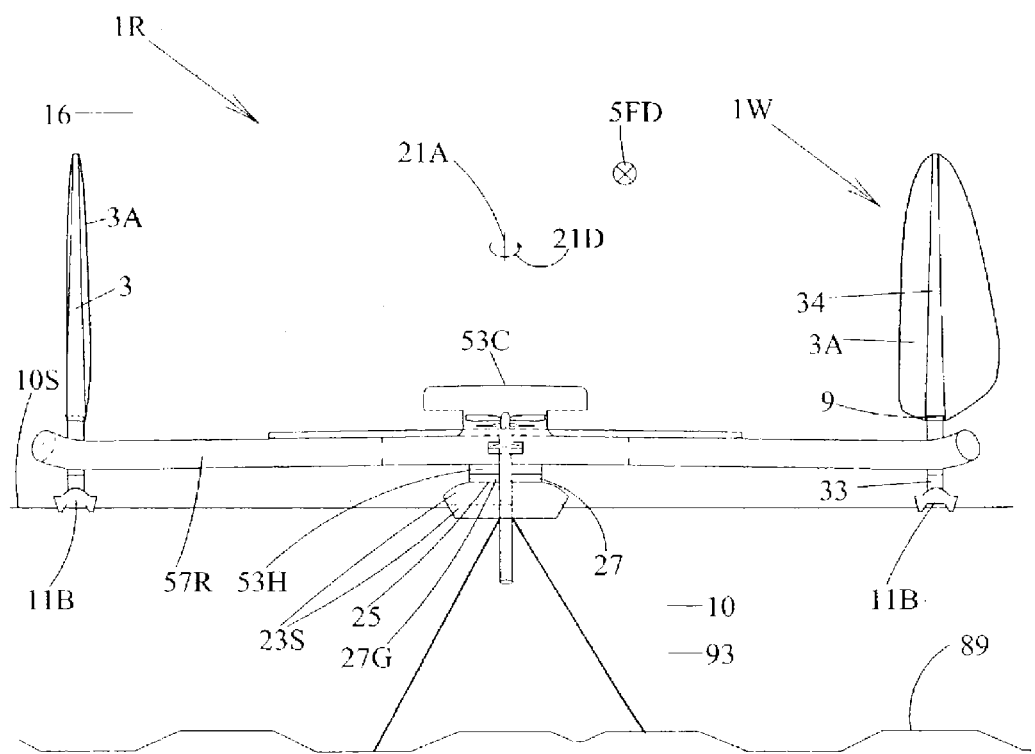

FIGS. 8A and 8B show partial side views of an embodiment similar to that of FIG. 7, but now operable on either a floating ice sheet or a layer of water, respectively. The support runners 11 of FIG. 7 are now replaced by buoyant support runner means 11B, that can move with relatively low resistance on any of liquid water or snow or ice. The support means 23S for supporting the hub 53H is also now a combined float and solid frozen surface support means.

FIG. 8A shows this embodiment operating on a frozen surface 15 that is the upper surface of a floating ice sheet 2 above a layer of liquid water 10. The frozen surface may comprise ice and/or snow and/or slush, for example. The bottom of the buoyant support runner means 11B can include a ski element and a skate or runner element, as illustrated.

FIG. 8B shows this same embodiment operating on a water surface 10S of a layer of liquid water 10, as for instance at the same geographic site but in a summer season when the floating ice sheet 2 has fully or substantially melted. The buoyant support runner means 11B are now floating on the water surface 10S using buoyancy forces to support the entire system, as is known from the prior art of floating devices on a water surface. The hub 53H is similarly floating on the water surface 10S. Thus this embodiment of the invention can harvest wind energy in all seasons, whether the surface is frozen or not.

The embodiment of FIGS. 8A and 8B therefore illustrates a renewable thermal energy harvesting system 1R near a floating ice sheet 2, comprising:
water intake means 8 for admitting liquid water 10 sourced from below an undersurface 91 of said floating ice sheet 2;
air intake means 14 for admitting air 16 sourced from above said floating ice sheet 2, said air 16 being at below water freezing temperature;
air heating means 30 for utilizing thermal energy transfer from said liquid water 10 to said air 16, to produce a heated air stream 16H; and
mechanical energy generation means 34 for harvesting some mechanical energy from said heated air stream 16H and for exhausting an exhaust air stream 16E.

The embodiment of FIGS. 8A and 8B also illustrates a renewable thermal energy harvesting system 1R, further comprising at least one radial arm 57R that can rotate around a hub 53H at least partially supported by said floating ice sheet 2, wherein said water intake means 8 is connected to said hub 53H by at least one of a water pipe and tube and hose 12P penetrating through said floating ice sheet 2, further comprising at least one exhaust nozzle 36 terminating in exhaust orifice means 38 for exhausting said exhaust air stream 16E along with particles of said frozen water 10F, wherein said exhaust orifice means 38 is located on said radial arm 57R at a radially spaced distance from the center of rotation of said radial arm 57R and is angularly oriented such that the exhaust air stream 16E generates some thrust force acting to rotate said radial arm 57R around said hub 53H, and wherein said mechanical energy generation means 34 comprises use of said thrust force to rotate said radial arm 57R around said hub 53H and thereby generate rotational mechanical energy.

The embodiment of FIGS. 8A and 8B also illustrates a renewable thermal energy harvesting system 1R, further comprising fluid-foil means 3 for interfacing with an air current 5 which fluid-foil means 3 is connected to said radial arm 57R and can execute substantially periodic motion as said radial arm 57R rotates around said hub 53H;
further comprising energy harvesting means 25 including control system means 9 capable of controlling time-variable orientations of said fluid-foil means 3 relative to near flow fields of said air current 5 when said air current 5 exists and carries wind energy in the form of fluid-dynamic kinetic energy, for converting a portion of said fluid-dynamic kinetic energy into net work on said fluid-foil means 3 over the course of a cycle of said substantially periodic motion, by utilizing time-variable fluid-dynamic forces acting on said fluid-foil means 3 at said time-variable orientations to contribute to driving said substantially periodic motion;
wherein said energy harvesting means 25 further includes energy conversion means 27 comprising generator means 27G for converting at least one of (i) said rotational mechanical energy and (ii) said net work that creates incremental rotational mechanical energy, into electrical energy;
further comprising support runner means connected to said radial arm 57R for supporting said radial arm 57R above said floating ice sheet 2 and for permitting low friction motion of said radial arm 57R over the floating ice sheet 2, wherein said support runner means comprise buoyant support runner means 11B, wherein said floating ice sheet 2 is floating above a liquid water layer 93; and wherein in the event of a warm temperature period occurring when said floating ice sheet 2 becomes one of substantially and fully melted, said buoyant support runner means 11B float in said liquid water layer 93 and said energy harvesting means 25 can still function as said radial arm 57R can still rotate around said hub 53H driven by said time-variable fluid-dynamic forces acting on said fluid-foil means 2 at said time-variable orientations to contribute to driving said substantially periodic motion.

In the floating mode of FIG. 8B, this embodiment of a renewable thermal energy harvesting system 1R can be easily towed to a location site by a tugboat, and anchored at the site by underwater tether means to anchor means connected to the (underwater) ground surface 89. Other embodiments of the invention can also be towed to site by tugboat in a summer season, before a water body develops a floating ice sheet 2.

Figure 9A:
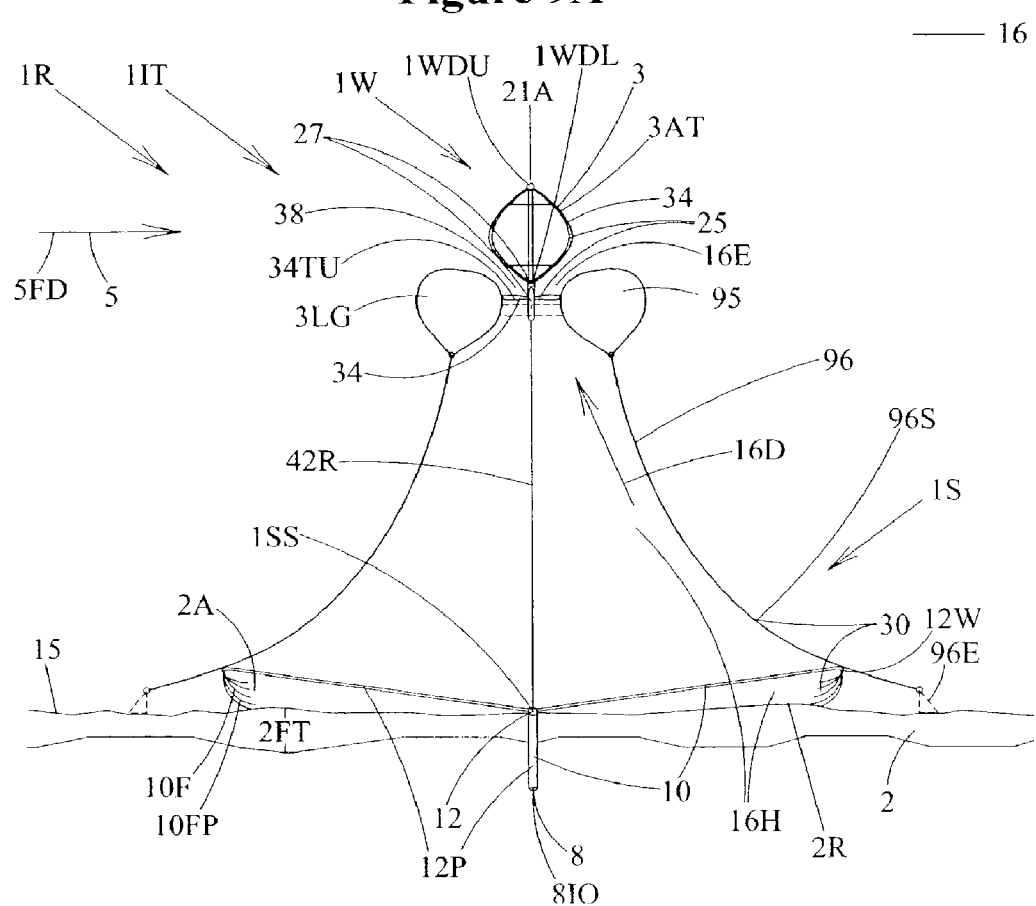
FIG. 9A shows a sectional side view of a preferred embodiment with a flexible canopy type chimney with a turbine near its upper end.

FIG. 9A shows a sectional side view of a preferred embodiment with a flexible canopy type chimney with a turbine near its upper end. In this embodiment a flexible sheet 96 optionally supported by rigid structural elements such as beams or trusses (not shown) is shaped like a canopy type chimney, optionally axisymmetric around an axis 21A as shown. The upper end perimeter of the flexible sheet 96 is supported by an aerostat 95 filled with lifting gas 3LG such as hydrogen or helium or hot air, for example. A toroidal topology aerostat 95 is illustrated here. The lower end perimeter of the flexible sheet 96 is supported by sheet edge support structure 96E, as illustrated, which may comprise truss structure members. Cold air 16 from the atmosphere can flow inward through the sheet edge support structure 96E and enter the region under the outer region of the flexible sheet 96. In this region an innovative air heating means 30 is provided, comprising at least one of dripping or spraying or injecting liquid water 10 into the inward flowing cold air stream, whereupon at least some of the liquid water droplets freeze and become frozen water 10F comprising frozen water particles 10FP, and the accompanying release of the water's heat of solidification contributes heat to heat the air stream and power a thermodynamic (heat) engine. Note that the liquid water 10 dripped or sprayed or injected acts as means for heating the air both (i) because it is at a higher temperature than the air stream and heat flows naturally from a higher temperature entity to a lower temperature entity, and (ii) because many or all of the liquid water droplets will freeze on contact with the cold subfreezing temperature air, and whilst freezing will release the heat of solidification of water into the air stream. The frozen water particles which may be in the form or snow crystals or ice crystals. The liquid water 10 that is dripped or sprayed or injected, is sourced from below the floating ice sheet 2 through water intake means 8 here comprising a water inlet orifice 8IO, and is transported via at least one of a water pipe and tube and hose 12P. A water pump 12 is used to pump the liquid water 10.

The illustrated embodiment also features an optional additional element of the air heating means 30, namely the use of solar collector means 96S for collecting solar energy. The solar collector means 96S comprises at least one of a dark colored solar energy absorbing surface and photovoltaic collector means for collecting solar energy and generating electrical energy while also generating residual heat energy. Heat energy from the solar collector means 96S can be conductively transferred through the flexible surface 96 to serve as the optional additional element of the air heating means 30 for heating air to generate the rising heated air stream 16H.

The air heating means 30 yields a heated air stream 16H that flows inward and rises upward, moving approximately in air flow direction 16D. The heated air stream turns turbine means 34TU that serves as energy harvesting means 25 and mechanical energy generation means 34 for harvesting energy and generating mechanical energy from the rising heated air stream. The turbine means 34TU preferably drive energy conversion means 27, such as generator means for generating electricity, which can then be transmitted by cables or wires which are not shown, for clarity. The turbine means 34TU are structurally connected to an supported by the aerostat 95 in the illustrated embodiment. In alternate embodiments without an aerostat, a tower structure could support the turbine means 34TU as well as the upper perimeter of the flexible sheet 96. The heated air stream 16H, after turning the turbine means 34TU, flows through exhaust orifice means 38 and becomes an exhaust air stream 16E exhausting back to the atmosphere.

The illustrated embodiment also shows an optional a wind energy harvesting subsystem 1W comprising a Darrieus type of wind turbine. Two, three or multiple-blade Darrieus rotor wind turbines can be used within the spirit and scope of the invention. The fluid-foil means 3 for interfacing with an air current 5 when said air current 5 exists and carries wind energy in the form of fluid-dynamic kinetic energy, here comprise wind turbine blades 3AT that are of curved configuration as is known from the art of Darrieus rotor vertical axis wind turbines. The wind turbine blades 3AT also serve as mechanical energy generation means 34. One of the advantages of the Darrieus rotor type of wind turbine is that it can effectively harness wind energy regardless of the flow direction 5FD of the incipient wind. The upper hub 1WDU and lower hub 1WDL of the Darrieus rotor wind turbine are also illustrated at opposite ends of the rotating shaft aligned with the axis 21A. Also illustrated is the energy conversion means 27 for converting wind energy harvested by the illustrated energy harvesting means 25. Note that in variant embodiments, common energy conversion means 27 may be driven by both the wind energy and the renewable thermal energy subsystems of the renewable energy harvesting system (specifically the Darrieus rotor wind turbine plus the hot air driven turbine means 34TU, in the illustrated embodiment).

The embodiment of FIG. 9A therefore illustrates a renewable thermal energy harvesting system 1R near a floating ice sheet 2, comprising:

water intake means 8 for admitting liquid water 10 sourced from below an undersurface 91 of said floating ice sheet 2;

air intake means 14 for admitting air 16 sourced from above said floating ice sheet 2, said air 16 being at below water freezing temperature;

air heating means 30 for utilizing thermal energy transfer from said liquid water 10 to said air 16, to produce a heated air stream 16H; and mechanical energy generation means 34 for harvesting some mechanical energy from said heated air stream 16H and for exhausting an exhaust air stream 16E.

The embodiment of FIG. 9A also illustrates a floating ice sheet thickening system HT for a floating ice sheet 2, comprising:

air heating means 30 for utilizing thermal energy transfer from liquid water 10 sourced from below an undersurface 91 of said floating ice sheet 2, to air 16 sourced from above said floating ice sheet 2, said air 16 being at below water freezing temperature;

wherein said air heating means 30 utilizes some heat of solidification of at least some portion of said liquid water 10 being converted to frozen water 10F;

wherein said frozen water 10F acts towards increasing the frozen thickness 2FT of at least some region 2R of said floating ice sheet 2; and further comprising renewable energy transmission means 42R for transmitting a flow of renewable energy from energy harvesting means 25 for harvesting renewable energy, to contribute power to a subsystem 1SS of said floating ice sheet thickening system 1IT that comprises at least one of air compression means 22 and a water pump 12 and a working fluid pump 12F.

The embodiment of FIG. 9A also illustrates a renewable thermal energy harvesting system 1R, wherein said air heating means 30 comprises watering means 12W for at least one of streaming and spraying and dripping and misting and pumping and injecting and delivering through nucleator nozzles, said liquid water 10 from said water intake means 8, into said air 16.

The embodiment of FIG. 9A also illustrates a renewable thermal energy harvesting system 1R, further comprising at least one of:

(i) a solar energy harvesting subsystem 1S (included here) and (ii) a wind energy harvesting subsystem 1W (also included here), which wind energy harvesting subsystem 1W comprises:

fluid-foil means 3 for interfacing with an air current 5 when said air current 5 exists and carries wind energy in the form of fluid-dynamic kinetic energy, which fluid-foil means 3 can execute substantially periodic motion; and energy harvesting means 25 for converting a portion of said fluid-dynamic kinetic energy into net work on said fluid foil means 3 over the course of a cycle of said substantially periodic motion, by utilizing fluid-dynamic forces acting on said fluid-foil means 3 to contribute to driving said substantially periodic motion;

and wherein said energy harvesting means 25 further includes energy conversion means 27 for converting at least some of said net work into usable energy in a desired form.

Figure 9B:
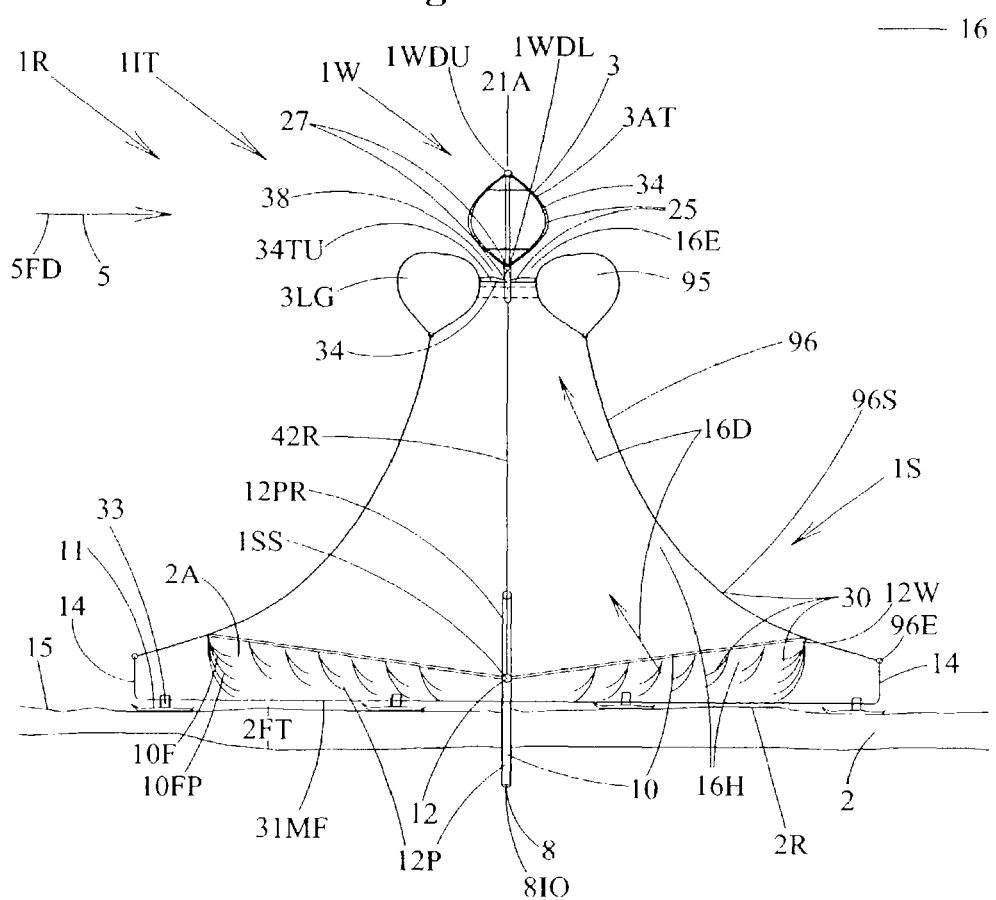
FIG. 9B shows a partial side view of a linearly elongated embodiment also with a canopy type chimney.

FIG. 9B shows a partial side view of a linearly elongated embodiment also with a flexible canopy type chimney, similar to the embodiment of FIG. 9A but not axisymmetric. In this embodiment a flexible sheet 96 optionally supported by rigid structural elements such as beams or trusses (not shown) is shaped like a canopy type chimney, with turbine means 34TU at the upper end, which is axisymmetric around an axis 21A as shown. The upper end perimeter of the flexible sheet 96 is supported by an aerostat 95 filled with lifting gas 3LG such as hydrogen or helium or hot air, for example. A toroidal topology aerostat 95 is illustrated here. The lower end perimeter of the flexible sheet 96 is no longer axisymmetric, but rather is elongated with length from right to left in the illustrated view, with right and left ends supported by sheet edge support structure 96E, preferably of inverted wide U or "pi" geometry when viewed from the right or left ends. Cold air 16 from the atmosphere can flow inward through air intake means 14 within the end inverted U geometry of the sheet edge support structure 96E, and enter the regions under the right and left outer regions of the flexible sheet 96. The front and back edges (front only visible) of the flexible sheet 96 are supported now by runner supported movable frames 31MF, which in turn are supported through suspension elements 33 by support runner means 11 for supporting said renewable thermal energy harvesting system 1R at least in part. Front and back flexible air seal curtains (not shown) may optionally be provided, hanging down from the illustrated movable frames 31MF.

In these regions under the right and left outer regions of the flexible sheet 96, once again an innovative air heating means 30 is provided, comprising at least one of dripping or spraying or injecting liquid water 10 into the inward flowing cold air stream, whereupon at least some of the liquid water droplets freeze and become frozen water 10F comprising frozen water particles 10FP, and the accompanying release of the water's heat of solidification contributes heat to heat the air stream and power a thermodynamic (heat) engine. Note that the liquid water 10 dripped or sprayed or injected acts as means for heating the air both (i) because it is at a higher temperature than the air stream and heat flows naturally from a higher temperature entity to a lower temperature entity, and (ii) because many or all of the liquid water droplets will freeze on contact with the cold subfreezing temperature air, and whilst freezing will release the heat of solidification of water into the air stream. The frozen water particles which may be in the form or snow crystals or ice crystals. The liquid water 10 that is dripped or sprayed or injected, is sourced from below the floating ice sheet 2 through water intake means 8 here comprising a water inlet orifice 8IO, and is transported via at least one of a water pipe and tube and hose 12P. A water pump 12 is used to pump the liquid water 10. When it is desired to move the entire renewable thermal energy harvesting system 1R to a new siting location, it can be towed on the support runner means 11, with the water pipe in a retracted configuration 12PR above the frozen surface 15, for transport purposes.

The illustrated embodiment also features an optional additional element of the air heating means 30, namely the use of solar collector means 96S for collecting solar energy. The solar collector means 96S comprises at least one of a dark colored solar energy absorbing surface and photovoltaic collector means for collecting solar energy and generating electrical energy while also generating residual heat energy. Heat energy from the solar collector means 96S can be conductively transferred through the flexible surface 96 to serve as the optional additional element of the air heating means 30 for heating air to generate the rising heated air stream 16H.

The air heating means 30 yields a heated air stream 16H that flows inward and rises upward, moving approximately in the indicated air flow directions 16D. As in FIG. 9A, the heated air stream turns turbine means 34TU that serves as energy harvesting means 25 and mechanical energy generation means 34 for harvesting energy and generating mechanical energy from the rising heated air stream. The turbine means 34TU preferably drive energy conversion means 27, such as generator means for generating electricity, which can then be transmitted by cables or wires which are not shown, for clarity. The turbine means 34TU are structurally connected to an supported by the aerostat 95 in the illustrated embodiment. The heated air stream 16H, after turning the turbine means 34TU, flows through exhaust orifice means 38 and becomes an exhaust air stream 16E exhausting back to the atmosphere.

The FIG. 9B embodiment, as in the FIG. 9A embodiment, also shows an optional a wind energy harvesting subsystem 1W comprising a Darrieus type of wind turbine. Two, three or multiple-blade Darrieus rotor wind turbines can be used within the spirit and scope of the invention. The fluid-foil means 3 for interfacing with an air current 5 when said air current 5 exists and carries wind energy in the form of fluid-dynamic kinetic energy, here comprise wind turbine blades 3AT that are of curved configuration as is known from the art of Darrieus rotor vertical axis wind turbines. The wind turbine blades 3AT also serve as mechanical energy generation means 34. The upper hub 1WDU and lower hub 1WDL of the Darrieus rotor wind turbine are also illustrated at opposite ends of the rotating shaft aligned with the axis 21A. Also illustrated is the energy conversion means 27 for converting wind energy harvested by the illustrated energy harvesting means 25. Note that in variant embodiments, common energy conversion means 27 may be driven by both the wind energy and the renewable thermal energy subsystems of the renewable energy harvesting system (specifically the Darrieus rotor wind turbine plus the hot air driven turbine means 34TU, in the illustrated embodiment).

Figure 10:
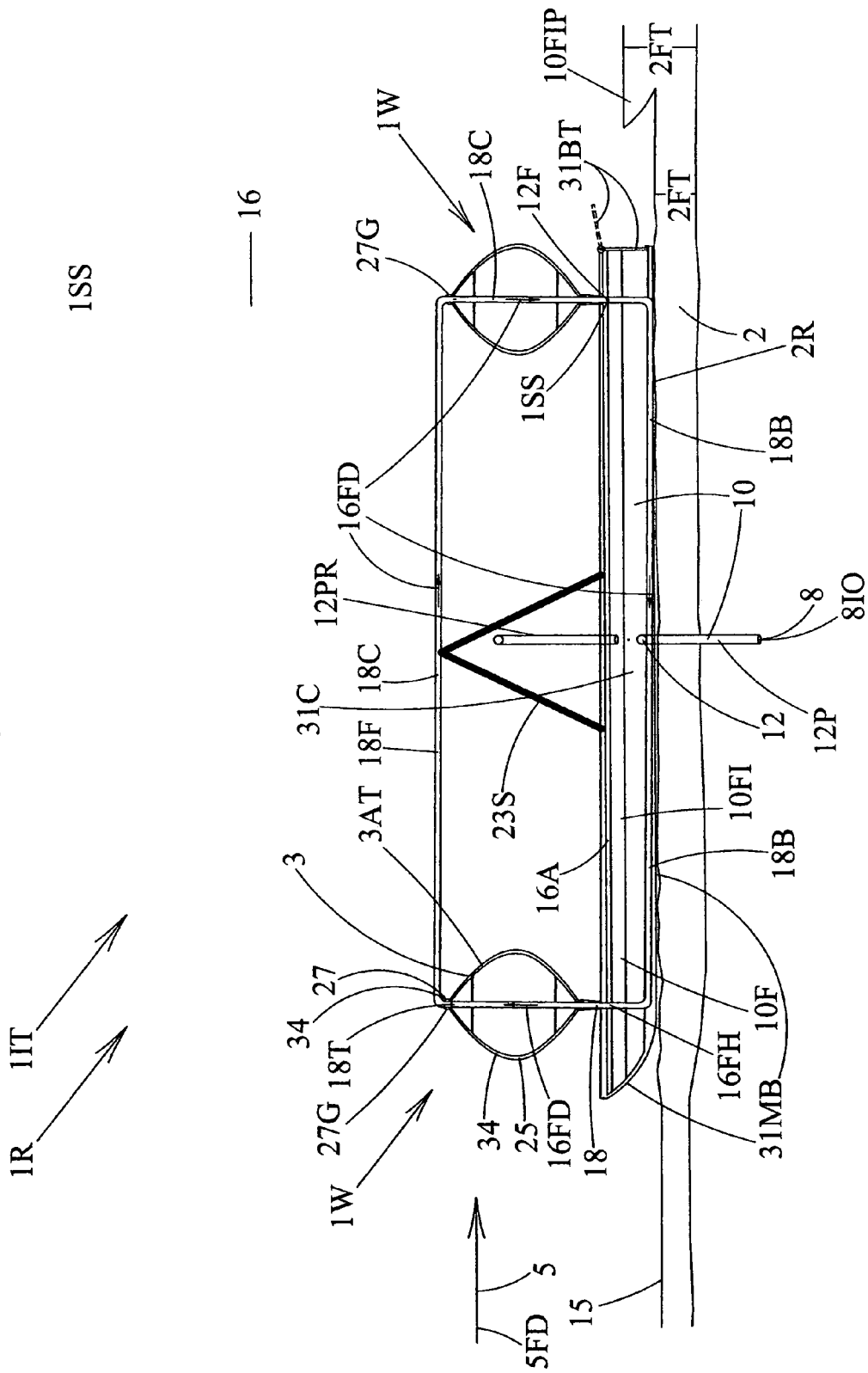
FIG. 10 shows a partial side sectional view of a preferred embodiment utilizing an intermediate working fluid.

FIG. 10 shows a partial side sectional view of a preferred embodiment utilizing an intermediate working fluid. In this embodiment of a renewable thermal energy harvesting system 1R, a movable insulated barge 31MB is used, which is supported on a floating ice sheet 2 and is towable on said floating ice sheet 2, through the use of running lower surface elements integrated into the lower surface of the movable insulated barge 31MB. The movable insulated barge 31MB may be of typically rectangular planform when viewed from above, with the left side seen in partial sectional view here. The representative embodiment shown here is fitted with four optional wind energy harvesting subsystems 1W comprising Darrieus rotor wind turbines that serve as mechanical energy generation means 34, at the front left, front right, rear left and rear right of the movable insulated barge 31MB. Only the front left and rear left wind energy subsystems 1W are visible in this view, at the left and right sides of the view respectively.

The interior of the movable insulated barge 31MB is an insulated substantially enclosed compartment 31C, into which liquid water 10 sourced from below the floating ice sheet 2 is drawn via water intake means 8 comprising at least one water inlet orifice 8IO and up at least one of a water pipe and tube and hose 12P, and pumped by water pump 12 into the insulated substantially enclosed compartment 31C. The temperature inside the insulated substantially enclosed compartment 31C will stay substantially at the freezing temperature of water, as the compartment is filled with the liquid water 10. As the external air temperature of the air 16 in the atmosphere may be substantially below freezing temperature of water, especially in the local winter or non-summer season(s), the water in the insulated substantially enclosed compartment 31C may develop a layer of floating ice 10FI comprising frozen water 10F, at an upper portion of the compartment 31C and just beneath a layer of air 16A.

The liquid water 10 within the insulated substantially enclosed compartment 31C serves as a heat bath or heat reservoir, from which heat can flow naturally across pipe or heat exchanger walls into a flow of liquid working fluid in intermediate working fluid circuit means 18 around a closed circuit path in working fluid flow direction 16FD. While a representative flow path and configuration is shown for illustrative purposes, it should be understood that complex geometry flow paths can be used in a variety of variant embodiments, as is known from prior art thermodynamic devices such as steam engines and refrigerator systems utilizing working fluid moving around closed circuit paths(s) that may include various geometry elements and various heat exchanger elements. In the illustrated embodiment liquid working fluid flows from the right end towards the left along a flow tube or channel comprising a working fluid boiler 18B at or near the bottom of the water layer in the insulated substantially enclosed compartment 31C, and as the working fluid is heated by heat from the liquid water 10 it boils and proceeds leftwards first as a mixture of liquid and gas, and eventually becoming fully gaseous to create a heated (boiled) fluid stream 16FH. The heated (boiled) fluid stream 16FH then drives a working fluid turbine 18T that serves as mechanical energy generation means 34, which in turn drives generator means 27G for generating electricity. The generator means 27G serves as energy conversion means 27 for converting the spinning turbine mechanical energy into electrical energy, and as part of energy harvesting means 25 for harvesting renewable energy. The generator means 27G may optionally utilize a sum of mechanical energy from the spinning turbine in the working fluid turbine 18T, plus mechanical energy from the spinning Darrieus rotor wind turbine that comprises a wind energy harvesting subsystem 1W. In variant embodiments separate generators may be used for the renewable thermal energy and renewable wind energy subsystems.

A wide variety of working fluids could be used in the intermediate working fluid circuit means 18, that have a boiling point below the temperature of liquid water 10 (that may be liquid fresh water or liquid salt water depending on the site of the installation). While Freon (e.g., dichlorodifluoromethane) or Freon substitutes with less harmful effects on the ozone layer may be used, many other chemical substances and compounds could be used for the purposes of the invention. Examples of other chemical substances or compounds with boiling temperatures (under appropriate pressure conditions) that are at least slightly below the temperature of freezing water, include the following list which should not be construed to be limiting:

sulfur dioxide (S O2)
butane (C4 H10)
P-diisopropenylbenzene (C12 H14)
Benzoylacetone (C10 H10 O2)
2-Chloro6-nitroanisole (C7 H6 N1 O3 C11)
5-Chloro2-nitroanisole (C7 H6 N1 O3 C11)
3,5-Dichlorobenzoic acid (C7 H4 O2 C12)
M-formylbenzoic acid (C8 H6 O3)

Many other substances and mixtures thereof could also be potentially be used, with different substances and mixtures offering different thermodynamic, performance and environmental benefits and challenges.

Continuing on the path of the working fluid in the intermediate working fluid circuit means 18, after exiting the working fluid turbine 18T, the gas path turns and enters a long working fluid condenser 18C, where the working fluid condenses from gaseous to liquid form, as it is conductively cooled by the low temperature surrounding air 16 that is at a temperature below the boiling point of the working fluid. The upper part of the working fluid path may be substantially linear as shown and optionally supported by support means 23S as shown, or may involve winding or zig-zag paths as known from the prior art of heat exchanger design. The condensed fluid then flows down the right end of the illustrated intermediate working fluid circuit means 18, and is then pumped by working fluid pump 12F to again repeat its closed-loop flow cycle.

While a simple intermediate working fluid circuit means 18 is herein illustrated, it should be understood that more complex circuits that may include sub-circuits or alternate branches and paths may be used, as known from the prior art of thermodynamic devices such as engines and refrigerators, including elements such as valves, expansion valves, pumps, compressors, turbines, heat exchangers, intercoolers, regenerators and topping cycle subsystems.

As the working fluid continues to cycle around its circuit and extract heat from the liquid water in the substantially enclosed compartment 31C, more of the liquid water in the compartment will freeze as it releases its heat of solidification, and the layer of floating ice 10FI in the compartment will gradually thicken. When the layer of floating ice 10FI is thick, with just a thin layer of liquid water 10 remaining below it, the water pipe can be moved to the dashed line position of the water pipe in a retracted configuration 12PR above frozen surface 15 (for transport) and a barge openable tailgate 31BT can open from its closed configuration (shown in solid lines) to its open configuration (shown in dashed lines). Now the layer of floating ice 10FI will move rearward and downward out of the insulated substantially enclosed compartment 31C under the influence of gravitational force and lubricated by the layer of liquid water 10. Concurrently, the whole movable insulated barge 31MB can be towed or propelled forward (to the left in the illustrated left side view). The barge openable tailgate 31BT can then be closed, the water pipe 12P reinserted through the floating ice sheet 2, and the insulated substantially enclosed compartment 31C refilled substantially with liquid water 10 to repeat the process. Note that in the illustrated view, the previous iteration's layer of floating ice 10FIP is shown in a position behind the current position of the movable insulated barge 31MB, with this previous iteration's layer of floating ice 10FIP effectively adding to the frozen thickness 2FT of the floating ice sheet 2, as illustrated.

The embodiment of FIG. 10 here illustrates a floating ice sheet thickening system 1IT for a floating ice sheet 2, comprising:

air heating means 30 (here comprising the pipe of the working fluid condenser 18C) for utilizing thermal energy transfer from liquid water 10 sourced from below an undersurface 91 of said floating ice sheet 2 (via the liquid water 10 in the insulated substantially enclosed compartment 31C and via the intermediate working fluid circuit means 18), to air 16 sourced from above said floating ice sheet 2, said air 16 being at below water freezing temperature;

wherein said air heating means 30 utilizes some heat of solidification of at least some portion of said liquid water 10 being converted to frozen water 10F (in said insulated substantially enclosed compartment 31C);

wherein said frozen water 10F acts towards increasing the frozen thickness 2FT of at least some region 2R of said floating ice sheet 2 (after exiting through the opened barge openable tailgate 31BT, as described); and further comprising renewable energy transmission means (connecting generator means 27G and working fluid pump 12F in the illustrated embodiment, specific path not shown for clarity) for transmitting a flow of renewable energy from energy harvesting means 25 for harvesting renewable energy, to contribute power to a subsystem 1SS of said floating ice sheet thickening system 1IT that comprises at least one of air compression means 22 and a water pump 12 and a working fluid pump 12F (here illustrated).

The embodiment of FIG. 10 also illustrates a floating ice sheet thickening system HT, further comprising at least one intermediate working fluid circuit means 18 for harvesting at least a portion of said thermal energy transfer from said liquid water 10 to said air 16, which intermediate working fluid circuit means 18 includes at least one said working fluid pump 12F; and wherein said air heating means 30 utilizes some heat from said intermediate working fluid circuit means 18.

The embodiment of FIG. 10 also illustrates a renewable thermal energy harvesting system 1R, further comprising at least one of:
(i) a solar energy harvesting subsystem 1S and
(ii) a wind energy harvesting subsystem 1W (included here), which wind energy harvesting subsystem 1W comprises:
fluid-foil means 3 for interfacing with an air current 5 when said air current 5 exists and carries wind energy in the form of fluid-dynamic kinetic energy, which fluid-foil means 3 can execute substantially periodic motion; and energy harvesting means 25 for converting a portion of said fluid-dynamic kinetic energy into net work on said fluid foil means 3 over the course of a cycle of said substantially periodic motion, by utilizing fluid-dynamic forces acting on said fluid-foil means 3 to contribute to driving said substantially periodic motion;

and wherein said energy harvesting means 25 further includes energy conversion means 27 for converting at least some of said net work into usable energy in a desired form.

Note that variants of the FIG. 10 embodiment may have laterally separated locations for the evaporator and condenser parts of the intermediate working fluid circuit means 18, such as below or above water locations for the evaporator part, and onshore on a land surface for the condenser part, with connecting insulated piping to convey the intermediate working fluid back and forth.

Figure 11:
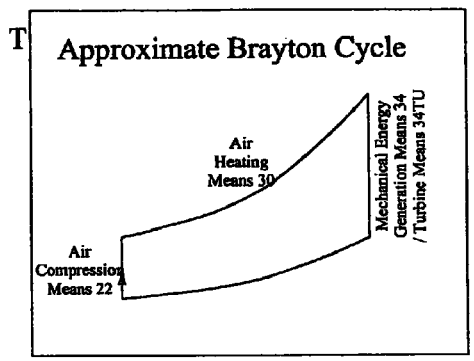
FIG. 11 illustrates diagrams of thermodynamic cycles that can be employed in various embodiments of the invention.
Figure 11:
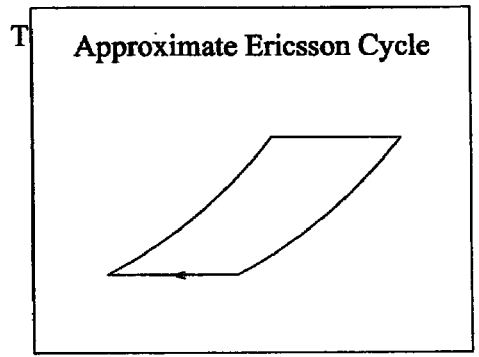
Figure 11:
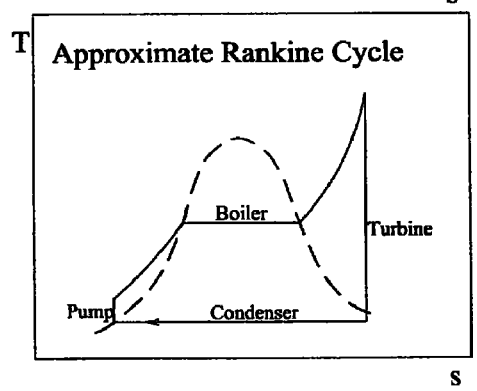
Figure 11:
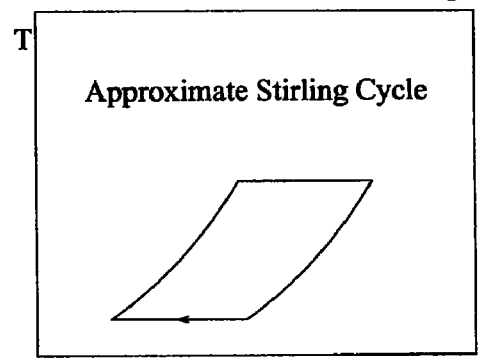
Figure 11:
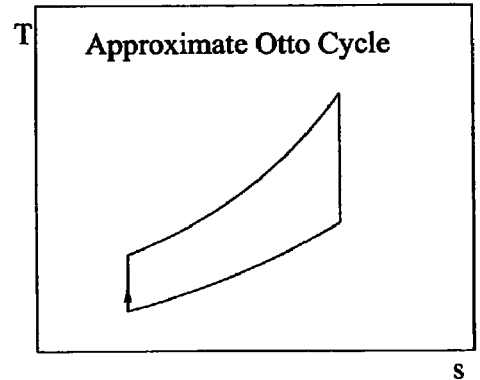
Figure 11:
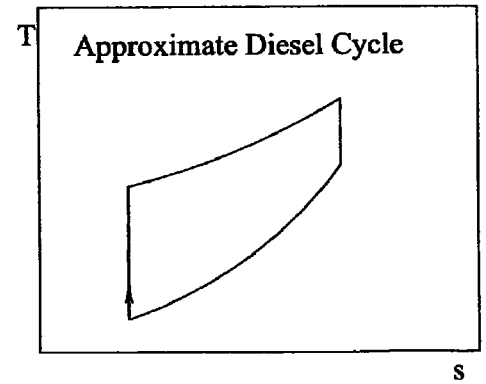

FIG. 11 illustrates diagrams of several approximate thermodynamic cycles that can be employed in various embodiments of the invention. Temperature (T) versus specific entropy (s) charts are shown for approximate Brayton, Ericsson, Rankine, Stirling, Otto and Diesel Cycle systems. Note that variations and combinations of these, plus versions with intercooling, regeneration, topping, cycles etc. can be used in variant thermodynamic embodiments as known from the extensive prior art of thermodynamic systems design.

Figure 12A:
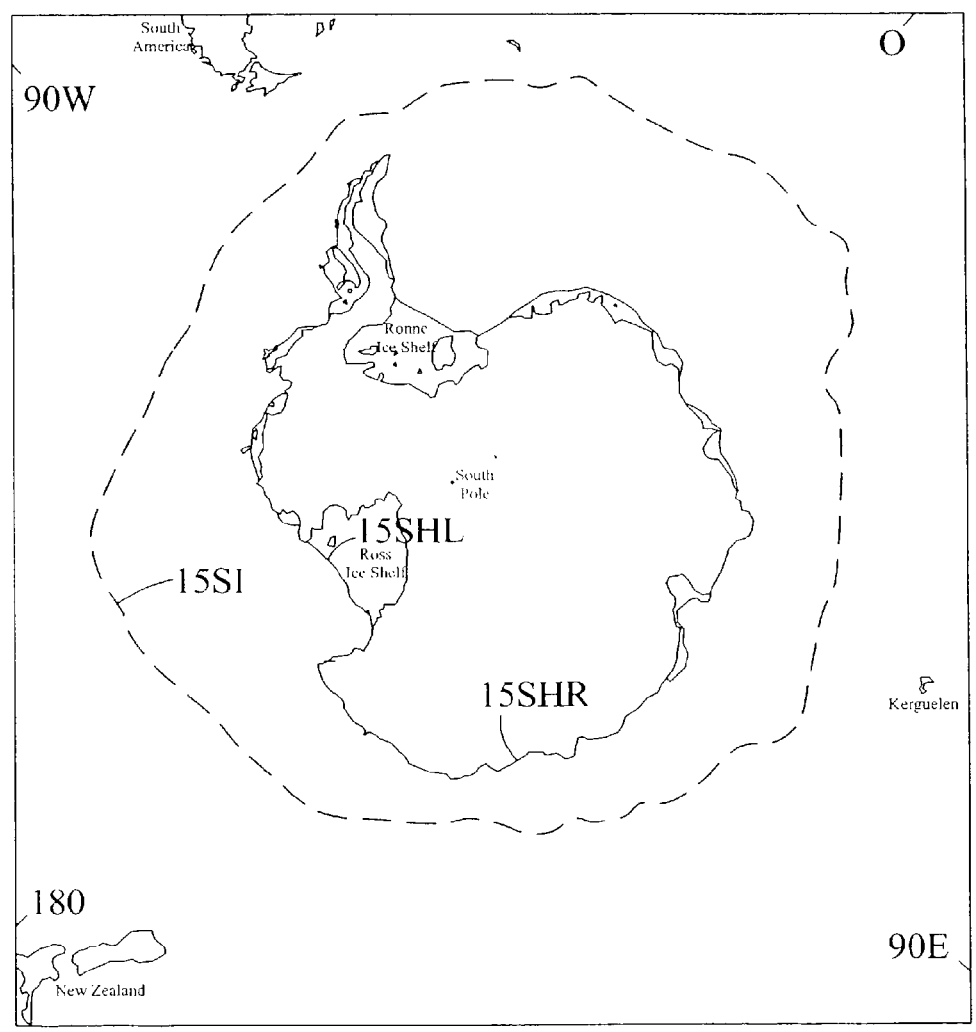
FIGS. 12A and 12B show map views of potential locations of embodiments of the invention in Antarctic and Arctic locations respectively.
Figure 12B:
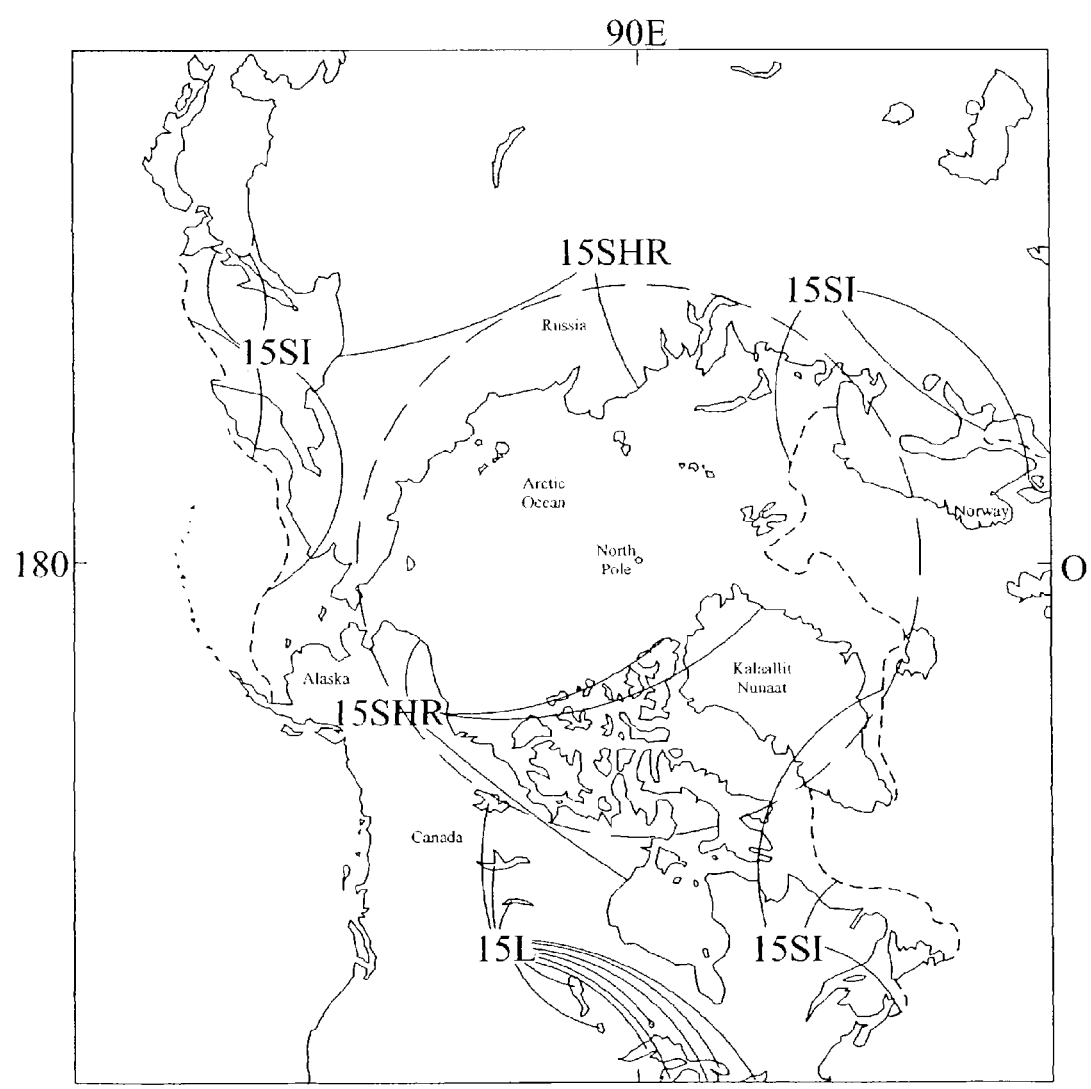

FIGS. 12A and 12B show map views of potential locations of embodiments of the invention in Antarctic and Arctic locations respectively.

FIG. 12A shows a polar view map of Antarctica and surrounding geographic regions. Embodiments of the invention comprising at least one of renewable thermal energy harvesting systems 1R and floating ice sheet thickening systems 1IT, can be sited on floating ice such as ice shelves or sea ice, in any area as illustrated between the shoreline 15SHR on the one hand, and the (outer) boundary of sea ice 15SI, as illustrated. The boundary of sea ice 15SI illustrated is a representative outer boundary of maximal continuous sea ice, and the boundary of minimum continuous sea ice will lie within the illustrated boundary. The invention can be particularly beneficially applied on ice shelves, in the areas illustrated between the shoreline 15SHR on the one hand, and the ice shelf boundary/boundaries 15SI, as illustrated. Ice shelf installations can harvest renewable thermal energy in all seasons, for portions of the ice shelf that are permanent and have liquid water below them, while having air at temperature below water freezing temperature above them. Ice shelf installations are also highly suitable for embodiments of the invention that combine a wind energy harvesting subsystem as earlier described, as ice shelves often have regions of high wind energy, as for example from katabatic winds coming down to the ice shelf from surrounding higher elevation Antarctic highlands.

FIG. 12B shows a polar view map of the Arctic Ocean and surrounding geographic regions including Alaska, Canada, Kalaallit Nunaat (Greenland), Norway and Russia. Embodiments of the invention comprising at least one of renewable thermal energy harvesting systems 1R and floating ice sheet thickening systems 1IT, can be sited on floating ice such as sea ice or ice shelves, in any area as illustrated between the shoreline 15SHR on the one hand, and the (outer) boundary of sea ice 15SI, as illustrated. The boundary of sea ice 15SI illustrated is a representative outer boundary of maximal continuous sea ice, and the boundary of minimum continuous sea ice (permanent Arctic sea ice or pack ice or the permanent Arctic ice cap) will lie within the illustrated boundary. The invention can also be beneficially applied on frozen lake surfaces 15L, at least in winter. While some particular lakes such as Great Bear Lake, Great Slave Lake, Lake Athabasca, Lake Winnipeg, Lake of the Woods, Lake Nipigon, Lake Superior, Lake Michigan, Lake Huron, Georgian Bay and Lake Ontario are specifically illustrated, it should be understood that various other lakes, rivers, bodies of fresh water and bodies of salt water that can freeze over at least in winter, are suitable for siting of embodiments of the present invention.

Certain embodiments such as the embodiment illustrated in FIGS. 8A and 8B can potentially be particularly advantageous for application to such lakes that may freeze over in the winter but remain ice free in the summer, to nonpermanent regions of sea ice, and to other bodies of fresh or salt water that freeze over nonpermanently. The reason for being advantageous is that the wind energy harvesting subsystems 1W of such embodiments, can still operate and harvest renewable energy in the event of warm temperature periods (e.g., summer) occurring when the floating ice sheet 2 becomes one of substantially and fully melted, with buoyant support runner means 11B now floating in the liquid water layer 93 and the energy harvesting means 25 still functioning as radial arms 57R can still rotate around the hub 53H driven by time-variable fluid-dynamic (wind induced) forces acting on the fluid-foil means 2.

Figure 12C:
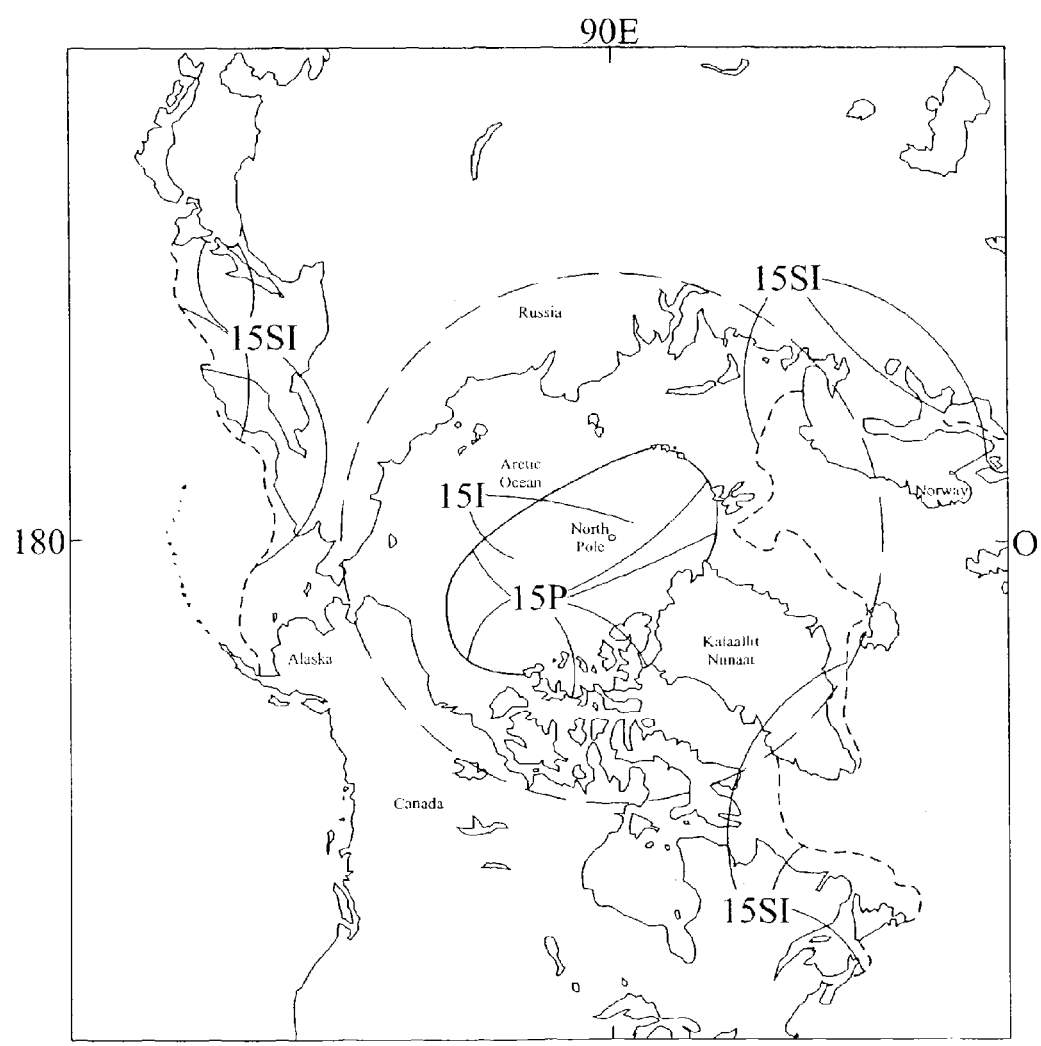
FIG. 12C illustrates a plurality of floating ice sheet thickening systems along a defined perimeter of a floating ice sheet.

FIG. 12C illustrates the potential application of a plurality of renewable thermal energy harvesting systems 1R and/or floating ice sheet thickening systems 1IT along a defined perimeter 15P such that the frozen thickness 2FT of the floating ice sheet 2 is increased along said defined perimeter 15P. This approach can be used to stabilize and make permanent a defined boundary for permanent sea ice in the Arctic, that acts as a defensive perimeter against global warming induced shrinkage and thinning of permanent Arctic sea ice. Additional renewable thermal energy harvesting systems 1R and/or floating ice sheet thickening systems HT can optionally be installed in a distributed and/or grid pattern in the enclosed area 15I within the defined perimeter 15P, to further strengthen the defense against shrinkage or thinning, even when the floating sea ice is subject to forces induced by water currents and/or winds.

A representative defined perimeter 15P is shown that would protect permanent Arctic sea ice from further shrinkage or possible summer eradication due to global warming, that will help prevent possible extinction of polar bear populations as polar bears depend on sea ice for their survival, and that will still permit navigation of ships possible in the train of ice breakers around the circumference of the Arctic Ocean during summer months. With the illustrated defined perimeter 15P intersecting shorelines of islands it can be further anchored and stabilized against undesired movement or breakup. While one representative defined perimeter 15P is shown, it should be understood that many variant and different geometries for full or partial defined perimeters 15P are certainly possible, within the spirit and scope of the invention as defined.

Figure 12D:
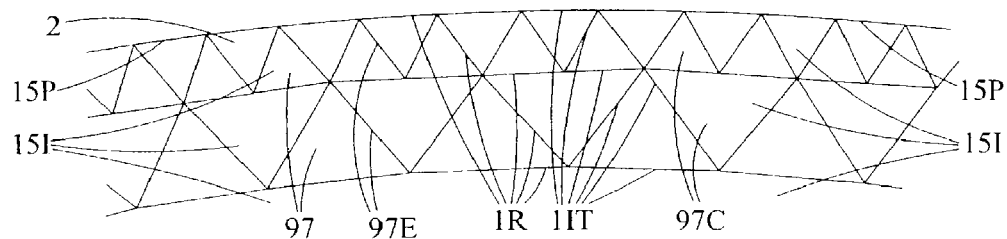
FIGS. 12D, 12E and 12F illustrate exemplary grid arrays of a plurality of floating ice sheet thickening systems.
Figure 12E:
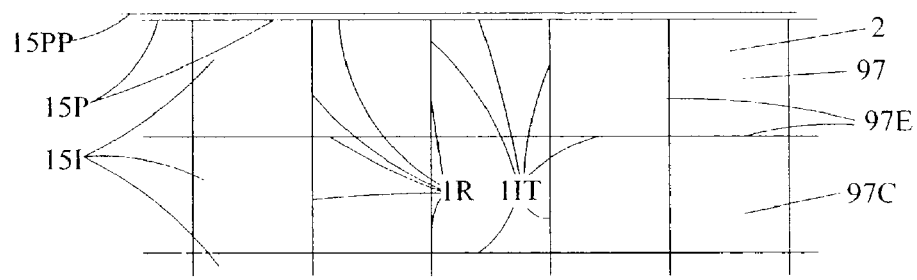
Figure 12F:
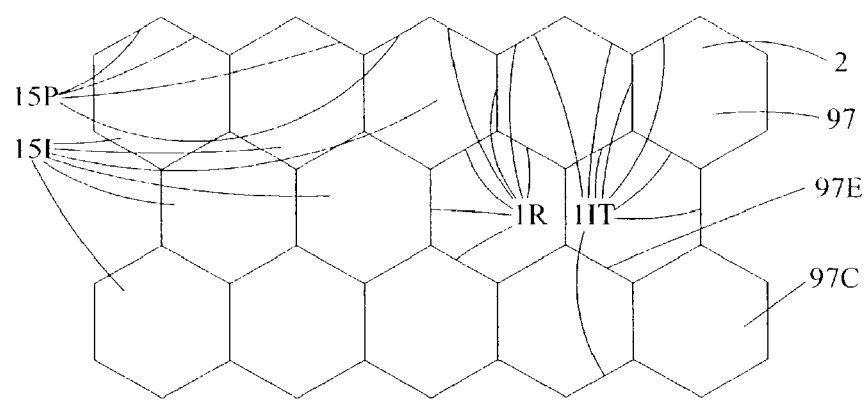

FIGS. 12D, 12E and 12F illustrate possible grid arrays of a plurality of renewable thermal energy harvesting systems 1R and/or floating ice sheet thickening systems 1IT that can be used along said defined perimeter 15P and optionally in the enclosed area 15I near the defined perimeter 15P or throughout the enclosed area 15I. Any desired number of spaced renewable thermal energy harvesting systems 1R and/or floating ice sheet thickening systems 1IT can be used on each leg of the array between adjacent vertices of the arrays. The use of such grid arrays can help to stabilize and inhibit shrinkage or depletion of a floating ice sheet extending over the enclosed area 15I.

FIG. 12D shows a substantially triangular grid array with approximately two size triangles, arranged inside the defined perimeter 15P. The triangles shown are approximately equilateral triangles, though other types of triangles can be used in variant embodiments with triangular grids. The use of such a triangular grid array can help to stabilize and inhibit shrinkage or depletion of a floating ice sheet extending over the enclosed area 15I. One known advantage of a triangular grid is that it can act substantially as a two-dimensional truss structure, to beneficially add strength and stiffness to the floating ice sheet 2 and help it resist deformation and break-up that could otherwise be caused by water currents beneath the floating ice sheet 2 and/or wind currents above the floating ice sheet 2. Any desired number of spaced renewable thermal energy harvesting systems 1R and/or floating ice sheet thickening systems 1IT can be used on each leg of the triangular grid array between adjacent vertices of the arrays.

FIG. 12E shows a substantially quadrilateral grid array (square grid array illustrated as one specific example of a quadrilateral grid array), arranged inside the defined perimeter 15P. Any desired number of spaced renewable thermal energy harvesting systems 1R and/or floating ice sheet thickening systems 1IT can be used on each leg of the quadrilateral grid array between adjacent vertices of the arrays. The use of such a quadrilateral grid array can help to stabilize and inhibit shrinkage or depletion of a floating ice sheet extending over the enclosed area 15I. FIG. 12E also illustrates the use of an optional perimeter watering pipe 15PP substantially along or adjacent to the defined perimeter 15P, which uses liquid water 10 sourced from below the floating ice sheet 2, pumped through this insulated perimeter watering pipe 15PP and dripped or sprinkled or sprayed along the perimeter in cold temperature winter times to subsequently freeze and add still further to the frozen thickness 2FT along the perimeter. The power for the pump can be sourced from the renewable thermal energy harvesting systems 1R and/or floating ice sheet thickening systems 1IT.

FIG. 12F shows a substantially hexagonal grid array (regular hexagonal grid array illustrated as one specific example of a hexagonal grid array), arranged inside the defined perimeter 15P. Any desired number of spaced renewable thermal energy harvesting systems 1R and/or floating ice sheet thickening systems 1IT can be used on each leg of the hexagonal grid array between adjacent vertices of the arrays. The use of such a hexagonal grid array can help to stabilize and inhibit shrinkage or depletion of a floating ice sheet extending over the enclosed area 15I.

The use of equilateral triangles, squares or regular hexagons for the grid arrays is advantageous as these are the regular polygons that can by themselves form a full space filling two-dimensional array, and is further advantageous as they can optimally cover a given surface area of floating ice sheet 2 with minimum array perimeter length, given a specified criterion for maximum allowed distance from any point of the floating ice sheet 2 to its nearest point on the array perimeter. The specified criterion for maximum allowed distance from any point of the floating ice sheet 2 to its nearest point on the array perimeter can be set equal to the "apothem", or inner radius of a regular polygon. This optimality condition is achieved because mathematically, equilateral triangles, squares and regular hexagons all have a ratio of (half-perimeter)/(area)=(1/apothem), and so are all equally optimal on this measure for a specified apothem. It should be understood that grid arrays that use non-regular polygons or mixed polygons or irregular boundaries, may be desirable and warranted for particular reasons and circumstances in particular sites and installations, for a variety of technical, engineering, scientific and/or economic reasons.

The embodiments shown in FIGS. 12D, 12E and 12F illustrate a floating ice sheet thickening system 1IT, further comprising a plurality of floating ice sheet thickening systems 1IT, wherein said plurality of floating ice sheet thickening systems 1IT are arranged substantially along the edges 97E of a grid pattern 97 on the surface of said floating ice sheet 2, which grid pattern 97 includes a plurality of grid cells 97C sharing edges 97E, and wherein said grid cells 97C comprise at least one of triangular, quadrilateral, hexagonal and other polygonal grid cells; and wherein operation of said plurality of floating ice sheet thickening systems 1IT over the course of a winter season will produce a grid of increased frozen thickness 2FT substantially along said edges 97E of said grid pattern 97, and will consequently reduce the probability of summer melting of the frozen ice sheet 2 over the entire region spanned by said grid pattern 97.

While several preferred embodiments of the invention have been described in detail with reference to the accompanying Figures, it should be understood that several variant embodiments of the present invention are also possible within the spirit and scope of the invention as claimed below.

What is claimed is:

1. A renewable thermal energy harvesting system near a floating ice sheet, comprising: water intake means for admitting liquid water sourced from below an undersurface of said floating ice sheet; air intake means for admitting air sourced from above said floating ice sheet, said air being at below water freezing temperature; air heating means for utilizing thermal energy transfer from said liquid water to said air, to produce a heated air stream; mechanical energy generation means for harvesting some mechanical energy from said heated air stream and for exhausting an exhaust air stream; air compression means between said air intake means and said air heating means, for compressing said air from said air intake means to produce a compressed air stream, said compressed air stream being at below water freezing temperature, and said heated air stream being heated to a temperature that is greater than the temperature of said compressed air stream; and energy harvesting means for harvesting renewable energy, which energy harvesting means includes both said mechanical energy generation means and at least one generator means for converting some of said mechanical energy into electrical energy, and further comprising at least one of means for conditioning electrical energy, means for processing electrical energy, means for transmitting electrical energy, and means for storing electrical energy.

2. The renewable thermal energy harvesting system of claim 1, wherein said air heating means for utilizing thermal energy transfer from said liquid water to said air, utilizes some heat of solidification of at least some portion of said liquid water being converted to frozen water.

3. The renewable thermal energy harvesting system of claim 2, wherein said frozen water includes at least one of ice particles and snow particles and sleet particles and hail stones, wherein said frozen water is carried by said exhaust air stream to a location above said floating ice sheet, and wherein said frozen water from said location above said floating ice sheet, is deposited by gravitational force so as to effectively increase the frozen thickness of at least some region of said floating ice sheet.

4. The renewable thermal energy harvesting system of claim 1, wherein said water intake means for admitting liquid water includes at least one water inlet orifice located substantially below said floating ice sheet, and wherein liquid water admitted through said water intake means can subsequently flow through at least one water pump and at least one of a water pipe and tube and hose.

5. The renewable thermal energy harvesting system of claim 1, wherein said floating ice sheet comprises at least one of a floating ice shelf and a floating ice sheet on the surface of at least one of an ocean, a sea, a bay, a gulf, an inlet, a sound, a strait, a channel, an estuary, a lake, a reservoir, a pond, a river, a stream, a brook, a creek or a canal.

6. The renewable thermal energy harvesting system of claim 1, wherein said air heating means comprises watering means for at least one of streaming and spraying and dripping and misting and pumping and injecting and delivering through nucleator nozzles, said liquid water from said water intake means, into said air.

7. The renewable thermal energy harvesting system of claim 1, wherein said air heating means is located substantially above said floating ice sheet; wherein said air heating means utilizes some heat of solidification of at least some portion of said liquid water being converted to frozen water, and wherein said mechanical energy generation means for harvesting some mechanical energy from said heated air stream, further comprises at least one angularly orientable exhaust nozzle terminating in exhaust orifice means for exhausting said exhaust air stream along with particles of said frozen water.

8. The renewable thermal energy harvesting system of claim 1, wherein said renewable thermal energy harvesting system acts as a floating ice sheet thickening system for a floating ice sheet; wherein said air heating means utilizes some heat of solidification of at least some portion of said liquid water being converted to frozen water, wherein said frozen water acts towards increasing the frozen thickness of at least some region of said floating ice sheet; further comprising energy harvesting means for harvesting renewable energy, which energy harvesting means includes said mechanical energy generation means; and further comprising renewable energy transmission means for transmitting a flow of renewable energy from said energy harvesting means to contribute power to a subsystem of said floating ice sheet thickening system that comprises at least one of air compression means and a water pump and a working fluid pump.

9. The renewable thermal energy harvesting system of claim 1, further comprising at least one radial arm that can rotate around a hub at least partially supported by said floating ice sheet, wherein said water intake means is connected to said hub by at least one of a water pipe and tube and hose penetrating through said floating ice sheet, further comprising at least one exhaust nozzle terminating in exhaust orifice means for exhausting said exhaust air stream along with particles of said frozen water, wherein said exhaust orifice means is located on said radial arm at a radially spaced distance from the center of rotation of said radial arm and is angularly oriented such that the exhaust air stream generates some thrust force acting to rotate said radial arm around said hub, and wherein said mechanical energy generation means comprises use of said thrust force to rotate said radial arm around said hub and thereby generate rotational mechanical energy.

10. The renewable thermal energy harvesting system of claim 9, further comprising support runner means for contributing to supporting said radial arm above said floating ice sheet and for permitting low friction motion of said radial arm over the floating ice sheet, and wherein the presence of said floating ice sheet serves as friction-reducing means for reducing frictional forces that act to oppose movement of said radial arm, relative to an alternate condition wherein said floating ice sheet is absent.

11. The renewable thermal energy harvesting system of claim 9, further comprising
   fluid-foil means for interfacing with an air current which fluid-foil means is connected to said radial arm and can execute substantially periodic motion as said radial arm rotates around said hub;
   energy harvesting means including control system means capable of controlling time-variable orientations of said fluid-foil means relative to near flow fields of said air current when said air current exists and carries wind energy in the form of fluid-dynamic kinetic energy, for converting a portion of said fluid-dynamic kinetic energy into net work on said fluid-foil means over the course of a cycle of said substantially periodic motion, by utilizing time-variable fluid-dynamic forces acting on said fluid-foil means at said time-variable orientations to contribute to driving said substantially periodic motion;
   and wherein said energy harvesting means further includes energy conversion means for converting at least some of said net work into usable energy in a desired form.

12. The renewable thermal energy harvesting system of claim 9,
   further comprising fluid-foil means for interfacing with an air current which fluid-foil means is connected to said radial arm and can execute substantially periodic motion as said radial arm rotates around said hub;
   further comprising energy harvesting means including control system means capable of controlling time-variable orientations of said fluid-foil means relative to near flow fields of said air current when said air current exists and carries wind energy in the form of fluid-dynamic kinetic energy, for converting a portion of said fluid-dynamic kinetic energy into net work on said fluid-foil means over the course of a cycle of said substantially periodic motion, by utilizing time-variable fluid-dynamic forces acting on said fluid-foil means at said time-variable orientations to contribute to driving said substantially periodic motion;
   wherein said energy harvesting means further includes energy conversion means comprising generator means for converting at least one of (i) said rotational mechanical energy and (ii) said net work that creates incremental rotational mechanical energy, into electrical energy;
   further comprising support runner means connected to said radial arm for supporting said radial arm above said floating ice sheet and for permitting low friction motion of said radial arm over the floating ice sheet, wherein said support runner means comprise buoyant support runner means, wherein said floating ice sheet is floating above a liquid water layer; and
   wherein in the event of a warm temperature period occurring when said floating ice sheet becomes one of substantially and fully melted, said buoyant support runner means float in said liquid water layer and said energy harvesting means can still function as said radial arm can still rotate around said hub driven by said time-variable fluid-dynamic forces acting on said fluid-foil means at said time-variable orientations to contribute to driving said substantially periodic motion.

13. The renewable thermal energy harvesting system of claim 1, further comprising: a wind energy harvesting subsystem, which wind energy harvesting subsystem comprises: fluid-foil means for interfacing with an air current when said air current exists and carries wind energy in the form of fluid-dynamic kinetic energy, which fluid-foil means can execute substantially periodic motion; and energy harvesting means for converting a portion of said fluid-dynamic kinetic energy into network on said fluid-foil means over the course of a cycle of said substantially periodic motion, by utilizing fluid-dynamic forces acting on said fluid-foil means to contribute to driving said substantially periodic motion; and wherein said energy harvesting means further includes energy conversion means for converting at least some of said network into usable energy in a desired form.

14. A renewable thermal energy harvesting system comprising a thermodynamic engine near a floating ice sheet, including in combination:
   air intake means for admitting air sourced from a level above said floating ice sheet, said air being at below water freezing temperature;
   air compression means for compressing said air from said air intake means to produce a compressed air stream, said compressed air stream being at below water freezing temperature;
   air heating means for utilizing thermal energy transfer from liquid water sourced from below an undersurface of said floating ice sheet, to said compressed air stream, to produce a heated air stream; and
   mechanical energy generation means for harvesting some mechanical energy from said heated air stream and for exhausting an exhaust air stream.

15. The renewable thermal energy harvesting system of claim 14, wherein said air compression means comprises at least one of centrifugal compression means, centrifugal compression means using a radial arm which is rotating around a hub, an axial flow compressor, compression means using motion of a piston in a cylinder, and other compression means utilizing a substantially variable enclosed volume.

16. A renewable thermal energy harvesting system for a floating ice sheet, comprising: air heating means for utilizing thermal energy transfer from liquid water sourced from below an undersurface of said floating ice sheet, to air sourced from above said floating ice sheet, said air being at below water freezing temperature; wherein said air heating means utilizes some heat of solidification of at least some portion of said liquid water being converted to frozen water, wherein said frozen water acts towards increasing the frozen thickness of at least some region of said floating ice sheet; and further comprising, renewable energy transmission means for transmitting a flow of renewable energy from energy harvesting means for harvesting renewable energy, to contribute power to a subsystem of said floating ice sheet thickening system that comprises at least one of air compression means and a water pump; wherein said floating ice sheet thickening system acts as a renewable thermal energy harvesting system; further comprising air intake means for admitting said air sourced from a level above said floating ice sheet; wherein said air compression means compresses air from said air intake means; wherein said air heating means acts on air downstream of said air compression means, to produce a heated air stream; and wherein said energy harvesting means includes mechanical energy generation means for harvesting some mechanical energy from said heated air stream and for exhausting an exhaust air stream.

17. The floating ice sheet thickening system of claim 16, further comprising a plurality of floating ice sheet thickening systems, wherein said plurality of floating ice sheet thickening systems are arranged substantially along the edges of a grid pattern on the surface of said floating ice sheet, which grid pattern includes a plurality of grid cells sharing edges, and wherein said grid cells comprise at least one of triangular, quadrilateral, hexagonal and other polygonal grid cells; and wherein operation of said plurality of floating ice sheet thickening systems over the course of a winter season will produce a grid of increased frozen thickness substantially along said edges of said grid pattern, and will consequently reduce the probability of summer melting of the frozen ice sheet over the entire region spanned by said grid pattern.

* * * * *